US012408079B2

(12) United States Patent
Balakrishnan et al.

(10) Patent No.: US 12,408,079 B2
(45) Date of Patent: Sep. 2, 2025

(54) APPARATUS, SYSTEM, METHOD AND COMPUTER-IMPLEMENTED STORAGE MEDIA TO IMPLEMENT RADIO RESOURCE MANAGEMENT POLICIES USING MACHINE LEARNING

(71) Applicant: Intel Corporation, Santa Clara, CA (US)

(72) Inventors: Ravikumar Balakrishnan, Beaverton, OR (US); Nageen Himayat, Fremont, CA (US); Arjun Anand, Milpitas, CA (US); Mustafa Riza Akdeniz, San Jose, CA (US); Sagar Dhakal, Los Altos, CA (US); Mark R. Eisen, Beaverton, OR (US); Navid Naderializadeh, Woodland Hills, CA (US)

(73) Assignee: Intel Corporation, Santa Clara, CA (US)

( * ) Notice: Subject to any disclaimer, the term of this patent is extended or adjusted under 35 U.S.C. 154(b) by 540 days.

(21) Appl. No.: 17/712,050

(22) Filed: Apr. 1, 2022

(65) Prior Publication Data

US 2022/0377614 A1 Nov. 24, 2022

(51) Int. Cl.
*H04W 28/08* (2023.01)
*H04W 28/02* (2009.01)

(52) U.S. Cl.
CPC ... *H04W 28/0925* (2020.05); *H04W 28/0252* (2013.01); *H04W 28/0268* (2013.01)

(58) Field of Classification Search
CPC ......... H04W 28/0278; H04W 72/1221; H04W 72/1268; H04W 72/21; H04W 72/23;
(Continued)

(56) References Cited

U.S. PATENT DOCUMENTS 11,244,242 B2   2/2022  Prakash et al.
11,373,115 B2 * 6/2022  Kopp ................... G06V 20/56
(Continued)

FOREIGN PATENT DOCUMENTS

CN    103369599 A    10/2013
JP    2019144642 A   8/2019
(Continued)

OTHER PUBLICATIONS

Li, Songze, Qian Yu, Mohammad Ali Maddah-Ali, and A. Salman Avestimehr. "A scalable framework for wireless distributed computing." IEEE/ACM Transactions on Networking 25, No. 5 (2017): 2643-2654. (Year: 2017).

(Continued)

*Primary Examiner* — Nathan S Taylor
(74) *Attorney, Agent, or Firm* — Alliance IP, LLC

(57) ABSTRACT

An apparatus of a transmitter computing node n (TX node n) of a wireless network, one or more computer readable media, a system, and a method. The apparatus includes one or more processors to: implement machine learning (ML) based training rounds, each training round including: determining a local action value function $Q_n(h_n, a_n; \theta_n)$ corresponding to a value of performing a radio resource management (RRM) action $a_n$ at a receiving computing node n (RX node n) associated with TX node n using policy parameter $\theta_n$ and based on $h_n$, $h_n$ including channel state information at RX node n; and determining, based on an overall action value function $Q_{tot}$ at time t, an estimated gradient of an overall loss at time t for overall policy parameter $\theta_t(\nabla L_t(\theta_t))$, wherein $Q_{tot}$ corresponds to a mixing of local action value functions $Q_i(h_i, a_i; \theta_i)$ for all TX nodes i in the network at time t including TX node n; and determine, in response to a determination that $\nabla L_t(\theta_t)$ is close to zero for various values of t during training, a trained (Continued)

local action value function $Q_{n,trained}$ to generate a trained action value relating to data communication between TX node n and RX node n.

25 Claims, 23 Drawing Sheets

(58) Field of Classification Search
CPC ..... H04W 72/54; H04W 28/02; H04W 72/12; H04W 24/08; H04W 28/06; H04W 80/02; H04W 88/02; H04W 88/08; H04W 92/10; H04W 28/0252; H04W 28/0268; H04W 28/0925; H04W 28/0236; H04W 28/08
See application file for complete search history.

(56) References Cited

U.S. PATENT DOCUMENTS

| | | | |
|---|---|---|---|
| 11,611,457 B2* | 3/2023 | D'Oro | H04L 1/0015 |
| 12,086,208 B2* | 9/2024 | Yang | G06N 3/045 |
| 12,100,230 B2* | 9/2024 | Wang | G06V 10/26 |
| 2014/0313908 A1 | 10/2014 | Silva et al. | |
| 2017/0279839 A1 | 9/2017 | Vasseur et al. | |
| 2018/0357566 A1 | 12/2018 | Liu et al. | |
| 2019/0042934 A1 | 2/2019 | Arunachalam et al. | |
| 2019/0138934 A1 | 5/2019 | Prakash et al. | |
| 2019/0171978 A1 | 6/2019 | Bonawitz | |
| 2019/0235940 A1 | 8/2019 | Kegel et al. | |
| 2019/0340534 A1 | 11/2019 | McMahan et al. | |
| 2020/0125926 A1 | 4/2020 | Choudhury et al. | |
| 2020/0280863 A1 | 9/2020 | Cioffi et al. | |
| 2022/0014963 A1* | 1/2022 | Yeh | G06N 3/045 |
| 2022/0021470 A1 | 1/2022 | Callard et al. | |
| 2022/0124543 A1* | 4/2022 | Orhan | G06N 3/006 |
| 2022/0138568 A1* | 5/2022 | Smolyanskiy | G06N 3/044 706/21 |
| 2022/0158907 A1* | 5/2022 | Ghadimi | H04L 41/044 |
| 2022/0167236 A1* | 5/2022 | Melodia | H04W 28/24 |
| 2022/0232531 A1* | 7/2022 | Li | G06N 3/045 |
| 2022/0237515 A1 | 7/2022 | Prakash et al. | |
| 2022/0271999 A1* | 8/2022 | Jeong | H04W 16/28 |
| 2022/0374685 A1* | 11/2022 | Lee | G06N 7/01 |
| 2022/0393729 A1* | 12/2022 | Lee | H04B 7/0456 |
| 2023/0048920 A1* | 2/2023 | Bhose | G06N 3/098 |
| 2023/0068386 A1 | 3/2023 | Akdeniz et al. | |
| 2023/0179490 A1* | 6/2023 | Huangfu | H04W 24/02 370/252 |
| 2023/0269606 A1 | 8/2023 | Säily et al. | |
| 2023/0284139 A1* | 9/2023 | Ma | H04B 7/0626 370/329 |
| 2023/0345317 A1* | 10/2023 | Sarkar | H04W 76/15 |
| 2024/0056933 A1* | 2/2024 | Lin | H04W 36/0058 |
| 2024/0281654 A1* | 8/2024 | Reed | G06N 3/0455 |
| 2025/0031065 A1* | 1/2025 | Kovács | H04L 41/0806 |
| 2025/0063559 A1* | 2/2025 | D'Oro | H04W 72/046 |

FOREIGN PATENT DOCUMENTS

| | | | | |
|---|---|---|---|---|
| KR | 20190032433 A | 3/2019 | | |
| WO | WO-2019211134 A1 * | 11/2019 | ............. | G06N 20/00 |
| WO | 2020121045 A1 | 6/2020 | | |
| WO | WO-2022075905 A1 * | 4/2022 | ............. | H04L 41/16 |

OTHER PUBLICATIONS

Mohammadi, Mehdi, Ala Al-Fuqaha, Sameh Sorour, and Mohsen Guizani. "Deep learning for IoT big data and streaming analytics: A survey." IEEE Communications Surveys & Tutorials 20, No. 4 (2018): 2923-2960. (Year: 2018).
USPTO Non-Final OA in U.S. Appl. No. 17/665,025 mailed on Sep. 26, 2023 (18 pages).
D. Morning et al. : "Astraea: Self-Balancing Federated Learning for Improving Classification Accuracy of Mobile Deep Learning Applications", 2019 IEEE 37th International Conference On Computer Design (ICCD), Nov. 17, 2019 (Nov. 17, 2019), pp. 246-254, XP033710037, DOI: 10.1109/ICCD46524.2019.00038 [retrieved on Feb. 7, 2020] * section III*.
EESR European Search Report issued in EP Patent Application No. 20917584.3 issued on Feb. 9, 2024 (13 pages).
L. Huang et al.: "LoAdaBoost: Loss-Based AdaBoost Federated Machine Learning on medical Data",arxiv.org, Cornell University Library, 201 Olin Library Cornell University Ithaca, NY 14853, Nov. 30, 2018 (Nov. 30, 2018), XP081463644,* section LoAdaBoost FedAvg on p. 7-9 *.
T. Tuor et al. : "Data Selection for Federated Learning with Relevant and Irrelevant Data at Clients", arxiv.org, Cornell University Library, 201 Olin Library Cornell University Ithaca, NY 14853, Jan. 22, 2020 (Jan. 22, 2020), XP081584192, * section 4 *.
USPTO Notice of Allowance in U.S. Appl. No. 17/665,025 mailed on Feb. 15, 2024 (4 pages).
Verbraeken, Joost, Matthijs Waiting, Jonathan Katzy, Jeroen Kloppenburg, Tim Verbelen, and Jan S. Rellermeyer. "A survey on distributed machine learning." ACM computing surveys (csur) 53, No. 2 (2020): 1-33. (Year: 2020).
Y. Jiao et al. : "Toward an Automated Auction Framework for Wireless Federated Learning Services Market", arxiv.org, Cornell University Library, 201 Olin Library Cornell University Ithaca, NY 14853, Dec. 13, 2019 (Dec. 13, 2019), XP081558562 * section I and III-A to D * figure 1 *.
EESR Notice of Extended European Search Report issued in EP Patent Application No. 21817091.8 issued on Jul. 5, 2024 (11 pages).
Fallah, Alireza, et al. Personalized Federated Learning: A Meta-Learning Approach. arXiv:2002.07948, arXiv, Oct. 22, 2020. arXiv. org, https://doi.org/10.48550/arXiv.2002.07948, 26 Pages.
Nishio, Takayuki, and Ryo Yonetani. "Client Selection for Federated Learning with Heterogeneous Resources in Mobile Edge." ICC 2019 - 2019 IEEE International Conference on Communications (ICC), 2019, pp. 1-7, Apr. 2018, arXiv.org, https://doi.org/10.1109/ICC.2019.8761315, 7 Pages.
Wang, Shusen, et al.; "GIANT: Globally Improved Approximate Newton Method for Distributed Optimization," retrieved from https://arxiv.org/abs/1709.03528v5, dated Sep. 2018; 22 pages.
Y. Lecun, L. Bottou, Y. Bengio and p. Haffner, "Gradient-based learning applied to document recognition," in Proceedings of the IEEE, vol. 86, No. 11, pp. 2278-2324, Nov. 1998, doi: 10.1109/5.726791; 46 pages.
Yao, Xin, et al.; "Federated Learning with Unbiased Gradient Aggregation and Controllable Meta Updating," retrieved from https://arxiv.org/abs/1910.08234v1, dated Oct. 2019; 8 pages.
Zhao, Yue, et al.; "Federated Learning with Non-IID Data," accessed at arXiv:1806.00582; Jun. 2, 2018; 13 pages.
Zhou, Shuheng, et al.; "Differential Privacy with Compression"; arXiv, 0901.1365v1, Jan. 2009; 14 pages.
"Mobile Edge Computing (MEC) Terminology", Mar. 2016, 7 pages, ETS GS MEC 001 v1.1.1.
"Mobile Edge Computing (MEC); Deployment of Mobile Edge Computing in an NFV environment", Feb. 2018, 32 pages, ETSI GR MEC 017 v1 .1.1.
"obile Edge Computing (MEC); Framework and Reference Architecture", Mar. 2016, 18 pages, ETS GS MEC 003,1.1.1.
"Mobile Edge Computing (MEC); Mobile Edge Management; Part 1: System, host and platform management", Oct. 2017, 26 pages, ETSI GS MEC 010-1 v1.1.1.
"Mobile Edge Computing (MEC); Mobile Edge Management; Part 2: Application lifecycle, rules and requirements management", Jul. 2017, 48 pages, ETSI GS MEC 010-2 v1.1.1.
"Multi-access Edge Computing (MEC); Phase 2: Use Cases and Requirement", Oct. 2018, 66 pages, ETSI GS MEC 002 v2.1.1.
Balakrishnan, Ravikumar et al.; "Resource Management and Fairness for Federated Learning over Wireless Edge Networks"; IEEE 21st International Workshop on Signal Processing Advances in Wireless Communications (SPAWC) (May 2020); 5 pages.
Banerjee, Arindam, et al.; "Clustering with Bregman Divergences," Journal of Machine Learning Research 6, published Oct. 2005; 45 pages.

(56) References Cited

OTHER PUBLICATIONS

Bordes, Antoine, et al., "Fast Kernel Classifiers with Online and Active Learning," Journal of Machine Learning Research 6 (2005), pp. 1579-1619; 41 pages.

Calabrese, Francesco Davide, et al.; "Learning Radio Resource Management in RANs: Framework, Opportunities, and Challenges," arXiv:1611.10253v3; May 20, 2018; 8 pages.

Chelsea Finn, Pieter Abbeel, Sergey Levine, "Model-Agnostic Meta-Learning for Fast Adaptation of Deep Networks", CML 2017.

Chia-Yu Chang et al., "Analyzing MEC Architectural Implications for LTE/LTE-A", Feb. 2, 2016, 28 pages, EURECOM, RR-16-312, France.

Dhakal, Sagar et al.; "Coded computing for distributed machine learning in wireless edge network"; IEEE VTC, 2019; 6 pages. Retrieved from https://ieeexplore.ieee.org/abstract/document/8891198.

Dhakal, Sagar et al.; "Coded Federated Learning"; IEEE Globecom Workshop 2019; 6 pages. Retrieved from https://eeexplore.ieee.org/abstract/document/9024521.

Dwork, Cynthia, et al.; "The Algorithmic Foundations of Differential Privacy"; Foundations & Trends, Theoretical Computer Science, v. 9, n. 3-4, pp. 211-407, 2014; 281 pages.

Eisen, Mark, et al.; "Optimal Wireless Resource Allocation with Random Edge Graph Neural Networks," accessed at https://arxiv.org/abs/1909.01865; Mar. 5, 2020; 15 pages.

Frey, Brendan J., et al.; "Clustering by Passing Messages Between Data Points," Science, vol. 315; Feb. 16, 2007; 23 pages.

Goodfellow, I., et al., "Deep Learning;" the MIT Press, 2016; Genet Program Evolvable Mach (2018) 19:305-307; 3 pages.

Halbawi, Wael, et al. "Improving distributed gradient descent using reed-solomon codes." 2018 IEEE International Symposium on Information Theory (ISIT). IEEE, Jun. 17-22, 2018. (Year: 2018); 5 pages.

Katharopoulos, Angelos, et al.; "Not All Samples Are Created Equal: Deep Learning with Importance Sampling," accessed at arXiv:1803.00942; Oct. 28, 2019; 13 pages.

Lecun, Yann, et al.; "Gradient-Based Learning Applied to Document Recognition," Proceedings of the IEEE, Nov. 1998; 46 pages.

Li, Songze et al., "Polynomially Coded Regression: Optimal Straggler Mitigation via Data Encoding," Department of Electrical Engineering, University of Southern California, Los Angeles, CA, arXiv: 1805.09934v1 [cs.IT] May 24, 2018 (11 pages).

Li, Songze, et al. "Near-optimal straggler mitigation for distributed gradient methods." 2018 IEEE International Parallel and Distributed Processing Symposium Workshops (IPDPSW). IEEE, 2018. (Year. 2018); 10 pages.

Li, Tian, et al.; "Federated Optimization for Heterogeneous Networks"; Conference on Machine Learning and Systems (MLSys), Apr. 2020; 22 pages.

Li, Tian, et al.; "Federated Optimization in Heterogeneous Networks," accessed at arXiv: 1812.06127; Apr. 21, 2020; 22 pages.

McMahan, Brendan et al., "Federated Learning: Collaborative Machine Learning Without Centralized Training Data," Google Research Blog, Apr. 6, 2007 (5 pages).

McMahan, H. Brendan, et al., "Communication-Efficient Learning of Deep Networks from Decentralized Data," Google, Inc., Seattle, Washington, United States; Feb. 28, 2017; 11 pages.

Min Ye et al., "Communication-Computation Efficient Gradient Coding", Feb. 9, 2018, 20 pages.

Pandey, Shashi Raj, et al.; "A Crowdsourcing Framework for On-Device Federated Learning," arXiv:1911.01046v2; Feb. 3, 2020; 15 pages.

PCT International Preliminary Report on Patentability issued in PCT/US2020/067068, dated Aug. 18, 2022; 10 pages.

PCT International Preliminary Report on Patentability issued in PCT/US2021/035042, dated Dec. 15, 2022; 13 pages.

PCT International Preliminary Report on Patentability issued in PCT/US2021/039272, dated Jan. 26, 2023; 9 pages.

PCT International Search Report and Written Opinion issued in PCT/US2020/067068, dated Apr. 15, 2021; 15 pages.

PCT International Search Report and Written Opinion issued in PCT/US2021/035042, dated Nov. 2, 2021; 18 pages.

PCT International Search Report and Written Opinion issued in PCT/US2021/039272, dated Oct. 15, 2021; 13 pages.

Rashid, Tabish, et al.; "QMIX: Monotonic Value Function Factorisation for Deep Multi-Agent Reinforcement earning," International Conference on Machine Learning; Stockholm, Sweden; Jun. 6, 2018; 14 pages.

Ruder, S., "An overview of gradient descent optimization algorithms," Insight Centre for Data Analytics, Dublin; Jun. 15, 2017; arXiv preprint arXiv:1609.04747; 14 pages.

S. Prakash, S. Dhakal, M. Akdeniz, A. S. Avestimehr, and N. Himayat, "Coded computing for federated learning at the edge," International Workshop on Federated Learning for User Privacy and Data Confidentiality (FL-ICML 2020), Jul. 2020; 9 pages.

Sattler, Felix, et al.; "Clustered Federated Learning: Model-Agnostic Distributed Multi-Task Optimization under Privacy Constraints," retrieved from https://arxiv.org/abs/1910/01991v1; dated Oct. 2019; 17 pages.

Sattler, Felix, et al.; "Robust and Communication-Efficient Federated Learning from Non-IID Data," retrieved from https://arxiv.org/abs/1903.02891v1; dated Mar. 2019; 18 pages.

Schaul, Tom, et al.; "Prioritized Experience Replay"; ICLR, published 2016; 21 pages.

Showkatbakhsh, M., et al. "Privacy-Utility Trade-off of Linear Regression under Random Projections and Additive Noise", Arxiv 2019; https://arxiv.org/pdf/1902.04688.pdf; 7 pages.

Su, Han-I et al., "Quadratic Gaussian Gossiping," 2009 3rd IEEE International Workshop on Computational Advances in Multi-Sensor Adaptive Processing (2009) (4 pages).

Sunehag, Peter, et al.; "Value-Decomposition Networks for Cooperative Multi-Agent Learning," accessed at arXiv:1706.05296; Jun. 16, 2017; 17 pages.

Tandon, Rashish et al., "Gradient Coding: Avoiding Stragglers in Distributed Learning", 2017, 9 pages.

Tandon, Rashish et al., "Gradient Coding: Avoiding Stragglers in Synchronous Gradient Descent," Department of Computer Science, UT Austin, Institute for Computational Engineering and Sciences, UT Austin, Department of Electrical and Computer Engineering, UT Austin, Microsoft, Mar. 9, 2017 (19 pages).

U.S. Appl. No. 17/920,839, filed Oct. 24, 2022.

U.S. Appl. No. 17/921,549, filed Oct. 26,2022.

USPTO Notice of Allowance in U.S. Appl. No. 16/235,682 mailed on Oct. 4, 2021 (11 pages).

Wadu, Madhusanka Manimel, et al.; "Federated Learning under Channel Uncertainty: Joint Client Scheduling and Resource Allocation," arXiv:2002.00802v2; Feb. 6, 2020; 6 pages.

Li et al. "Fair Resource Allocation in Federated Learning" publication ICLR (Year: 2020).

McMahan et al., "Learning Differentially Private Recurrent Language Models" pub. arXiv (Year: 2018).

Ren et al. "Scheduling for Cellular Federated Edge Learning with Importance and Channel Awareness" publication arXiv Jun. 2020 (Year: 2020).

Rizk et al. "Optimal Importance Sampling for Federated Learning" publication arXiv (Year: 2020).

USPTO Non-Final OA for U.S. Appl. No. 17/921,549 (12 pages) received on Jul. 10, 2025.

USPTO Non-Final OA in U.S. Appl. No. 17/790,950 mailed on Jun. 10, 2025 (23 pages).

* cited by examiner

APPARATUS, SYSTEM, METHOD AND COMPUTER-IMPLEMENTED STORAGE MEDIA TO IMPLEMENT RADIO RESOURCE MANAGEMENT POLICIES USING MACHINE LEARNING

FIELD

Embodiments relate to the determination of radio resource management (RRM) policies such as within a cellular or WiFi architecture.

BACKGROUND

Deep reinforcement learning (DRL) approaches involve one or more machine learning agents observing the system of the system environment and performing one or more actions based on the observation. As a result, the system environment (or environment) experiences a transition to a new state and returns the agent(s) with reward(s) associated with the one or more actions. The goal of the agent(s) is to maximize the expected cumulative discounted long term reward(s). DRL utilizes deep neural networks (DNNs) to approximate an optimal policy for the agent(s) for the agent(s) to either map from input states to actions, or to approximate action-value functions that map states to action-values/Q-values for each of the possible actions.

Federated learning (FL) where a global model is trained with coordination with a federation of clients while keeping the training data local at the clients/nodes is a problem under consideration. The federated learning protocol iteratively allows clients to download a centrally trained model from a server, update it with its own data and upload the model updates (specifically gradient update) back to the server. The server then aggregates updates from multiple clients to update the global model.

Federated Learning over wireless edge networks is highly desired since data can be maintained local at clients while the edge server can utilize the compute capabilities of clients to speed up training.

DETAILED DESCRIPTION

Embodiments will focus on learning that is collaborative, hierarchical, and that uses distributed datasets/datapoints and processing. Some embodiments advantageously draw on opportunities provided by resource rich, real-time compute environments offered by wireless edge networks to exploit sensing, compute, communication and storage resources, to lower latency and communication costs including by way of radio resource management.

Sections A through H. below will provide an overview of configurations for edge computing, such as wireless edge computing, including, respectively, overviews of edge computing, usage of containers in edge computing, mobility and multi-access edge computing (MEC) in edge computing settings, computing architectures and systems, machine readable medium and distributed software instructions, a satellite edge connectivity use case, software distribution in edge computing settings. Section H. provides an overview of machine learning in edge computing networks.

Sections I through K provide a detailed description of some respective demonstrative embodiments that address challenges of developing globally accurate learning models over wireless edge networks with distributed data. Aspects of embodiments described in any one of Sections I through K (relating, respectively, to a first set of embodiments, a second set of embodiments, and a third set of embodiments) may be combined with other aspects described in any one of the same Sections as would be recognized by one skilled in the art. Embodiments of Sections I through K may be deployed or implemented using any of the configurations or environments described in any of Sections A through G described below.

A. Overviews of Edge Computing

Figure 1:
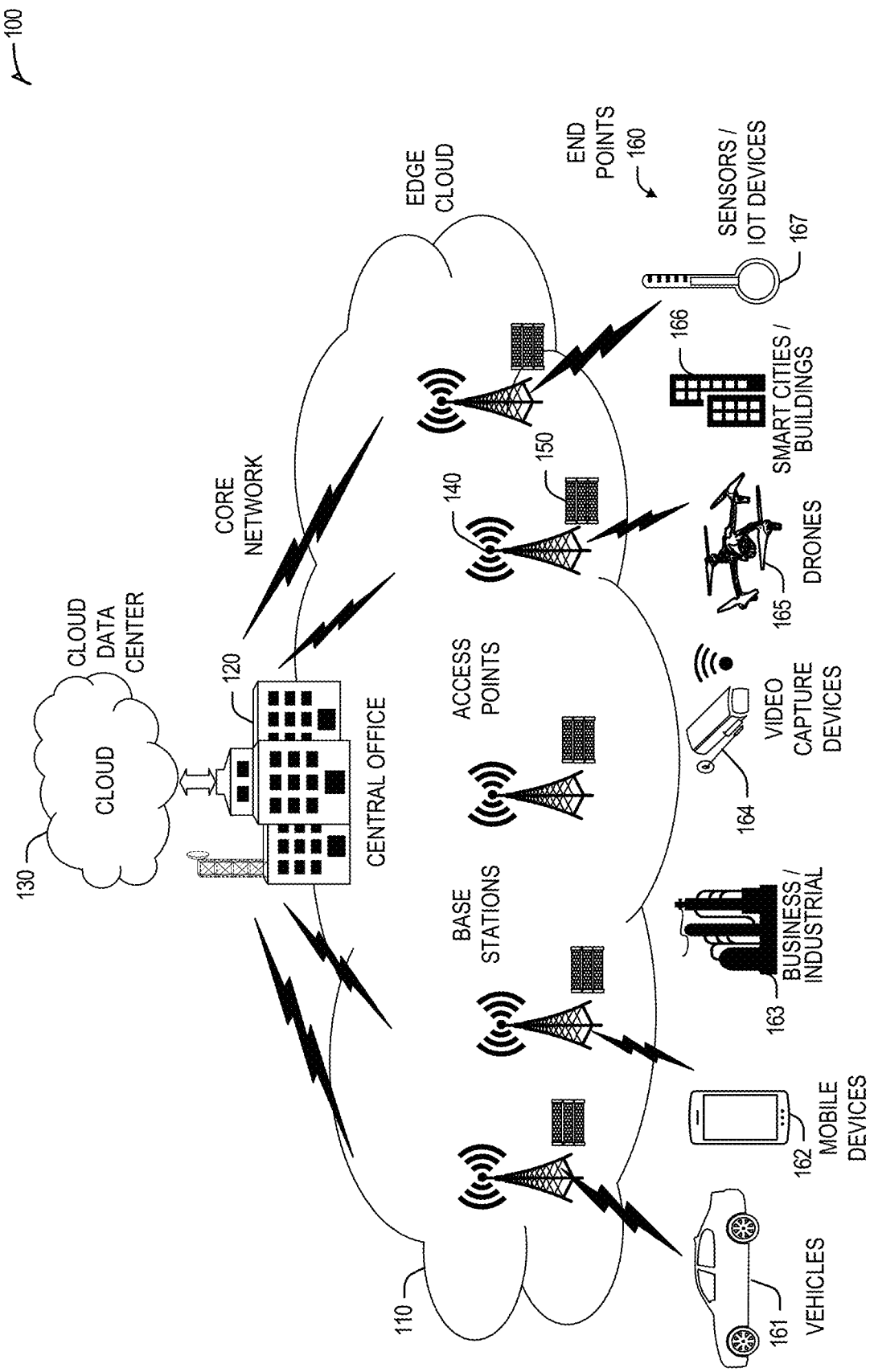
FIG. 1 illustrates an overview of an edge cloud configuration for edge computing.

FIG. 1 is a block diagram 100 showing an overview of a configuration for edge computing, which includes a layer of processing referred to in many of the following examples as an "edge cloud". As shown, the edge cloud 110 is co-located at an edge location, such as an access point or base station 140, a local processing hub 150, or a central office 120, and thus may include multiple entities, devices, and equipment instances. The edge cloud 110 is located much closer to the endpoint (consumer and producer) data sources 160 (e.g., autonomous vehicles 161, user equipment 162, business and industrial equipment 163, video capture devices 164, drones 165, smart cities and building devices 166, sensors and IoT devices 167, etc.) than the cloud data center 130. Compute, memory, and storage resources which are offered at the edges in the edge cloud 110 are critical to providing ultra-low latency response times for services and functions used by the endpoint data sources 160 as well as reduce network backhaul traffic from the edge cloud 110 toward cloud data center 130 thus improving energy consumption and overall network usages among other benefits.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power might be constrained. Thus, edge computing attempts to reduce the amount of resources needed for network services, through the distribution of more resources which are located closer both geographically and in network access time. In this manner, edge computing attempts to bring the compute resources to the workload data where appropriate, or, bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, which may use of a compute platform (e.g., x86 or ARM compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 2:
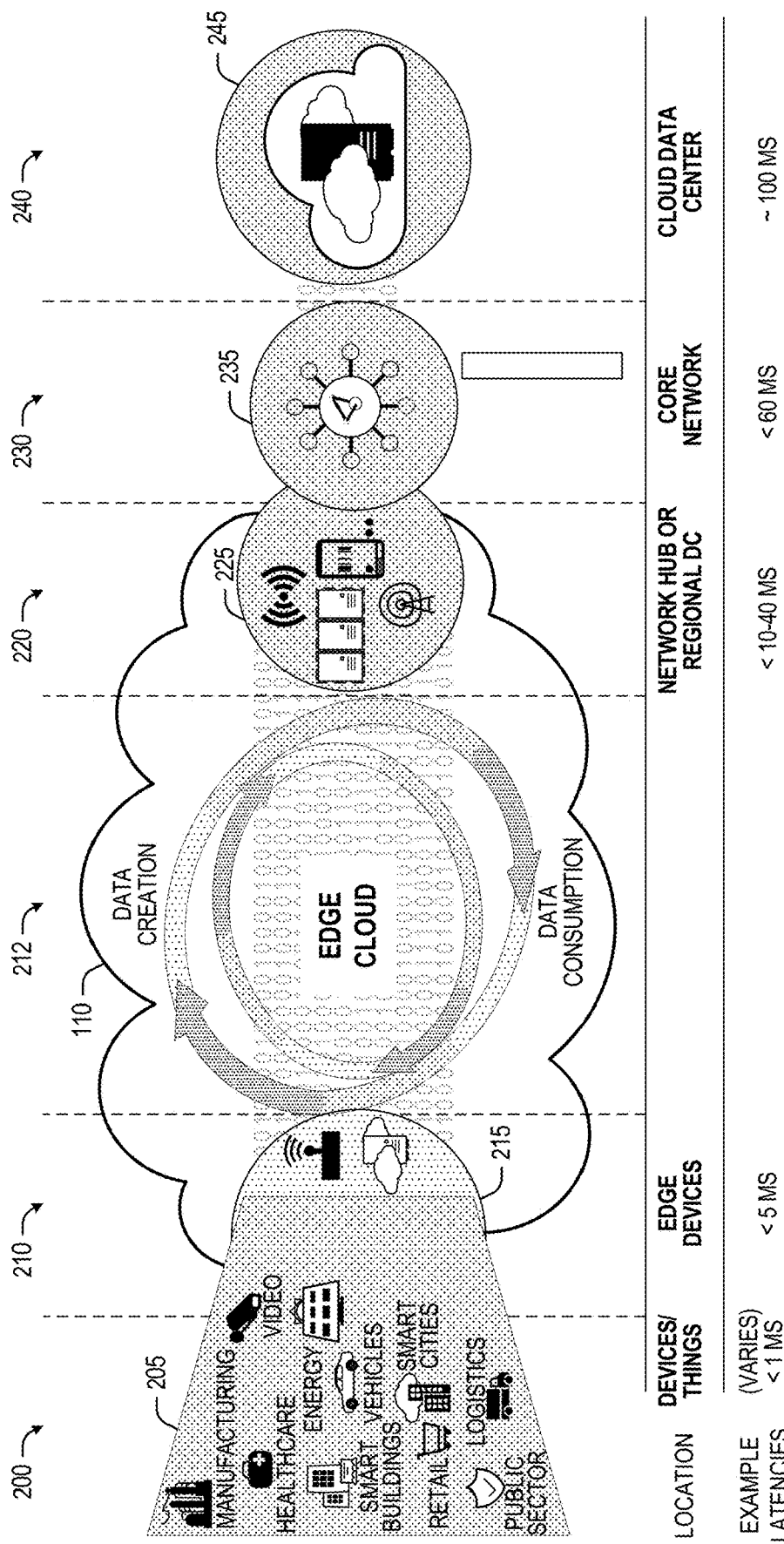
FIG. 2 illustrates operational layers among endpoints, an edge cloud, and cloud computing environments.

FIG. 2 illustrates operational layers among endpoints, an edge cloud, and cloud computing environments. Specifically, FIG. 2 depicts examples of computational use cases 205, utilizing the edge cloud 110 among multiple illustrative layers of network computing. The layers begin at an endpoint (devices and things) layer 200, which accesses the edge cloud 110 to conduct data creation, analysis, and data consumption activities. The edge cloud 110 may span multiple network layers, such as an edge devices layer 210 having gateways, on-premise servers, or network equipment (nodes 215) located in physically proximate edge systems; a network access layer 220, encompassing base stations, radio processing units, network hubs, regional data centers (DC), or local network equipment (equipment 225); and any equipment, devices, or nodes located therebetween (in layer 212, not illustrated in detail). The network communications within the edge cloud 110 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 200, under 5 ms at the edge devices layer 210, to even between 10 to 40 ms when communicating with nodes at the network access layer 220. Beyond the edge cloud 110 are core network 230 and cloud data center 240 layers, each with increasing latency (e.g., between 50-60 ms at the core network layer 230, to 100 or more ms at the cloud data center layer). As a result, operations at a core network data center 235 or a cloud data center 245, with latencies of at least 50 to 100 ms or more, will not be able to accomplish many time-critical functions of the use cases 205. Each of these latency values are provided for purposes of illustration and contrast; it will be understood that the use of other access network mediums and technologies may further reduce the latencies. In some examples, respective portions of the network may be categorized as "close edge", "local edge", "near edge", "middle edge", or "far edge" layers, relative to a network source and destination. For instance, from the perspective of the core network data center 235 or a cloud data center 245, a central office or content data network may be considered as being located within a "near edge" layer ("near" to the cloud, having high latency values when communicating with the devices and endpoints of the use cases 205), whereas an access point, base station, on-premise server, or network gateway may be considered as located within a "far edge" layer ("far" from the cloud, having low latency values when communicating with the devices and endpoints of the use cases 205). It will be understood that other categorizations of a particular network layer as constituting a "close", "local", "near", "middle", or "far" edge may be based on latency, distance, number of network hops, or other measurable characteristics, as measured from a source in any of the network layers 200-240.

The various use cases 205 may access resources under usage pressure from incoming streams, due to multiple services utilizing the edge cloud. To achieve results with low latency, the services executed within the edge cloud 110 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to SLA, the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 110 may provide the ability to serve and respond to multiple applications of the use cases 205 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS), Edge as a Service (EaaS), standard processes, etc.), which cannot leverage conventional cloud computing due to latency or other limitations.

However, with the advantages of edge computing comes the following caveats. The devices located at the edge may be resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because edge locations may be unmanned and may even need permissioned access (e.g., when housed in a third-party location). Such issues are magnified in the edge cloud 110 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 110 (network layers 200-240), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the Examples provided herein, a client computing node may be embodied as any type of endpoint component, device, appliance, or other thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 110.

As such, the edge cloud 110 is formed from network components and functional features operated by and within edge gateway nodes, edge aggregation nodes, or other edge computing nodes among network layers 210-230. The edge cloud 110 thus may be embodied as any type of network that provides edge computing and/or storage resources which are proximately located to radio access network (RAN) capable endpoint devices (e.g., mobile computing devices, IoT devices, smart devices, etc., which may be compatible with Open RAN (O-RAN) specifications promulgated by the O-RAN Alliance), which are discussed herein. In other words, the edge cloud 110 may be envisioned as an "edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., Wi-Fi, long-range wireless, wired networks including optical networks) may also be utilized in place of or in combination with such 3GPP carrier networks.

The network components of the edge cloud 110 may be servers, multi-tenant servers, appliance computing devices, and/or any other type of computing devices. For example, the edge cloud 110 may include an appliance computing device that is a self-contained electronic device including a housing, a chassis, a case or a shell. In some circumstances, the housing may be dimensioned for portability such that it can be carried by a human and/or shipped. Example housings may include materials that form one or more exterior surfaces that partially or fully protect contents of the appliance, in which protection may include weather protection, hazardous environment protection (e.g., EMI, vibration, extreme temperatures), and/or enable submergibility. Example housings may include power circuitry to provide power for stationary and/or portable implementations, such as AC power inputs, DC power inputs, AC/DC or DC/AC converter(s), power regulators, transformers, charging circuitry, batteries, wired inputs and/or wireless power inputs. Example housings and/or surfaces thereof may include or connect to mounting hardware to enable attachment to structures such as buildings, telecommunication structures (e.g., poles, antenna structures, etc.) and/or racks (e.g., server racks, blade mounts, sleds, etc.). A server rack may refer to a structure that is designed specifically to house technical equipment including routers, switches, hubs, servers (including CPU and/or GPU-based compute devices), data storage devices (e.g., storage area network (SAN) devices), or other types of computing or networking devices. The rack may make it possible to securely hold multiple pieces of equipment in one area. In some cases, the rack may include one or more sleds. A sled may refer to a housing that allows for a number of various compute, GPU, and/or storage devices to be housed in a position of a rack (e.g., a 4 unit (4U)-sized or other-sized unit). The sled may allow for the devices housed within it to be hot-swappable in some instances. Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein and/or attached thereto. Output devices may include displays, touchscreens, lights, LEDs, speakers, I/O ports (e.g., USB), etc. In some circumstances, edge devices are devices presented in the network for a specific purpose (e.g., a traffic light), but may have processing and/or other capacities that may be utilized for other purposes. Such edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 8. The edge cloud 110 may also include one or more servers and/or one or more multi-tenant servers. Such a server may include an operating system and implement a virtual computing environment. A virtual computing environment may include a hypervisor managing (e.g., spawning, deploying, destroying, etc.) one or more virtual machines, one or more containers, etc. Such virtual computing environments provide an execution environment in which one or more applications and/or other software, code or scripts may execute while being isolated from one or more other applications, software, code or scripts.

Figure 3:
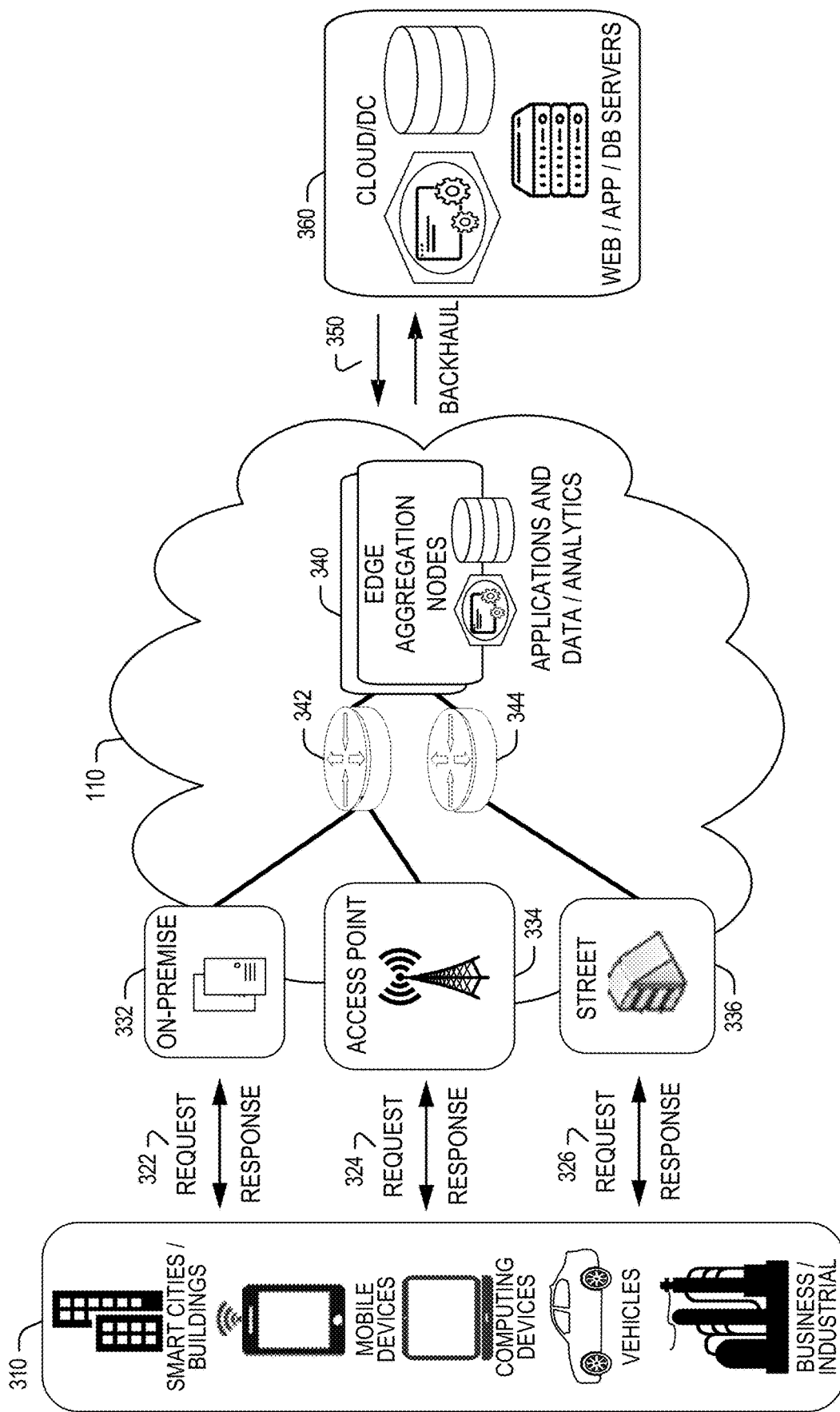
FIG. 3 illustrates an example approach for networking and services in an edge computing system.

In FIG. 3, various client endpoints 310 (in the form of mobile devices, computers, autonomous vehicles, business computing equipment, industrial processing equipment) exchange requests and responses that are specific to the type of endpoint network aggregation. For instance, client endpoints 310 may obtain network access via a wired broadband network, by exchanging requests and responses 322 through an on-premise network system 332. Some client endpoints 310, such as mobile computing devices, may obtain network access via a wireless broadband network, by exchanging requests and responses 324 through an access point (e.g., cellular network tower) 334. Some client endpoints 310, such as autonomous vehicles may obtain network access for requests and responses 326 via a wireless vehicular network through a street-located network system 336. However, regardless of the type of network access, the TSP may deploy aggregation points 342, 344 within the edge cloud 110 to aggregate traffic and requests. Thus, within the edge cloud 110, the TSP may deploy various compute and storage resources, such as at edge aggregation nodes 340, to provide requested content. The edge aggregation nodes 340 and other systems of the edge cloud 110 are connected to a cloud or data center 360, which uses a backhaul network 350 to fulfill higher-latency requests from a cloud/data center for websites, applications, database servers, etc. Additional or consolidated instances of the edge aggregation nodes 340 and the aggregation points 342, 344, including those deployed on a single server framework, may also be present within the edge cloud 110 or other areas of the TSP infrastructure.

B. Usage of Containers in Edge Computing

Figure 4:
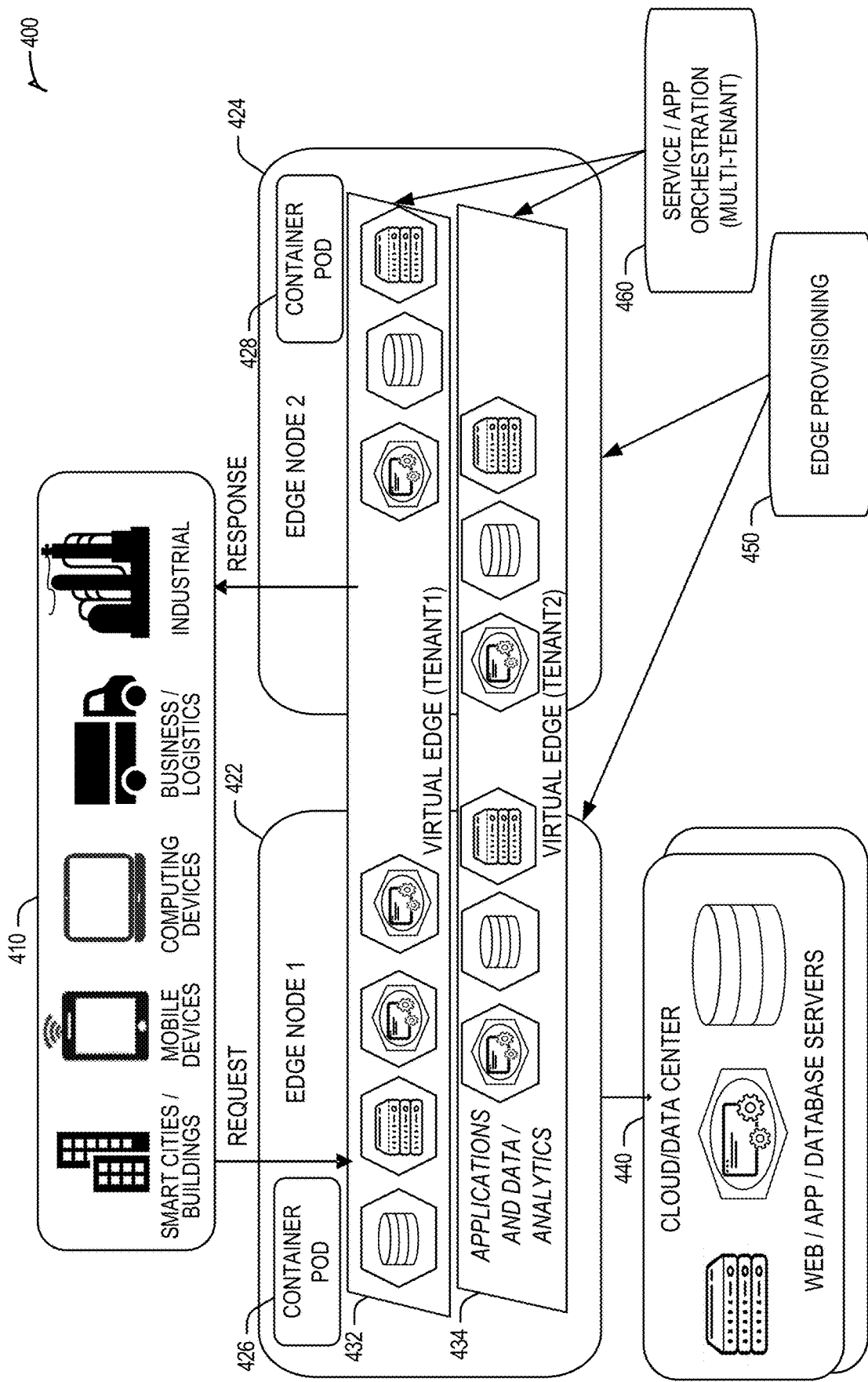
FIG. 4 illustrates deployment of a virtual edge configuration in an edge computing system operated among multiple edge nodes and multiple tenants.

FIG. 4 illustrates deployment and orchestration for virtualized and container-based edge configurations across an edge computing system operated among multiple edge nodes and multiple tenants (e.g., users, providers) which use such edge nodes. Specifically, FIG. 4 depicts coordination of a first edge node 422 and a second edge node 424 in an edge computing system 400, to fulfill requests and responses for various client endpoints 410 (e.g., smart cities/building systems, mobile devices, computing devices, business/logistics systems, industrial systems, etc.), which access various virtual edge instances. Here, the virtual edge instances 432, 434 provide edge compute capabilities and processing in an edge cloud, with access to a cloud/data center 440 for higher-latency requests for websites, applications, database servers, etc. However, the edge cloud enables coordination of processing among multiple edge nodes for multiple tenants or entities.

In the example of FIG. 4, these virtual edge instances include: a first virtual edge 432, offered to a first tenant (Tenant 1), which offers a first combination of edge storage, computing, and services; and a second virtual edge 434, offering a second combination of edge storage, computing, and services. The virtual edge instances 432, 434 are distributed among the edge nodes 422, 424, and may include scenarios in which a request and response are fulfilled from the same or different edge nodes. The configuration of the edge nodes 422, 424 to operate in a distributed yet coordinated fashion occurs based on edge provisioning functions 450. The functionality of the edge nodes 422, 424 to provide coordinated operation for applications and services, among multiple tenants, occurs based on orchestration functions 460.

It should be understood that some of the devices in 410 are multi-tenant devices where Tenant 1 may function within a tenant1 'slice' while a Tenant 2 may function within a tenant2 slice (and, in further examples, additional or sub-tenants may exist; and each tenant may even be specifically entitled and transactionally tied to a specific set of features all the way day to specific hardware features). A trusted multi-tenant device may further contain a tenant specific cryptographic key such that the combination of key and slice may be considered a "root of trust" (RoT) or tenant specific RoT. A RoT may further be computed dynamically composed using a DICE (Device Identity Composition Engine) architecture such that a single DICE hardware building block may be used to construct layered trusted computing base contexts for layering of device capabilities (such as a Field Programmable Gate Array (FPGA)). The RoT may further be used for a trusted computing context to enable a "fan-out" that is useful for supporting multi-tenancy. Within a multi-tenant environment, the respective edge nodes 422, 424 may operate as security feature enforcement points for local resources allocated to multiple tenants per node. Additionally, tenant runtime and application execution (e.g., in instances 432, 434) may serve as an enforcement point for a security feature that creates a virtual edge abstraction of resources spanning potentially multiple physical hosting platforms. Finally, the orchestration functions 460 at an orchestration entity may operate as a security feature enforcement point for marshalling resources along tenant boundaries.

Edge computing nodes may partition resources (memory, central processing unit (CPU), graphics processing unit (GPU), interrupt controller, input/output (I/O) controller, memory controller, bus controller, etc.) where respective partitionings may contain a RoT capability and where fan-out and layering according to a DICE model may further be applied to Edge Nodes. Cloud computing nodes may use containers, FaaS engines, Servlets, servers, or other computation abstraction that may be partitioned according to a DICE layering and fan-out structure to support a RoT context for each. Accordingly, the respective RoTs spanning devices 410, 422, and 440 may coordinate the establishment of a distributed trusted computing base (DTCB) such that a tenant-specific virtual trusted secure channel linking all elements end to end can be established.

Further, it will be understood that a container may have data or workload specific keys protecting its content from a previous edge node. As part of migration of a container, a pod controller at a source edge node may obtain a migration key from a target edge node pod controller where the migration key is used to wrap the container-specific keys. When the container/pod is migrated to the target edge node, the unwrapping key is exposed to the pod controller that then decrypts the wrapped keys. The keys may now be used to perform operations on container specific data. The migration functions may be gated by properly attested edge nodes and pod managers (as described above).

In further examples, an edge computing system is extended to provide for orchestration of multiple applications through the use of containers (a contained, deployable unit of software that provides code and needed dependencies) in a multi-owner, multi-tenant environment. A multi-tenant orchestrator may be used to perform key management, trust anchor management, and other security functions related to the provisioning and lifecycle of the trusted 'slice' concept in FIG. 4. For instance, an edge computing system may be configured to fulfill requests and responses for various client endpoints from multiple virtual edge instances (and, from a cloud or remote data center). The use of these virtual edge instances may support multiple tenants and multiple applications (e.g., augmented reality (AR)/virtual reality (VR), enterprise applications, content delivery, gaming, compute offload) simultaneously. Further, there may be multiple types of applications within the virtual edge instances (e.g., normal applications; latency sensitive applications; latency-critical applications; user plane applications; networking applications; etc.). The virtual edge instances may also be spanned across systems of multiple owners at different geographic locations (or, respective computing systems and resources which are co-owned or co-managed by multiple owners).

For instance, each edge node 422, 424 may implement the use of containers, such as with the use of a container "pod" 426, 428 providing a group of one or more containers. In a setting that uses one or more container pods, a pod controller or orchestrator is responsible for local control and orchestration of the containers in the pod. Various edge node resources (e.g., storage, compute, services, depicted with hexagons) provided for the respective edge slices 432, 434 are partitioned according to the needs of each container.

With the use of container pods, a pod controller oversees the partitioning and allocation of containers and resources. The pod controller receives instructions from an orchestrator (e.g., orchestrator 460) that instructs the controller on how best to partition physical resources and for what duration, such as by receiving key performance indicator (KPI) targets based on SLA contracts. The pod controller determines which container requires which resources and for how long in order to complete the workload and satisfy the SLA. The pod controller also manages container lifecycle operations such as: creating the container, provisioning it with resources and applications, coordinating intermediate results between multiple containers working on a distributed application together, dismantling containers when workload completes, and the like. Additionally, a pod controller may serve a security role that prevents assignment of resources until the right tenant authenticates or prevents provisioning of data or a workload to a container until an attestation result is satisfied.

Also, with the use of container pods, tenant boundaries can still exist but in the context of each pod of containers. If each tenant specific pod has a tenant specific pod controller, there will be a shared pod controller that consolidates resource allocation requests to avoid potential resource starvation situations. Further controls may be provided to ensure attestation and trustworthiness of the pod and pod controller. For instance, the orchestrator 460 may provision an attestation verification policy to local pod controllers that perform attestation verification. If an attestation satisfies a policy for a first tenant pod controller but not a second tenant pod controller, then the second pod could be migrated to a different edge node that does satisfy it. Alternatively, the first pod may be allowed to execute and a different shared pod controller is installed and invoked prior to the second pod executing.

Figure 5:
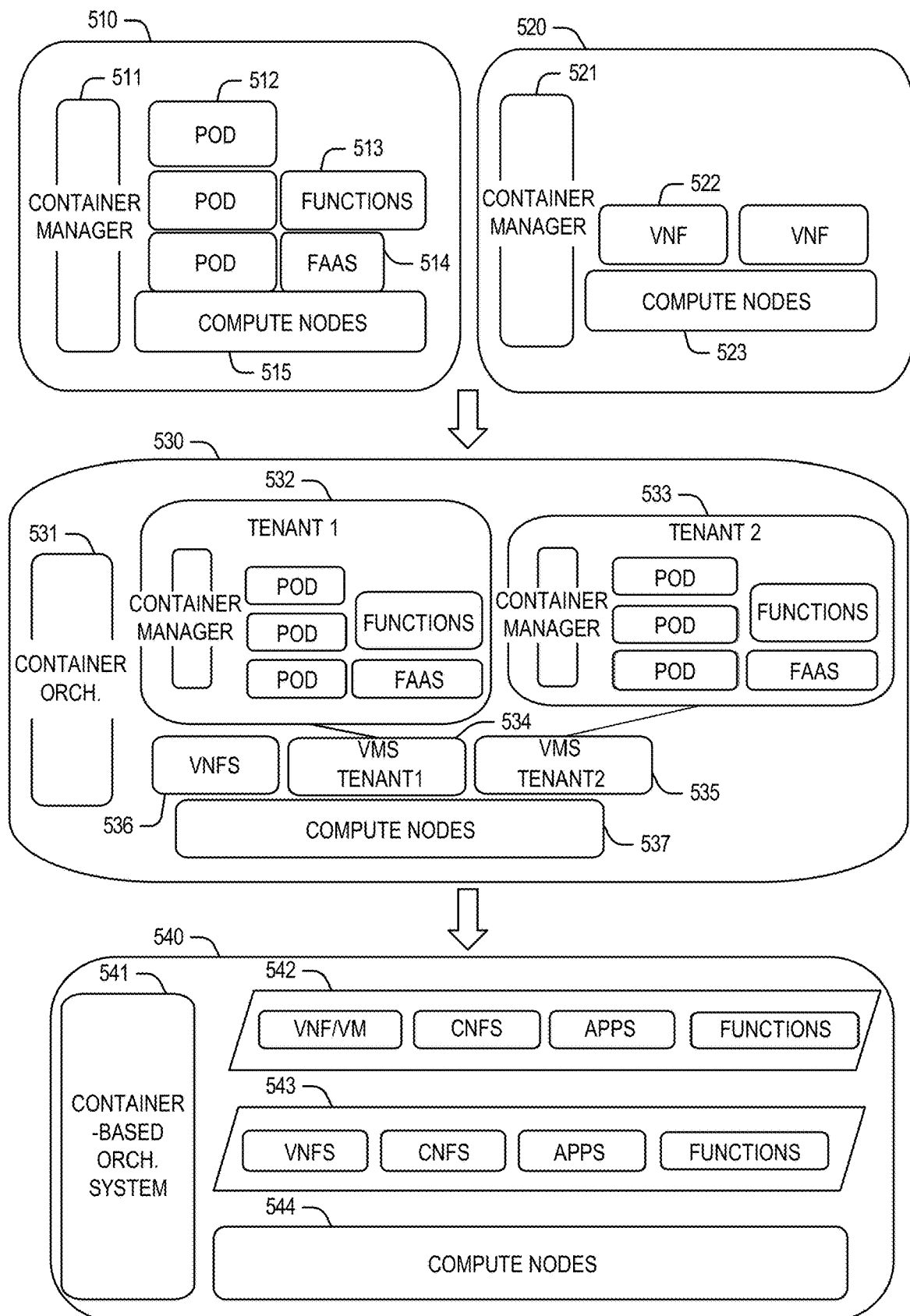
FIG. 5 illustrates various compute arrangements deploying containers in an edge computing system.

FIG. 5 illustrates additional compute arrangements deploying containers in an edge computing system. As a simplified example, system arrangements 510, 520 depict settings in which a pod controller (e.g., container managers 511, 521, and container orchestrator 531) is adapted to launch containerized pods, functions, and functions-as-a-service instances through execution via computing nodes (515 in arrangement 510), or to separately execute containerized virtualized network functions through execution via computing nodes (523 in arrangement 520). This arrangement is adapted for use of multiple tenants in system arrangement 530 (using computing nodes 537), where containerized pods (e.g., pods 512), functions (e.g., functions 513, VNFs 522, 536), and functions-as-a-service instances (e.g., FaaS instance 514) are launched within virtual machines (e.g., VMs 534, 535 for tenants 532, 533) specific to respective tenants (aside the execution of virtualized network functions). This arrangement is further adapted for use in system arrangement 540, which provides containers 542, 543, or execution of the various functions, applications, and functions on computing nodes 544, as coordinated by an container-based orchestration system 541.

The system arrangements of depicted in FIG. 5 provides an architecture that treats VMs, Containers, and Functions equally in terms of application composition (and resulting applications are combinations of these three ingredients). Each ingredient may involve use of one or more accelerator (FPGA, ASIC) components as a local backend. In this manner, applications can be split across multiple edge owners, coordinated by an orchestrator.

In the context of FIG. 5, the pod controller/container manager, container orchestrator, and individual nodes may provide a security enforcement point. However, tenant isolation may be orchestrated where the resources allocated to a tenant are distinct from resources allocated to a second tenant, but edge owners cooperate to ensure resource allocations are not shared across tenant boundaries. Or, resource allocations could be isolated across tenant boundaries, as tenants could allow "use" via a subscription or transaction/contract basis. In these contexts, virtualization, containerization, enclaves and hardware partitioning schemes may be used by edge owners to enforce tenancy. Other isolation environments may include: bare metal (dedicated) equipment, virtual machines, containers, virtual machines on containers, or combinations thereof.

In further examples, aspects of software-defined or controlled silicon hardware, and other configurable hardware, may integrate with the applications, functions, and services an edge computing system. Software defined silicon (SDSi) may be used to ensure the ability for some resource or hardware ingredient to fulfill a contract or service level agreement, based on the ingredient's ability to remediate a portion of itself or the workload (e.g., by an upgrade, reconfiguration, or provision of new features within the hardware configuration itself).

C. Mobility and Multi-Access Edge Computing (MEC) in Edge Computing Settings

Figure 6:
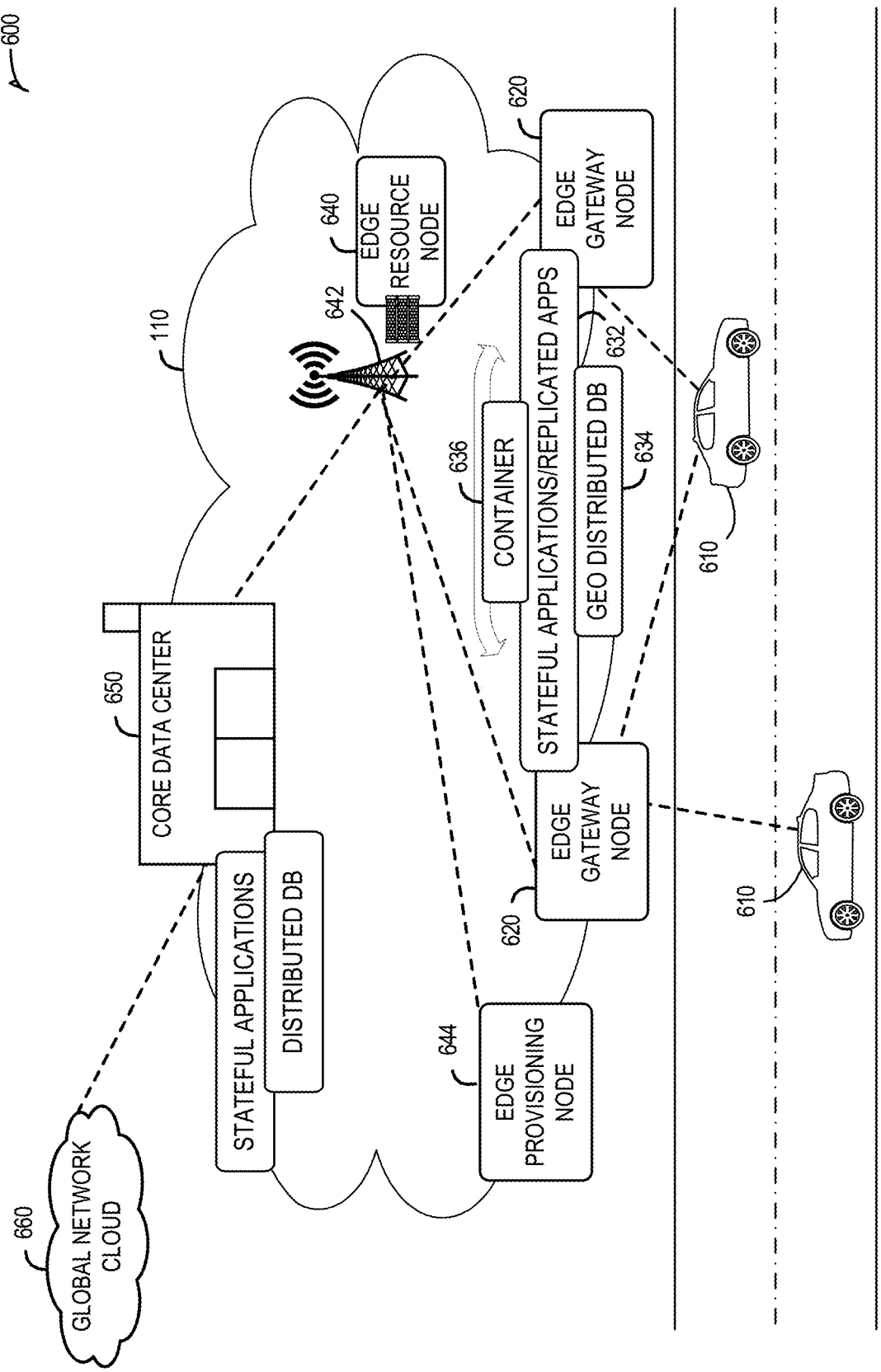
FIG. 6 illustrates a compute and communication use case involving mobile access to applications in an edge computing system.

It should be appreciated that the edge computing systems and arrangements discussed herein may be applicable in various solutions, services, and/or use cases involving mobility. As an example, FIG. 6 shows a simplified vehicle compute and communication use case involving mobile access to applications in an edge computing system 600 that implements an edge cloud 110. In this use case, respective client computing nodes 610 may be embodied as in-vehicle compute systems (e.g., in-vehicle navigation and/or infotainment systems) located in corresponding vehicles which communicate with the edge gateway nodes 620 during traversal of a roadway. For instance, the edge gateway nodes 620 may be located in a roadside cabinet or other enclosure built-into a structure having other, separate, mechanical utility, which may be placed along the roadway, at intersections of the roadway, or other locations near the roadway. As respective vehicles traverse along the roadway, the connection between its client computing node 610 and a particular edge gateway device 620 may propagate so as to maintain a consistent connection and context for the client computing node 610. Likewise, mobile edge nodes may aggregate at the high priority services or according to the throughput or latency resolution requirements for the underlying service(s) (e.g., in the case of drones). The respective edge gateway devices 620 include an amount of processing and storage capabilities and, as such, some processing and/or storage of data for the client computing nodes 610 may be performed on one or more of the edge gateway devices 620.

The edge gateway devices 620 may communicate with one or more edge resource nodes 640, which are illustratively embodied as compute servers, appliances or components located at or in a communication base station 642 (e.g., a base station of a cellular network). As discussed above, the respective edge resource nodes 640 include an amount of processing and storage capabilities and, as such, some processing and/or storage of data for the client computing nodes 610 may be performed on the edge resource node 640. For example, the processing of data that is less urgent or important may be performed by the edge resource node 640, while the processing of data that is of a higher urgency or importance may be performed by the edge gateway devices 620 (depending on, for example, the capabilities of each component, or information in the request indicating urgency or importance). Based on data access, data location or latency, work may continue on edge resource nodes when the processing priorities change during the processing activity. Likewise, configurable systems or hardware resources themselves can be activated (e.g., through a local orchestrator) to provide additional resources to meet the new demand (e.g., adapt the compute resources to the workload data).

The edge resource node(s) 640 also communicate with the core data center 650, which may include compute servers, appliances, and/or other components located in a central location (e.g., a central office of a cellular communication network). The core data center 650 may provide a gateway to the global network cloud 660 (e.g., the Internet) for the edge cloud 110 operations formed by the edge resource node(s) 640 and the edge gateway devices 620. Additionally, in some examples, the core data center 650 may include an amount of processing and storage capabilities and, as such, some processing and/or storage of data for the client compute devices may be performed on the core data center 650 (e.g., processing of low urgency or importance, or high complexity).

The edge gateway nodes 620 or the edge resource nodes 640 may offer the use of stateful applications 632 and a geographic distributed database 634. Although the applications 632 and database 634 are illustrated as being horizontally distributed at a layer of the edge cloud 110, it will be understood that resources, services, or other components of the application may be vertically distributed throughout the edge cloud (including, part of the application executed at the client computing node 610, other parts at the edge gateway nodes 620 or the edge resource nodes 640, etc.). Additionally, as stated previously, there can be peer relationships at any level to meet service objectives and obligations. Further, the data for a specific client or application can move from edge to edge based on changing conditions (e.g., based on acceleration resource availability, following the car movement, etc.). For instance, based on the "rate of decay" of access, prediction can be made to identify the next owner to continue, or when the data or computational access will no longer be viable. These and other services may be utilized to complete the work that is needed to keep the transaction compliant and lossless.

In further scenarios, a container 636 (or pod of containers) may be flexibly migrated from an edge node 620 to other edge nodes (e.g., 620, 640, etc.) such that the container with an application and workload does not need to be reconstituted, re-compiled, re-interpreted in order for migration to work. However, in such settings, there may be some remedial or "swizzling" translation operations applied. For example, the physical hardware at node 640 may differ from edge gateway node 620 and therefore, the hardware abstraction layer (HAL) that makes up the bottom edge of the container will be re-mapped to the physical layer of the target edge node. This may involve some form of late-binding technique, such as binary translation of the HAL from the container native format to the physical hardware format, or may involve mapping interfaces and operations. A pod controller may be used to drive the interface mapping as part of the container lifecycle, which includes migration to/from different hardware environments.

The scenarios encompassed by FIG. 6 may utilize various types of mobile edge nodes, such as an edge node hosted in a vehicle (car/truck/tram/train) or other mobile unit, as the edge node will move to other geographic locations along the platform hosting it. With vehicle-to-vehicle communications, individual vehicles may even act as network edge nodes for other cars, (e.g., to perform caching, reporting, data aggregation, etc.). Thus, it will be understood that the application components provided in various edge nodes may be distributed in static or mobile settings, including coordination between some functions or operations at individual endpoint devices or the edge gateway nodes 620, some others at the edge resource node 640, and others in the core data center 650 or global network cloud 660.

In further configurations, the edge computing system may implement FaaS computing capabilities through the use of respective executable applications and functions. In an example, a developer writes function code (e.g., "computer code" herein) representing one or more computer functions, and the function code is uploaded to a FaaS platform provided by, for example, an edge node or data center. A trigger such as, for example, a service use case or an edge processing event, initiates the execution of the function code with the FaaS platform.

In an example of FaaS, a container is used to provide an environment in which function code (e.g., an application which may be provided by a third party) is executed. The container may be any isolated-execution entity such as a process, a Docker or Kubernetes container, a virtual machine, etc. Within the edge computing system, various datacenter, edge, and endpoint (including mobile) devices are used to "spin up" functions (e.g., activate and/or allocate function actions) that are scaled on demand. The function code gets executed on the physical infrastructure (e.g., edge computing node) device and underlying virtualized containers. Finally, container is "spun down" (e.g., deactivated and/or deallocated) on the infrastructure in response to the execution being completed.

Further aspects of FaaS may enable deployment of edge functions in a service fashion, including a support of respective functions that support edge computing as a service (Edge-as-a-Service or "EaaS"). Additional features of FaaS may include: a granular billing component that enables customers (e.g., computer code developers) to pay only when their code gets executed; common data storage to store data for reuse by one or more functions; orchestration and management among individual functions; function execution management, parallelism, and consolidation; management of container and function memory spaces; coordination of acceleration resources available for functions; and distribution of functions between containers (including "warm" containers, already deployed or operating, versus "cold" which require initialization, deployment, or configuration).

The edge computing system 600 can include or be in communication with an edge provisioning node 644. The edge provisioning node 644 can distribute software such as the example computer readable instructions 882 of FIG. 8, to various receiving parties for implementing any of the methods described herein. The example edge provisioning node 644 may be implemented by any computer server, home server, content delivery network, virtual server, software distribution system, central facility, storage device, storage node, data facility, cloud service, etc., capable of storing and/or transmitting software instructions (e.g., code, scripts, executable binaries, containers, packages, compressed files, and/or derivatives thereof) to other computing devices. Component(s) of the example edge provisioning node 644 may be located in a cloud, in a local area network, in an edge network, in a wide area network, on the Internet, and/or any other location communicatively coupled with the receiving party(ies). The receiving parties may be customers, clients, associates, users, etc. of the entity owning and/or operating the edge provisioning node 644. For example, the entity that owns and/or operates the edge provisioning node 644 may be a developer, a seller, and/or a licensor (or a customer and/or consumer thereof) of software instructions such as the example computer readable instructions 882 of FIG. 8. The receiving parties may be consumers, service providers, users, retailers, OEMs, etc., who purchase and/or license the software instructions for use and/or re-sale and/or sub-licensing.

In an example, edge provisioning node 644 includes one or more servers and one or more storage devices. The storage devices host computer readable instructions such as the example computer readable instructions 882 of FIG. 8, as described below. Similarly to edge gateway devices 620 described above, the one or more servers of the edge provisioning node 644 are in communication with a base station 642 or other network communication entity. In some examples, the one or more servers are responsive to requests to transmit the software instructions to a requesting party as part of a commercial transaction. Payment for the delivery, sale, and/or license of the software instructions may be handled by the one or more servers of the software distribution platform and/or via a third-party payment entity. The servers enable purchasers and/or licensors to download the computer readable instructions 882 from the edge provisioning node 644. For example, the software instructions, which may correspond to the example computer readable instructions 882 of FIG. 8, may be downloaded to the example processor platform/s, which is to execute the computer readable instructions 882 to implement the methods described herein.

In some examples, the processor platform(s) that execute the computer readable instructions 882 can be physically located in different geographic locations, legal jurisdictions, etc. In some examples, one or more servers of the edge provisioning node 644 periodically offer, transmit, and/or force updates to the software instructions (e.g., the example computer readable instructions 882 of FIG. 8) to ensure improvements, patches, updates, etc. are distributed and applied to the software instructions implemented at the end user devices. In some examples, different components of the computer readable instructions 882 can be distributed from different sources and/or to different processor platforms; for example, different libraries, plug-ins, components, and other types of compute modules, whether compiled or interpreted, can be distributed from different sources and/or to different processor platforms. For example, a portion of the software instructions (e.g., a script that is not, in itself, executable) may be distributed from a first source while an interpreter (capable of executing the script) may be distributed from a second source.

Figure 7:
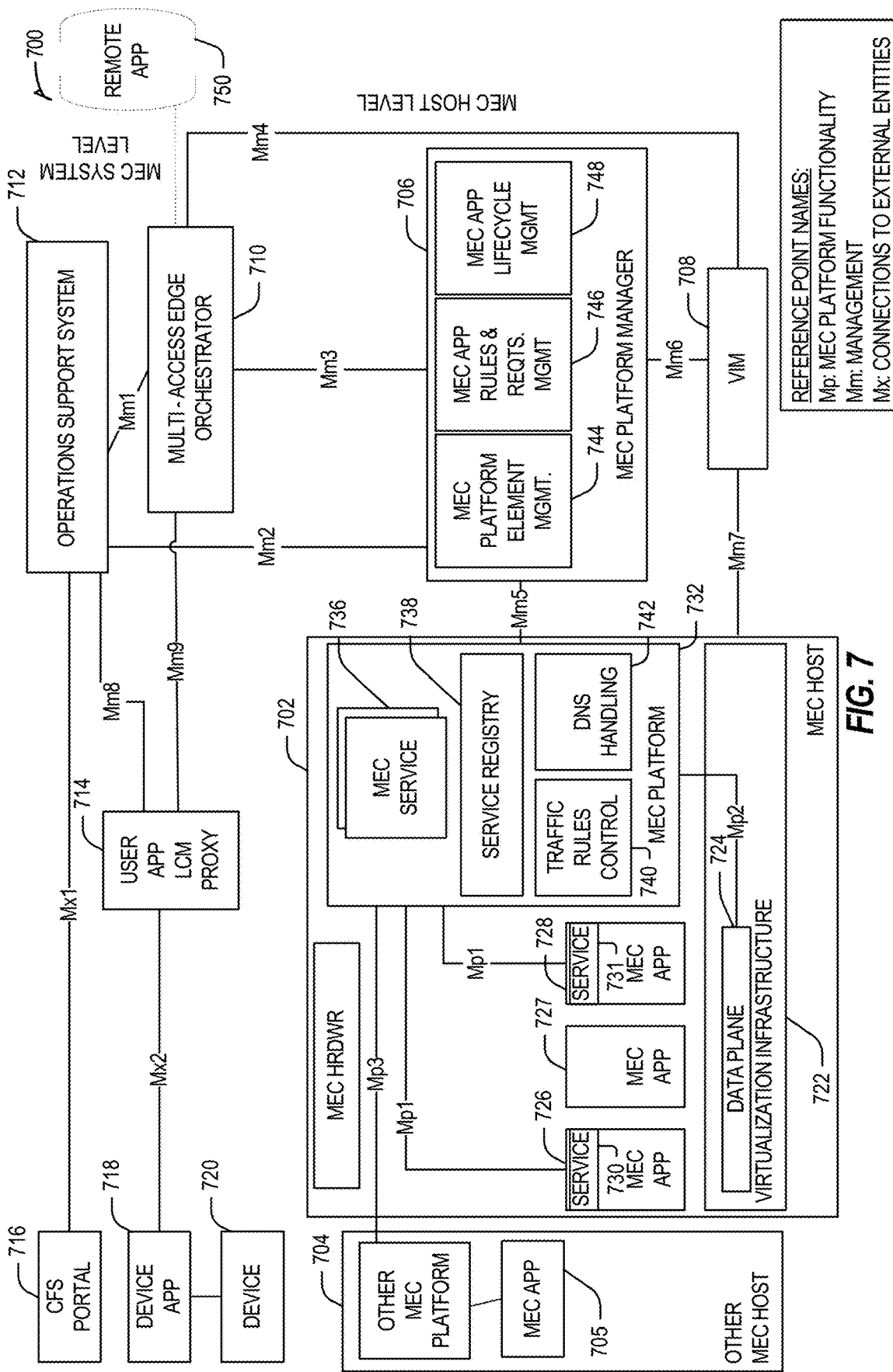
FIG. 7 illustrates an example mobile edge system reference architecture, arranged according to an ETSI Multi-Access Edge Computing (MEC) specification.

FIG. 7 illustrates a mobile edge system reference architecture (or MEC architecture) 700, such as is indicated by ETSI MEC specifications. FIG. 7 specifically illustrates a MEC architecture 700 with MEC hosts 702 and 704 providing functionalities in accordance with the ETSI GS MEC-003 specification. In some aspects, enhancements to the MEC platform 732 and the MEC platform manager 706 may be used for providing specific computing functions within the MEC architecture 700.

Referring to FIG. 7, the MEC network architecture 700 can include MEC hosts 702 and 704, a virtualization infrastructure manager (VIM) 708, an MEC platform manager 706, an MEC orchestrator 710, an operations support system 712, a user app proxy 714, a UE app 718 running on UE 720, and CFS portal 716. The MEC host 702 can include a MEC platform 732 with filtering rules control component 740, a DNS handling component 742, a service registry 738, and MEC services 736. The MEC services 736 can include at least one scheduler, which can be used to select resources for instantiating MEC apps (or NFVs) 726, 727, and 728 upon virtualization infrastructure 722. The MEC apps 726 and 728 can be configured to provide services 730 and 731, which can include processing network communications traffic of different types associated with one or more wireless connections (e.g., connections to one or more RAN (e.g., O-RAN) or telecom-core network entities). The MEC app 705 instantiated within MEC host 704 can be similar to the MEC apps 726-7728 instantiated within MEC host 702. The virtualization infrastructure 722 includes a data plane 724 coupled to the MEC platform via an MP2 interface. Additional interfaces between various network entities of the MEC architecture 700 are illustrated in FIG. 7.

The MEC platform manager 706 can include MEC platform element management component 744, MEC app rules and requirements management component 746, and MEC app lifecycle management component 748. The various entities within the MEC architecture 700 can perform functionalities as disclosed by the ETSI GS MEC-003 specification. In some aspects, the remote application (or app) 750 is configured to communicate with the MEC host 702 (e.g., with the MEC apps 726-7728) via the MEC orchestrator 710 and the MEC platform manager 706.

D. Computing Architectures and Systems

In further examples, any of the computing nodes or devices discussed with reference to the present edge computing systems and environment may be fulfilled based on the components depicted in FIG. 8. Respective edge computing nodes may be embodied as a type of device, appliance, computer, or other "thing" capable of communicating with other edge, networking, or endpoint components. For example, an edge compute device may be embodied as a personal computer, server, smartphone, a mobile compute device, a smart appliance, an in-vehicle compute system (e.g., a navigation system), a self-contained device having an outer case, shell, etc., or other device or system capable of performing the described functions.

Figure 8:
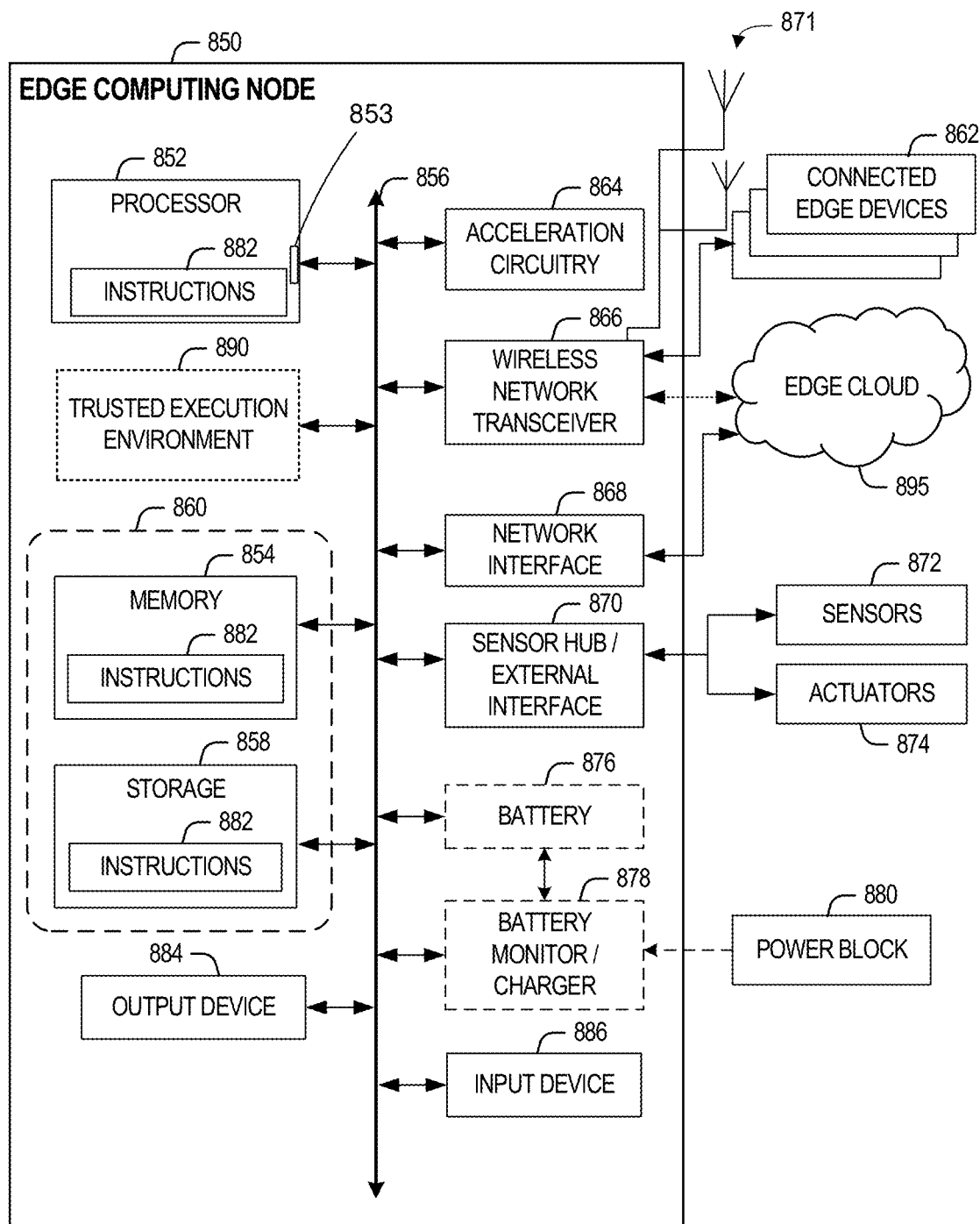
FIG. 8 provides a further overview of example components within a computing device in an edge computing system.

In a more detailed example, FIG. 8 illustrates a block diagram of an example of components that may be present in an edge computing node 850 for implementing the techniques (e.g., operations, processes, methods, and methodologies) described herein. The edge computing node 850 may include any combinations of the hardware or logical components referenced herein, and it may include or couple with any device usable with an edge communication network or a combination of such networks. The components may be implemented as integrated circuits (ICs), portions thereof, discrete electronic devices, or other modules, instruction sets, programmable logic or algorithms, hardware, hardware accelerators, software, firmware, or a combination thereof adapted in the edge computing node 850, or as components otherwise incorporated within a chassis of a larger system.

The edge computing device 850 may include processing circuitry in the form of a processor 852, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 852 may be a part of a system on a chip (SoC) in which the processor 852 and other components are formed into a single integrated circuit, or a single package, such as the Edison™ or Galileo™ SoC boards from Intel Corporation, Santa Clara, California. As an example, the processor 852 may include an Intel® Architecture Core™ based CPU processor, such as a Quark™, an Atom™, an i3, an i5, an i7, an i9, or an MCU-class processor, or another such processor available from Intel®. However, any number other processors may be used, such as available from Advanced Micro Devices, Inc. (AMD®) of Sunnyvale, California, a MIPS®-based design from MIPS Technologies, Inc. of Sunnyvale, California, an ARM®-based design licensed from ARM Holdings, Ltd. or a customer thereof, or their licensees or adopters. The processors may include units such as an A5-13 processor from Apple® Inc., a Snapdragon™ processor from Qualcomm® Technologies, Inc., or an OMAP™ processor from Texas Instruments, Inc. The processor 852 and accompanying circuitry may be provided in a single socket form factor, multiple socket form factor, or a variety of other formats, including in limited hardware configurations or configurations that include fewer than all elements shown in FIG. 8.

The processor 852 may communicate with a system memory 854 over an interconnect 856 (e.g., a bus) through an interconnect interface 853 of the processor. The interconnect interface 853 may include any input/output connection of the processor 852 that allows the processor 852 to be connected through interconnect 856 to other components of the edge computing node 850. The processor 852 may include one or more processors and/or any type of processing circuitry. Any number of memory devices may be used to provide for a given amount of system memory. As examples, the memory 754 may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples, the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or Mini-DIMMs.

To provide for persistent storage of information such as data, applications, operating systems and so forth, a storage 858 may also couple to the processor 852 via the interconnect 856. In an example, the storage 858 may be implemented via a solid-state disk drive (SSDD). Other devices that may be used for the storage 858 include flash memory cards, such as Secure Digital (SD) cards, microSD cards, eXtreme Digital (XD) picture cards, and the like, and Universal Serial Bus (USB) flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 858 may be on-die memory or registers associated with the processor 852. However, in some examples, the storage 858 may be implemented using a micro hard disk drive (HDD). Further, any number of new technologies may be used for the storage 858 in addition to, or instead of, the technologies described, such resistance change memories, phase change memories, holographic memories, or chemical memories, among others.

The components may communicate over the interconnect 856. The interconnect 856 may include any number of technologies, including industry standard architecture (ISA), extended ISA (EISA), peripheral component interconnect (PCI), peripheral component interconnect extended (PCIx), PCI express (PCIe), or any number of other technologies. The interconnect 856 may be a proprietary bus, for example, used in an SoC based system. Other bus systems may be included, such as an Inter-Integrated Circuit (I2C) interface, a Serial Peripheral Interface (SPI) interface, point to point interfaces, and a power bus, among others.

The interconnect 856 may couple the processor 852 to a transceiver 866, for communications with the connected edge devices 862. The transceiver 866 may be coupled to one or more antennas 871 of the edge computing node 850 to enable the edge computing node to wirelessly communicate with other edge computing nodes or other nodes in the wireless edge network. The transceiver 866 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 862. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 866 (or multiple transceivers) may communicate using multiple standards or radios for communications at a different range. For example, the edge computing node 850 may communicate with close devices, e.g., within about 10 meters, using a local transceiver based on Bluetooth Low Energy (BLE), or another low power radio, to save power. More distant connected edge devices 862, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 866 (e.g., a radio transceiver) may be included to communicate with devices or services in a cloud (e.g., an edge cloud 895) via local or wide area network protocols. The wireless network transceiver 866 may be a low-power wide-area (LPWA) transceiver that follows the IEEE 802.15.4, or IEEE 802.15.4g standards, among others. The edge computing node 850 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 866, as described herein. For example, the transceiver 866 may include a cellular transceiver that uses spread spectrum (SPA/SAS) communications for implementing high-speed communications. Further, any number of other protocols may be used, such as Wi-Fi® networks for medium speed communications and provision of network communications. The transceiver 866 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 868 may be included to provide a wired communication to nodes of the edge cloud 895 or to other devices, such as the connected edge devices 862 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 868 may be included to enable connecting to a second network, for example, a first NIC 868 providing communications to the cloud over Ethernet, and a second NIC 868 providing communications to other devices over another type of network.

Given the variety of types of applicable communications from the device to another component or network, applicable communications circuitry used by the device may include or be embodied by any one or more of components 864, 866, 868, or 870. Accordingly, in various examples, applicable means for communicating (e.g., receiving, transmitting, etc.) may be embodied by such communications circuitry.

The edge computing node 850 may include or be coupled to acceleration circuitry 864, which may be embodied by one or more artificial intelligence (AI) accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. These tasks also may include the specific edge computing tasks for service management and service operations discussed elsewhere in this document.

The interconnect 856 may couple the processor 852 to a sensor hub or external interface 870 that is used to connect additional devices or subsystems. The devices may include sensors 872, such as accelerometers, level sensors, flow sensors, optical light sensors, camera sensors, temperature sensors, global navigation system (e.g., GPS) sensors, pressure sensors, barometric pressure sensors, and the like. The hub or interface 870 further may be used to connect the edge computing node 850 to actuators 874, such as power switches, valve actuators, an audible sound generator, a visual warning device, and the like.

In some optional examples, various input/output (I/O) devices may be present within or connected to, the edge computing node 850. For example, a display or other output device 884 may be included to show information, such as sensor readings or actuator position. An input device 886, such as a touch screen or keypad may be included to accept input. An output device 884 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the edge computing node 850. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 876 may power the edge computing node 850, although, in examples in which the edge computing node 850 is mounted in a fixed location, it may have a power supply coupled to an electrical grid, or the battery may be used as a backup or for temporary capabilities. The battery 876 may be a lithium ion battery, or a metal-air battery, such as a zinc-air battery, an aluminum-air battery, a lithium-air battery, and the like.

A battery monitor/charger 878 may be included in the edge computing node 850 to track the state of charge (SoCh) of the battery 876, if included. The battery monitor/charger 878 may be used to monitor other parameters of the battery 876 to provide failure predictions, such as the state of health (SoH) and the state of function (SoF) of the battery 876. The battery monitor/charger 878 may include a battery monitoring integrated circuit, such as an LTC4020 or an LT7990 from Linear Technologies, an ADT7488A from ON Semiconductor of Phoenix Arizona, or an IC from the UCD90xxx family from Texas Instruments of Dallas, TX The battery monitor/charger 878 may communicate the information on the battery 876 to the processor 852 over the interconnect 856. The battery monitor/charger 878 may also include an analog-to-digital (ADC) converter that enables the processor 852 to directly monitor the voltage of the battery 876 or the current flow from the battery 876. The battery parameters may be used to determine actions that the edge computing node 850 may perform, such as transmission frequency, mesh network operation, sensing frequency, and the like.

A power block 880, or other power supply coupled to a grid, may be coupled with the battery monitor/charger 878 to charge the battery 876. In some examples, the power block 880 may be replaced with a wireless power receiver to obtain the power wirelessly, for example, through a loop antenna in the edge computing node 850. A wireless battery charging circuit, such as an LTC4020 chip from Linear Technologies of Milpitas, California, among others, may be included in the battery monitor/charger 878. The specific charging circuits may be selected based on the size of the battery 876, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 858 may include instructions 882 in the form of software, firmware, or hardware commands to implement the techniques described herein. Although such instructions 882 are shown as code blocks included in the memory 854 and the storage 858, it may be understood that any of the code blocks may be replaced with hardwired circuits, for example, built into an application specific integrated circuit (ASIC).

In an example, the instructions 882 provided via the memory 854, the storage 858, or the processor 852 may be embodied as a non-transitory, machine-readable medium 860 including code to direct the processor 852 to perform electronic operations in the edge computing node 850. The processor 852 may access the non-transitory, machine-readable medium 860 over the interconnect 856. For instance, the non-transitory, machine-readable medium 860 may be embodied by devices described for the storage 858 or may include specific storage units such as optical disks, flash drives, or any number of other hardware devices. The non-transitory, machine-readable medium 860 may include instructions to direct the processor 852 to perform a specific sequence or flow of actions, for example, as described with respect to the flowchart(s) and block diagram(s) of operations and functionality depicted above. As used herein, the terms "machine-readable medium" and "computer-readable medium" are interchangeable.

Also in a specific example, the instructions 882 on the processor 852 (separately, or in combination with the instructions 882 of the machine readable medium 860) may configure execution or operation of a trusted execution environment (TEE) 890. In an example, the TEE 890 operates as a protected area accessible to the processor 852 for secure execution of instructions and secure access to data. Various implementations of the TEE 890, and an accompanying secure area in the processor 852 or the memory 854 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the device 850 through the TEE 890 and the processor 852.

E. Machine Readable Medium and Distributed Software Instructions

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., Hypertext Transfer Protocol (HTTP)).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

Figure 9:
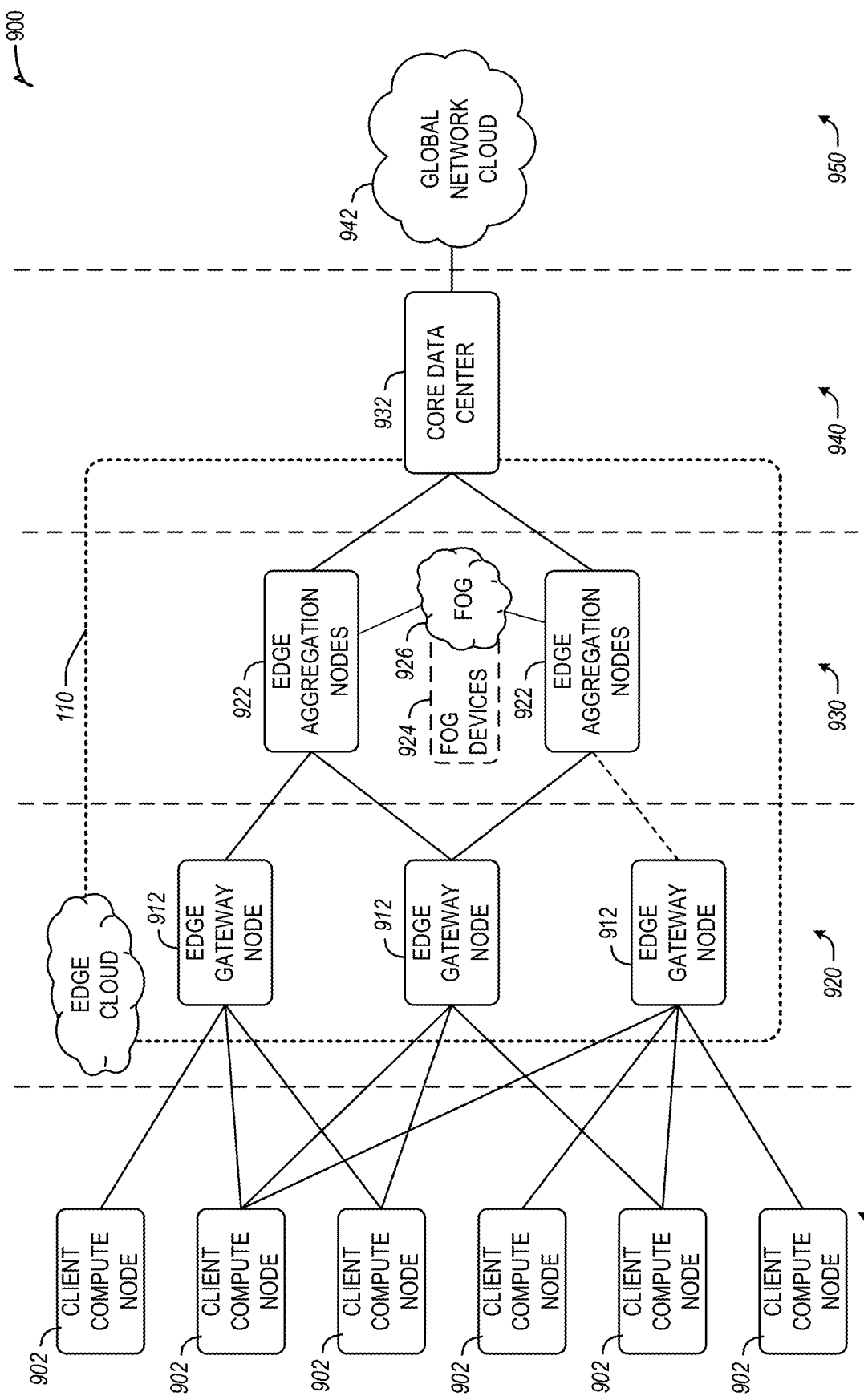
FIG. 9 illustrates an overview of layers of distributed compute deployed among an edge computing system, according to an example.

At a more generic level, an edge computing system may be described to encompass any number of deployments operating in an edge cloud 110, which provide coordination from client and distributed computing devices. FIG. 9 provides a further abstracted overview of layers of distributed compute deployed among an edge computing environment for purposes of illustration.

FIG. 9 generically depicts an edge computing system for providing edge services and applications to multi-stakeholder entities, as distributed among one or more client computing nodes 902, one or more edge gateway nodes 912, one or more edge aggregation nodes 922, one or more core data centers 932, and a global network cloud 942, as distributed across layers of the network. The implementation of the edge computing system may be provided at or on behalf of a telecommunication service provider ("telco", or "TSP"), internet-of-things service provider, cloud service provider (CSP), enterprise entity, or any other number of entities.

Each node or device of the edge computing system is located at a particular layer corresponding to layers 910, 920, 930, 940, 950. For example, the client computing nodes 902 are each located at an endpoint layer 910, while each of the edge gateway nodes 912 are located at an edge devices layer 920 (local level) of the edge computing system. Additionally, each of the edge aggregation nodes 922 (and/or fog devices 924, if arranged or operated with or among a fog networking configuration 926) are located at a network access layer 930 (an intermediate level). Fog computing (or "fogging") generally refers to extensions of cloud computing to the edge of an enterprise's network, typically in a coordinated distributed or multi-node network. Some forms of fog computing provide the deployment of compute, storage, and networking services between end devices and cloud computing data centers, on behalf of the cloud computing locations. Such forms of fog computing provide operations that are consistent with edge computing as discussed herein; many of the edge computing aspects discussed herein are applicable to fog networks, fogging, and fog configurations. Further, aspects of the edge computing systems discussed herein may be configured as a fog, or aspects of a fog may be integrated into an edge computing architecture.

The core data center 932 is located at a core network layer 940 (e.g., a regional or geographically-central level), while the global network cloud 942 is located at a cloud data center layer 950 (e.g., a national or global layer). The use of "core" is provided as a term for a centralized network location—deeper in the network—which is accessible by multiple edge nodes or components; however, a "core" does not necessarily designate the "center" or the deepest location of the network. Accordingly, the core data center 932 may be located within, at, or near the edge cloud 110.

Although an illustrative number of client computing nodes 902, edge gateway nodes 912, edge aggregation nodes 922, core data centers 932, global network clouds 942 are shown in FIG. 9, it should be appreciated that the edge computing system may include more or fewer devices or systems at each layer. Additionally, as shown in FIG. 9, the number of components of each layer 910, 920, 930, 940, 950 generally increases at each lower level (i.e., when moving closer to endpoints). As such, one edge gateway node 912 may service multiple client computing nodes 902, and one edge aggregation node 922 may service multiple edge gateway nodes 912.

Consistent with the examples provided herein, each client computing node 902 may be embodied as any type of end point component, device, appliance, or "thing" capable of communicating as a producer or consumer of data. Further, the label "node" or "device" as used in the edge computing system 900 does not necessarily mean that such node or device operates in a client or agent/minion/follower role; rather, any of the nodes or devices in the edge computing system 900 refer to individual entities, nodes, or subsystems which include discrete or connected hardware or software configurations to facilitate or use the edge cloud 110.

As such, the edge cloud 110 is formed from network components and functional features operated by and within the edge gateway nodes 912 and the edge aggregation nodes 922 of layers 920, 930, respectively. The edge cloud 110 may be embodied as any type of network that provides edge computing and/or storage resources which are proximately located to radio access network (RAN) capable endpoint devices (e.g., mobile computing devices, IoT devices, smart devices, etc., which may be compatible with O-RAN specifications), which are shown in FIG. 9 as the client computing nodes 902. In other words, the edge cloud 110 may be envisioned as an "edge" which connects the endpoint devices and traditional mobile network access points that serves as an ingress point into service provider core networks, including carrier networks (e.g., Global System for Mobile Communications (GSM) networks, Long-Term Evolution (LTE) networks, 5G networks, etc.), while also providing storage and/or compute capabilities. Other types and forms of network access (e.g., Wi-Fi, long-range wireless networks) may also be utilized in place of or in combination with such 3GPP carrier networks.

In some examples, the edge cloud 110 may form a portion of or otherwise provide an ingress point into or across a fog networking configuration 926 (e.g., a network of fog devices 924, not shown in detail), which may be embodied as a system-level horizontal and distributed architecture that distributes resources and services to perform a specific function. For instance, a coordinated and distributed network of fog devices 924 may perform computing, storage, control, or networking aspects in the context of an IoT system arrangement. Other networked, aggregated, and distributed functions may exist in the edge cloud 110 between the cloud data center layer 950 and the client endpoints (e.g., client computing nodes 902). Some of these are discussed in the following sections in the context of network functions or service virtualization, including the use of virtual edges and virtual services which are orchestrated for multiple stakeholders.

The edge gateway nodes 912 and the edge aggregation nodes 922 cooperate to provide various edge services and security to the client computing nodes 902. Furthermore, because each client computing node 902 may be stationary or mobile, each edge gateway node 912 may cooperate with other edge gateway devices to propagate presently provided edge services and security as the corresponding client computing node 902 moves about a region. To do so, each of the edge gateway nodes 912 and/or edge aggregation nodes 922 may support multiple tenancy and multiple stakeholder configurations, in which services from (or hosted for) multiple service providers and multiple consumers may be supported and coordinated across a single or multiple compute devices.

F. Use Case: Satellite Edge Connectivity

Figure 10:
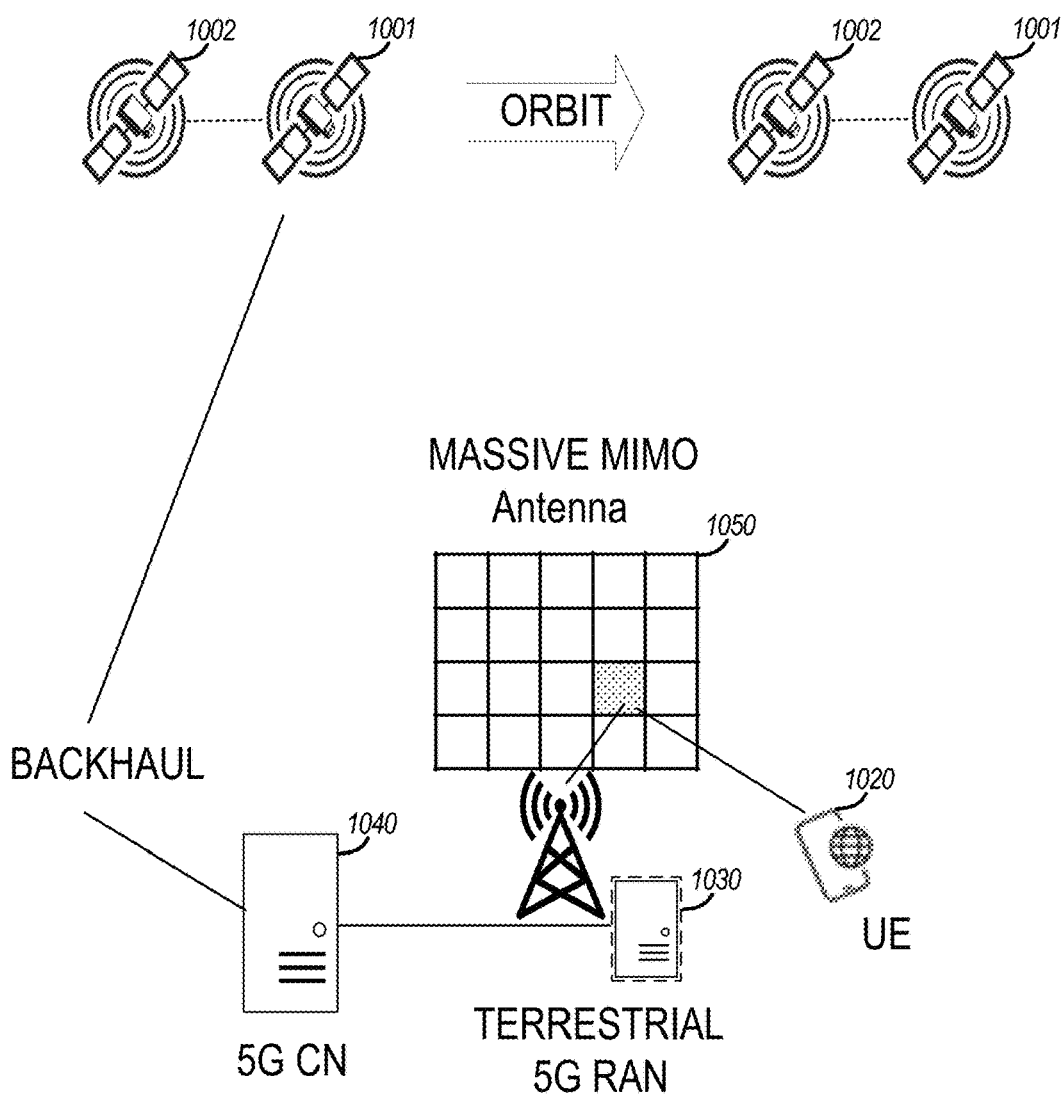
FIG. 10 illustrates network connectivity in non-terrestrial (satellite) and terrestrial (mobile cellular network) settings, according to an example.

FIG. 10 illustrates network connectivity in non-terrestrial (satellite) and terrestrial (mobile cellular network) settings, according to an example. As shown, a satellite constellation may include multiple satellites 1001, 1002, which are connected to each other and to one or more terrestrial networks. Specifically, the satellite constellation is connected to a backhaul network, which is in turn connected to a 5G core network 1040. The 5G core network is used to support 5G communication operations at the satellite network and at a terrestrial 5G radio access network (RAN) 1030. The RAN may be compatible with O-RAN specifications, in certain embodiments.

FIG. 10 also depicts the use of the terrestrial 5G RAN 1030, to provide radio connectivity to a user equipment (UE) 1020 via a massive MIMO antenna 1050. It will be understood that a variety of network communication components and units are not depicted in FIG. 10 for purposes of simplicity. With these basic entities in mind, the following techniques describe ways in which terrestrial and satellite networks can be extended for various edge computing scenarios.

Figure 11:
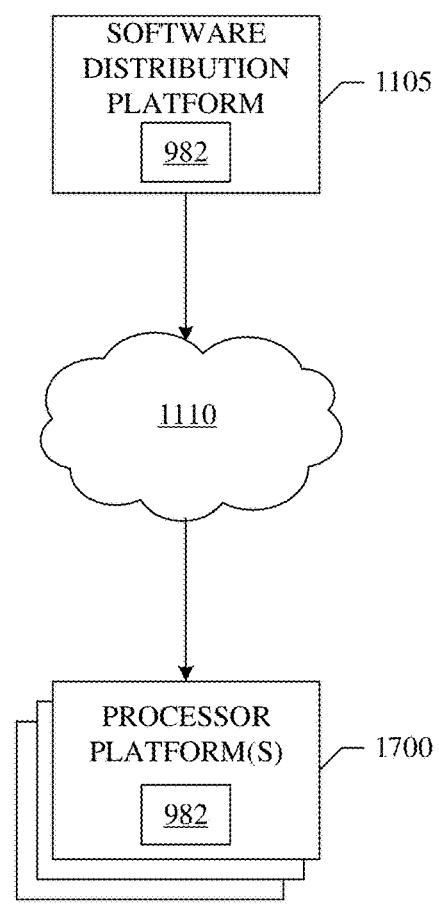
FIG. 11 illustrates an example software distribution platform to distribute software, such as the example computer readable instructions FIG. 8, to one or more devices.

G. Software Distribution:

FIG. 11 illustrates an example software distribution platform 1105 to distribute software, such as the example computer readable instructions 882 of FIG. 8, to one or more devices, such as example processor platform(s) 1100 and/or example connected edge devices 862. The example software distribution platform 1105 may be implemented by any computer server, data facility, cloud service, etc., capable of storing and transmitting software to other computing devices (e.g., third parties, the example connected edge devices 862 of FIG. 8). Example connected edge devices may be customers, clients, managing devices (e.g., servers), third parties (e.g., customers of an entity owning and/or operating the software distribution platform 1105). Example connected edge devices may operate in commercial and/or home automation environments. In some examples, a third party is a developer, a seller, and/or a licensor of software such as the example computer readable instructions 882 of FIG. 8. The third parties may be consumers, users, retailers, OEMs, etc. that purchase and/or license the software for use and/or re-sale and/or sub-licensing. In some examples, distributed software causes display of one or more user interfaces (UIs) and/or graphical user interfaces (GUIs) to identify the one or more devices (e.g., connected edge devices) geographically and/or logically separated from each other (e.g., physically separated IoT devices chartered with the responsibility of water distribution control (e.g., pumps), electricity distribution control (e.g., relays), etc.).

In the illustrated example of FIG. 11, the software distribution platform 1105 includes one or more servers and one or more storage devices. The storage devices store the computer readable instructions 882. The one or more servers of the example software distribution platform 1105 are in communication with a network 1110, which may correspond to any one or more of the Internet and/or any of the example networks described above. In some examples, the one or more servers are responsive to requests to transmit the software to a requesting party as part of a commercial transaction. Payment for the delivery, sale and/or license of the software may be handled by the one or more servers of the software distribution platform and/or via a third-party payment entity. The servers enable purchasers and/or licensors to download the computer readable instructions 882 from the software distribution platform 1105. For example, the software, which may correspond to the example computer readable instructions 882 of FIG. 8, may be downloaded to the example processor platform(s) 1100 (e.g., example connected edge devices), which is/are to execute the computer readable instructions 882 to implement the software instructions. In some examples, one or more servers of the software distribution platform 1105 are communicatively connected to one or more security domains and/or security devices through which requests and transmissions of the example computer readable instructions 882 must pass. In some examples, one or more servers of the software distribution platform 1105 periodically offer, transmit, and/or force updates to the software (e.g., the example computer readable instructions 882 of FIG. 8) to ensure improvements, patches, updates, etc. are distributed and applied to the software at the end user devices.

In the illustrated example of FIG. 11, the computer readable instructions 882 are stored on storage devices of the software distribution platform 1105 in a particular format. A format of computer readable instructions includes, but is not limited to a particular code language (e.g., Java, JavaScript, Python, C, C#, SQL, HTML, etc.), and/or a particular code state (e.g., uncompiled code (e.g., ASCII), interpreted code, linked code, executable code (e.g., a binary), etc.). In some examples, the computer readable instructions 882 stored in the software distribution platform 1105 are in a first format when transmitted to the example processor platform(s) 1100. In some examples, the first format is an executable binary in which particular types of the processor platform(s) 1100 can execute. However, in some examples, the first format is uncompiled code that requires one or more preparation tasks to transform the first format to a second format to enable execution on the example processor platform(s) 1100. For instance, the receiving processor platform(s) 1100 may need to compile the computer readable instructions 882 in the first format to generate executable code in a second format that is capable of being executed on the processor platform(s) 1100. In still other examples, the first format is interpreted code that, upon reaching the processor platform(s) 1100, is interpreted by an interpreter to facilitate execution of instructions.

H. Machine Learning in Edge Computing Networks

Machine learning (ML) involves computer systems using algorithms and/or statistical models to perform specific task(s) without using explicit instructions, but instead relying on patterns and inferences. ML algorithms build mathematical model(s) (referred to as "ML models" or the like) based on sample data (referred to as "training data" or the like) in order to make predictions or decisions without being explicitly programmed to perform such tasks. ML algorithms perform a training process on a relatively large dataset to estimate an underlying ML model. Generally, an ML algorithm may refer to a computer program that learns from experience with respect to some task and some performance measure, and an ML model may be any object or data structure created after an ML algorithm is trained with one or more training datasets. After training, an ML model may be used to make predictions on new datasets. Although the term "ML algorithm" refers to different concepts than the term "ML model," these terms as discussed herein may be used interchangeably for the purposes of the present disclosure. In some cases, an ML model may include an artificial neural network (NN), which is based on a collection of connected nodes ("neurons") and each connection ("edges") transmit information (a "signal") from one node to other nodes. A neuron that receives a signal processes the signal using an activation function and then signals other neurons based on the processing. Neurons and edges typically have weights that adjust as learning proceeds. The weights may increase or decrease the strength of a signal at a connection.

Linear regression is one type of supervised ML algorithm that is used for classification, stock market analysis, weather prediction, and the like. Gradient descent (GD) algorithms may be used in linear regression. Given a function defined by a set of parameters, a GD algorithm starts with an initial set of parameter values, and iteratively moves toward a set of parameter values that minimize the function. This iterative minimization is achieved by taking steps in the negative direction of the function gradient. In some GD implementations, a model is updated iteratively, where multiplication of large matrices and vectors is performed in each epoch. An epoch may refer to a round of machine learning that is performed in the iterative process of updating a model. Since the training phase for GD algorithms may involve a large amount of iterative computations, running GD algorithms can be computationally intensive. Additionally, computation time bottlenecks rapidly as the model order grows in size.

Distributed computing has been used to reduce training time by offloading GD computations to multiple secondary computing nodes. However, distributing GD computations to heterogeneous computing environments, such as those comprising multiple client or edge devices is difficult because, in most cases, the available edge devices have different configurations, capabilities, and operate under different conditions. Additionally, many of the edge devices communicate using wireless links, which have lower reliability (i.e., in terms of link quality and achievable data rates) when compared to wired links used in server farms. The heterogeneous nature of these computing environments may result in longer lag times at each round of training (or "epoch") due to slower computing devices and/or computing devices with low quality radio links. For these reasons, the conventional distributed ML training approach cannot be straightforwardly applied to heterogeneous computing environments. Recently, federated learning has been proposed for distributed GD computation, where learning takes place by a federation of client computing nodes (which may also be referred to herein as "client devices") that are coordinated by a central server (which may be referred to herein as a MEC server or controller node).

Federated learning, where a global model is trained with coordination with a federation of client computing nodes/client nodes/clients while keeping the training data local at the clients is one of the problems under consideration herein. The federated learning protocol iteratively allows clients to download a centrally trained artificial intelligence/machine-learning model (or model) from a server, such as a MEC server, an edge server or a cloud server, update it with their own data and upload the model updates (such as a gradient update) back to the server. The model updates may include updates weight values for nodes of the NN model, for instance. The server then aggregates updates from multiple clients to update the global model. Federated learning over wireless edge networks is highly desired since data can be maintained local at the clients while the edge server can utilize the compute capabilities of clients to speed up training.

"Global" as used herein in the context of a model or policy is to denote a model or policy that is applicable to and/or based on information pertaining to a plurality of computing nodes within a network of nodes.

I. Training Architecture for Decentralized Execution of Wireless Resource Allocation Policies Using Deep Reinforcement Learning Wireless resource allocation problems may be similar to those encountered by DRL agents, where a set of transmitters can observe system state (e.g., channel state information) based on information from a set of receivers, and perform a resource allocation action (e.g., transmit power level). Based on the action, the system undergoes a change (e.g. in terms of interference) and also returns a reward to the agents (e.g., sum throughput or a utility of sum throughput). The actions of the different DRL agents are coordinated since a resource allocation decision from one DRL agent will affect the reward and state transition observed by the other agents.

Hence, a multi-agent DRL approach is a good fit for the wireless resource allocation problem.

A "DRL agent" as used herein refers to a DRL abstraction that may be implemented on a node of a wireless network, such as a base station or core network, by way of example only.

A first set of embodiments propose methods to allow jointly learning wireless resource allocation policies that can later be independently deployed at DRL agents for inference mitigation in a wireless network. "Jointly learning" in this section denotes exchange of communication parameters between TX and RX nodes for those exchanged communication parameters to be used as parameters in the learning process.

The below examples of a first set of embodiments consider a problem involving N transmitter nodes (TX nodes) and N receiver nodes (RX nodes) with each of the N TX nodes having local observations from other TX nodes, the observations based on information from the associated RX node of said each of the N TX nodes. The TX node may, for example, be a base station (BS) and the RX node a user equipment (UE), although embodiments are not so limited.

Each RX node is associated with a TX node, although it may see interference from transmissions by TX nodes with which it is not associated. In the description below, our example pertains to N TX nodes and N RX nodes, with each RX node i having an associated TX node i. Embodiments are clearly not so limited, and pertain to the situation with N TX nodes and M RX nodes where multiple RX nodes have a single associated TX node.

In this Section we define TX node and RX as follows:

Transmitter Device (TX or TX node): represents the transmitting side of the wireless data transmission (e.g. for downlink (DL) data transmission). It is assumed to have both transmission and reception capabilities, for example when exchanging control signals, pilot signal, or channel state information.

Receiver Device (RX or RX node): represents the receiving side of the wireless data transmission. It is assumed to have both transmission and reception capabilities, for example when exchanging control signals, pilot signal, or channel state information.

Current multi-agent DRL approaches proposed for wireless resource allocation based on the above fact pattern include the following—noting that this refers to global information Imagining many TX nodes are connected through interfaces and share the channel state information and other relevant information required for resource allocation decisions:

i. a first approach, where a centralized DRL agent may solve the above problem by utilizing a joint system state (that is, a state relevant to multiple nodes of the network rather than to any one node within the network, such as channel matrix h∈$R^{N \times N}$), joint action space (e.g., transmit power level vector) with the goal of maximizing the cumulative discounted long term joint reward. "Reward" measures the performance of any action (e.g. reward for transmit power is throughput). "Long term" refers to the prediction of rewards over a given time interval. In essence, long term refers to not only the immediate reward but the future reward over several decision intervals. "Discounted" refers to how much the future rewards are weighted in the "long term" window. For example, the TX node can make resource allocation decisions not only to maximize immediate throughput but also the throughput over the next several minutes. But the "discount factor" indicates the importance given to the future vs the current time. "R" means a real number for h, and N×N denotes the matrix of real numbers that represent the channel state or channel gain, each point in the matrix representing a link between a TX and a RX pair within the network of N TX nodes and n RX nodes, where, in the matrix, the rows may correspond to transmitters and the columns to receivers. When you have a centralized agent, you can collect the entire matrix in one place, which represents the entire set of needed data to make RRM decisions. Disadvantageously, in a distributed learning and inference scheme where agents are distributed, however all of N×N channel matrix values will not be at one place.

ii. a second approach with N independent DRL agents where each agent may learn an individual policy from observations only at local nodes ($h_{1n}$, . . . , $h_{Nn}$- indicating the channel state reported by RX node n from itself and the remaining N−1 neighboring agents) and performs resource allocation or radio resource management decision to maximize an overall reward R. A RRM decision may include a decision regarding any parameter that may influence data communication over a wireless link, such as transmission power, modulation and coding scheme (MCS), spectrum allocation including bandwidth, communication priority in time domain, and allocation of spatial communication. The "overall reward R" is still a cumulative discounted long term reward. Whether or not it's joint depends on if the TX nodes (e.g. RANs and specifically their controllers) are sharing their rewards with each other.

iii. A third approach with N DRL agents where each agent shares its observation regarding channel states with N−1 agents during both training and inference. The channel states of N−1 agents may be received with a delay as an artifact of the communication delay between network nodes, and fed as part of the input state "s" during both training and inference to arrive at an output that includes a joint policy.

An output of learning and inference in the above schemes is a resource allocation/RRM decision between each TX node and RX node (RAN controller/AP and its UE). The "joint" aspect is "how" the decision is made, that is, that it is made based on channel state information regarding links between other TX nodes and other RX nodes in the network.

Disadvantageously, the approach in (i) above requires a centralized algorithm that will need multiple communications to collect all the input state information from all TX nodes in a central server before being able to perform resource allocation decision based on the same. The approach in (i) is not practical, since resource allocation decisions in wireless environments are usually latency sensitive and cannot tolerate large time delays associated with communicating multiple instances of state information and decisions between agents and a server.

The approach in (ii) is likely to face convergence issues, since it involves different agents learning while the policies of other agents are evolving independently, this leading to non-stationarity of the learning process for each agent.

Disadvantageously, the approach in (iii) could still utilize a centralized training, but a distributed inference. However, this approach, similar to that in approach (i) and (ii), also requires communicating state information between agents. This is because each agent still utilizes the entire state information to determine its own action. Delayed exchange of the state information is therefore still possible between agents in approach (iii). However, the availability of timely state information may be subject to system constraints such as the backhaul link capacity, etc., and may further be subject to latency constraints.

Some embodiments propose a new DRL approach (first set of embodiments) described in this Section that implicitly captures the impact of multiple agents without the need for exchanging information between agents during the inference stages. We propose a centralized training method where agents exchange data with a central server (where agents may be in the TX nodes and/or RX nodes), which method aids in training agent-specific models. The resulting agent specific models advantageously do not require multiple information exchange instances between the multiple agents but rather implicitly capture the impact of multiple agents.

The first set of embodiments described in this Section propose utilizing a training architecture that is to decompose joint policies within an wireless network with multiple DLR agents into individual agent policies. The proposed approaches of the first set of embodiments is applicable to multi-agent resource allocation problems with state space (i.e. collection of channel state information pertaining to multiple nodes within the wireless network, which collection is fed as input to the agent for RRM decision making—this is essentially the input to the deep reinforcement learning algorithm, and may include, for example, channel state information, traffic/buffer information, etc.) involving local observations from different agents (e.g. at different TX nodes) (local observations for example including channel state, traffic state such as queue information), and further involving joint actions that may include not only determination of transmit power, but also of fractional frequency use (frequency allocation), spatial transmission (transmission in given spatial directions), etc.

Advantageously, the first set of embodiments allow, on a per client node basis, a learning model that is more advanced than a final global model by at least one stage, given that a client node able to perform a further one or more stages of local training after the final global model is trained.

Advantageously the first set of embodiments further allow eliminating or substantially reducing issues posed by the state of the art, such as, for example, the need for multiple communications with a centralized agent in order to convey local state information, convergence issues with an approach where some agents are learning while others are inferring, and time delay or latency issues posed by multiple communications by multiple agents regarding state information.

A training architecture according to the first set of embodiments requires message exchanges between the different agents. Specifically, each agent may send its local observations to a central server. In addition, each agent may also send the output of their local action-value function to the server. The server may also communicate the gradients w.r.t for the agent policies to the agents.

As noted previously, DRL is a powerful tool for training machine learning agents that can interact with the environment and learn to make decisions based on feedback and state transitions in the environment. This DRL can naturally be applicable for radio resource management (RRM) decisions in wireless systems, as an agent using DRL can observe system states such as channel conditions, and obtain rewards for RRM actions, as well as being able to observe transitions in the underlying state of the wireless environment/network.

We develop new DRL approaches that implicitly capture the impact of multiple agents without the need for exchanging information between agents during the inference stages. We propose a centralized training method where agents exchange data to a central server that aids in training agent specific models. The resulting agent specific models do not require any exchange of information between each other (such as channel states) but implicitly capture the impact of multiple agents.

As suggested previously, embodiments thus propose utilization of a training architecture that can decompose a joint policy into individual agents' policies.

As used herein, a "policy" is some function that takes "state information" as input and provide either the resource allocation decision/RRM decision, or the goodness of a resource allocation decision/RRM decision. The decision can be "transmit power level", "modulation and coding scheme", etc. The proposed methods in the first set of embodiments could apply to the general multi-agent resource allocation problems with state space including local observations from different agents (channel state, traffic state such as queue information) and joint actions that include not only transmit power but also fractional frequency use, spatial transmission, etc. As previously noted, a policy is a "joint policy" if state information from nodes of the network to which the policy may not apply were used for the RRM decision, noting that, for a "joint policy" as used in this section, the RRM decision may still be local, but was inferred based on join information. A "joint action" as used in this section refers to use of a local RRM decision that was based on a joint policy as defined herein.

Joint policy thus may mean a policy which takes input from multiple TX nodes and provides resource allocation decisions for all TX nodes, with interference effects are taken into account. According to this first set of embodiments, each agent will have a local policy, while the server is able to build a joint policy which may be used as needed. The first set of embodiments described in the instant Section propose to approximate a joint policy yet realizing a joint policy only with a local policy, which is simpler implementation.

An example of the first set of embodiments will now be described below in the context of FIG. 12. For purposes of illustration only, and not by way of limitation, the description below relating to the first set of embodiments will utilize the problem of joint power allocation in a wireless network 1200. Wireless network 1200 of FIG. 12 includes N TX nodes 1208 and N associated RX nodes 1209, individual ones of the RX nodes 1209 being associated with a corresponding one of the TX nodes 1208. As noted previously, each RX node is associated with a TX node, although it may see interference from transmissions by TX nodes with which it is not associated. In the description below, our example pertains to N TX nodes and N RX nodes, with each RX node i having an associated TX node i. Embodiments are clearly not so limited, and pertain to the situation with N TX nodes and M RX nodes where multiple RX nodes have a single associated TX node.

According to the shown example, each agent 1207, which may be implemented in a corresponding TX node 1208, may receive local state information from the RX nodes 1209 associated with that TX node The state information includes $h_n$: $[h_{1n}, \ldots, h_{Nn}]^T \in R^{N \times 1}$, where $h_{mn}$ indicates the channel state from TX node m to RX node n, noting that RX node n may see interference from TX node m not associated with it. Each agent 1207 may aim to learn a joint policy of power allocation for the wireless network that can be decomposed into local policies providing local actions for each agent (e.g. location actions relating to setting transmit power levels).

We consider, for illustration, that the agents are jointly learning an optimal action-value function $Q_{tot}(H, a; \theta)$ that determines the discounted long-term value of performing joint action a after observing state H. The value function Q represents a reward for the joint policy that we are learning, which policy uses H as input, and "a" as input, with "a" representing the RRM decision, and $\theta$ representing a parameter of the policy being sought to learned. Here, "a" is a vector containing transmit power level from each TX node. Here, $H \in R^{N \times N}$ is the channel matrix indicating the channel state between each of the transmit-receive pairs of the N TX nodes and N RX nodes. Q depends on the parameter $\theta$ which is what we are learning.

The action with the maximum Q value is selected as the optimal action.

Figure 12:
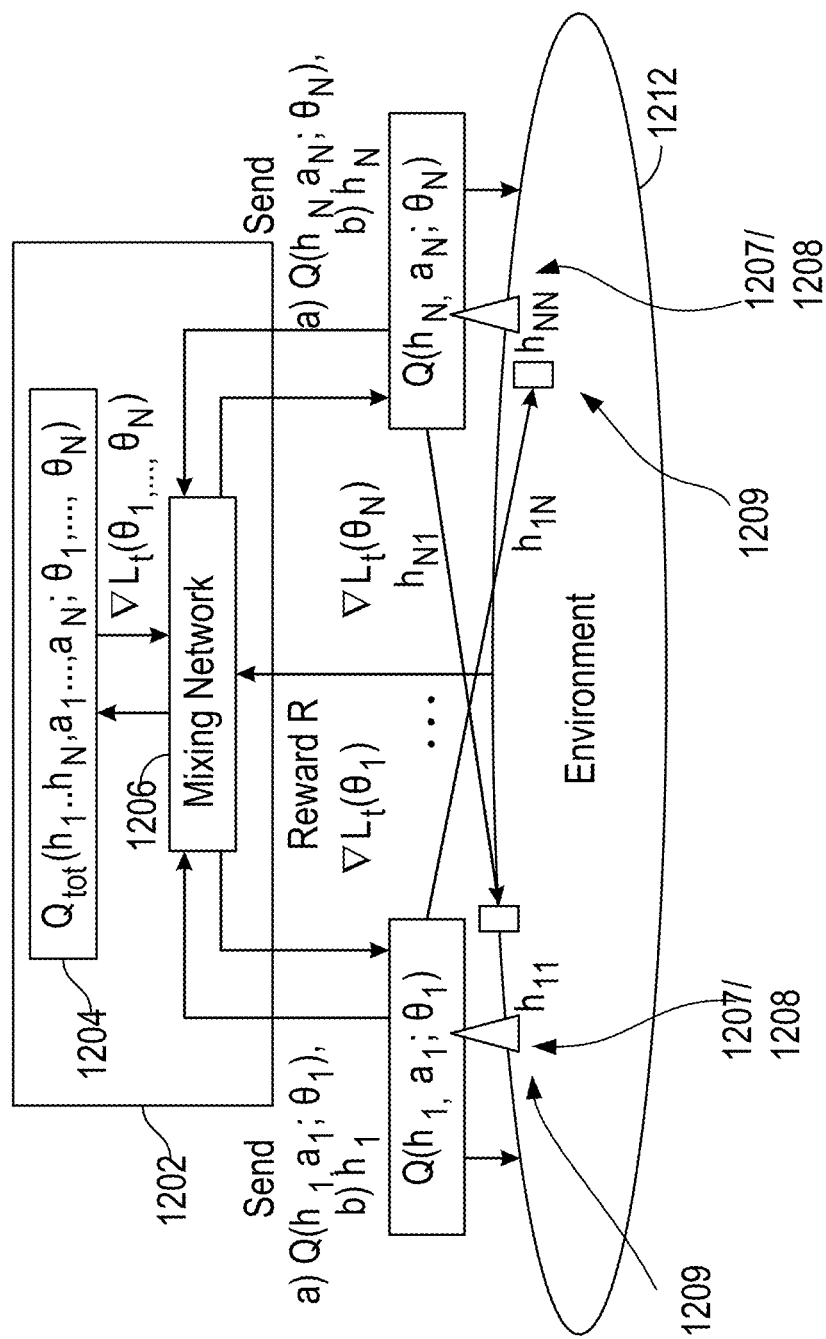
FIG. 12 illustrates an example of a wireless network according to a first set of embodiments for a decentralized execution of RRM decision policies using deep reinforcement learning.

The architecture of FIG. 12 allows learning of such a joint policy while also allowing a decentralized execution of it at each agent 1207 separately. In network 1200, a mixing network 1206 may be utilized to allow local action-value functions $Q(h_n, a_n; \theta_n)$ to be learnt. The mixing network is an abstraction which may be implemented at a central server, or at one of the TX nodes.

In network 1200, each DRL agent n (TX node) or 1207 has a local action-value function $Q(h_n, a_n; \theta_n)$ that is parametrized by $\theta_n$, where $\theta_n$ provides mapping from local observation $h_n$ to local action $a_n$. The mixing network can be a special parametrized or non-parametrized function that combines the local action-value functions to arrive at the total $Q_{tot}(H, a; \theta)$.

One option according to the state of the art proposes value decomposition networks that allow the decomposition of the joint action-value function as $Q_{tot}(H, a; \theta) = \sum_{n=1}^{N} Q(h_n, a_n; \theta_n)$. As a result, decentralized policies can be learnt allowing agents to apply mapping from local observations to local actions only.

Another option according to the state of the art does not require linear decomposition of the action-value function as in the option above, but requires that the joint action-value be monotonic in terms of per-agent action-values represented in Equation (I1) as;

$$\operatorname*{argmax}_{a} Q_{tot(h,a;\theta)} = \begin{pmatrix} \operatorname*{argmax}_{a_1} Q_1(h_1, a_1; \theta_1) \\ \vdots \\ \operatorname*{argmax}_{a_N} Q_N(h_N, a_N; \theta_N) \end{pmatrix} \quad \text{Eq. (I1)}$$

In the case of this second option, the mixing network itself is a feedforward neural network with strictly non-negative weights to mix the outputs of the local action-value functions monotonically.

We utilize this training architecture in this first set of embodiments described in the instant Section, where, through the use of a mixing network, individual policies for the agents (TX nodes) are obtained.

Referring still to FIG. 12, a proposed training architecture and message exchanges for a multi-agent wireless resource allocation scheme according to an embodiment are shown as will be explained below.

During Training:
1) The parameters of the local action-values and mixing networks are first initialized.
2) Each agent 1207 obtains local observation $h_n$ from its associated RX node n, and computes, through reinforcement learning, $Q_n(h_n, a_n; \theta_n)$, noting that the state information includes $h_n$: $[h_{1n}, \ldots, h_{Nn}]^T \in R^{N \times 1}$, where $h_{mn}$ indicates the channel from TX node m to RX node n.
3) The $Q_n(\bullet)$ output as well as $h_n$ are shared with the central server 1202 by each agent 1207, the mixing network running on the central server 1202.
4) The central server 1202 maintains a copy 1204 of the local networks and of the mixing network 1206, and computes the overall parametrized $Q_{tot}(\bullet)$ based on values obtained from the same.
5) The overall loss at time t is expressed as $L_t(\theta_t) = E_{h,a-\rho}[(y^{tot} - Q_{tot}(h, a; \theta_t))^2]$ where $E_{h,a-\rho}$ is a parameter that denotes expectation/estimate based on h and a, $y_{tot}$ is the target Q-value
6) Each agent computes the gradient of the loss $\nabla L_t(\theta_t)$, for example using gradient descent, with respect to the mixing network parameters ($\theta_t$) and updates them
7) In turn, the gradients with respect to the local action-value network parameters $\nabla L_t(\theta_{n,t})$ are also computed through chain-rule and transmitted back to the agents.
8) The agents update their local weights as $\theta_{n,t+1} = \theta_{n,t} + \gamma \nabla L_t(\theta_{n,t})$, where $\gamma$ is the learning rate.
9) Repeat process 2)-8) until convergence. For example, gradients with respect to $\theta_t$ can be observed. If they become close to zero for a set period of time, it can represent convergence. Similarly loss function Lt can be close to zero.

During Inference:
1) Agents have a fully trained local action-value function $Q(h_n, a_n; \theta_n)$ and hence obtain the local observation to compute action values for the possible actions.
2) Agent n picks action maximizing the local action-value $Q_n(\bullet)$ Synchronization:
During the training process, the observations from the different RX nodes may be synchronized (e.g. through loose synchronization—for example by aligning the clocks across the different receivers) such that the measurements are received over the same time window. For different resource allocation problems, the tightness of the synchronization can vary. For example, when exchanging higher layer information such as queue lengths, packet error statistics, etc., the requirement on the synchronization can be much more relaxed.

During inference, similarly, the observations across the RX nodes are overlapping (i.e., obtained during the same time window).

J. Data Heterogeneity-Aware Client Node Selection for Federated Learning

An aspect of Federated Learning (FL) is the heterogeneity in data distributions across client nodes. The above is because each client node samples data from its own environment. For example, a video camera sensing/monitoring a street will have a different distribution of data compared to a video camera monitoring a public park. This heterogeneity in data distributions is a key advantage as well as major challenge in FL systems. It is an advantage because potentially every client node can learn a model that is robust with respect to various data distributions regarding state information concerning other client nodes within the network.

However, the FL system must be engineered carefully such that the final model learned is not heavily biased against a group of client nodes.

Typically, a system which uses FL implements a version of the stochastic gradient descent (SGD) algorithm. This is a sequential algorithm which proceeds in rounds. In each round, each client node will compute a gradient of the model parameters using the data it can access. All client nodes will then send the gradient updates to the central server. The central server then aggregates the updates from client nodes and shares the updated model for the next round.

Often, in practical FL systems, it may not be feasible to sample all the client nodes in one round of gradient updates. This is because sampling all client nodes may cause a communication bottleneck at the server. Further, client nodes are generally energy constrained and therefore, frequently computing and transmitting gradient updates to the server may not be feasible. The heterogenous data distributions at the client nodes make this task even more challenging. One has to ensure the model performance is robust vis à vis the varying data distributions across client nodes. Hence, a smart selection of client nodes based on their local data distributions, energy usage status, model accuracy etc. is desirable.

Accordingly, a second set of embodiments as set forth in the instant disclosure proposes a client node selection method which first clusters client nodes based on their data distribution, and then selects, based on energy consumption/budget/connectivity status of the client nodes, one or more client nodes from each cluster in one round of gradient updates.

The state of the art provides a client node selection approach in order to reduce the convergence time of the global model, as explained for example in WO2021/158313.

In Y. Zhao et al, "Federated Learning with Non-IID Data" arXiv:1806.00582 (hereinafter "FL with Non-IID Data"), in order to deal with some client nodes having highly-skewed data, it was proposed to share a small amount of training data with the central server and train a warm-up global model before client nodes perform FL.

In A. K. Sahu, T. Li, M. Sanjabi, M. Zaheer, A. Talwalkar, V. Smith, "Federated Optimization for Heterogeneous Networks", arXiv:1812.06127 (hereinafter "Federated Optimization"), it was proposed to have each client node utilize a regularization parameter in its local loss function that tries to reduce the impact of weight updates from each client node in each round.

In B. J. Frey, D. Dueck "Clustering by passing messages between data points", Science, 2007 (hereinafter "Clustering by Passing"), an approach is proposed that addresses the heterogeneous data distribution case by observing the loss distribution at the client nodes.

A major challenge in sub-sampling only the fast client nodes (in terms of upload time and compute time) is the issue of model divergence. The convergence of the global model is empirically conditioned on the client nodes' data being independently and identically distributed (i.i.d. or IID). In the absence of such a distribution of data, skipping updates from several client nodes (from straggler nodes) can lead to skewed updates and lead to model divergence/overfitting for only certain data distributions.

Further, the solution proposed in "FL with non-IID Data" depends on sharing training data with the central server which may not always be possible due to privacy concerns (e.g., for patient healthcare data). The regularization approach in "Federated Optimization" helps improve accuracy in the presence of non-i. i. d. data but hits a training accuracy performance ceiling while also resulting in slower convergence.

Accordingly, in the second set of embodiments presented in the instant disclosure, we propose the use of clustering of FL client nodes based on their data distributions, followed by client node selection based on the clusters created to ensure faster convergence and fairness in accuracy of the global model learned in a FL based system. Exemplary steps of an embodiment algorithm are summarized below:

1. At the beginning of the learning process, client nodes send their data distributions to the central server, such as the MEC server.
2. The central server creates clusters of client nodes based on the sent data distributions.
3. The central server selects one/or a fixed number of client node(s) from each cluster in each round of training. Selection of client nodes within a cluster may depend upon the status of connectivity, past energy usage, battery status etc. for each client node.

By carefully selecting client nodes based on their data distributions, we ensure that in each round the central node/central server/MEC server selects client nodes with heterogenous data distributions. Empirically we have observe that this leads to faster convergence in terms of model accuracy. In addition to this, in a large scale system, this leads to savings in bandwidth and fairness in energy usage among client nodes.

To implement an algorithm according to this second set of embodiments described in this Section, the client nodes have to report their data distributions to the central server, and the central server will have to notify the selected client nodes in each round regarding their selection. In a distributed system that includes the client nodes and the central server, data distributions from the client nodes to the central server on the one hand, and notification of selection to the client nodes by the central server may be communicated through network packets by way of example. Such communications may be detected through controlled/known data distributions on client nodes and the use of a packet sniffing tool, by way of example For a more in-depth discussion regarding the second set of embodiments, let us consider a FL system with one or more central servers and N client nodes. A client node has a local database $(X_i, Y_i)$, where $X_i$ is the feature matrix with dimension $d \times n_i$ where d is the number of features, $n_i$ is the number of data points and $Y_i$ is a vector of dimension $1 \times n_i$ with the target values for the prediction/classification.

A goal of the second set of embodiments is to find a global model $f(\cdot)$ such that the model has a good accuracy for all client nodes.

The central server coordinates the FL training process. FL training typically consists of an initialization phase, and a sequential stochastic gradient descent phase. In the initialization phase, a central server and client nodes exchange information (such as channel state information or any other information which may be used as input in the SGD operation) which would be needed for the sequential SGD phase. In a practical system, initialization may be implemented periodically to send updated information from client nodes to the central server.

The information which a client node may share with the central server may, by way of example only, include:
1. histogram/fraction of samples of every class present in client node's data in the classification problem;
2. compute capabilities, for example, number and type of CPU cores, GPU capabilities, ML accelerators and their capabilities if present, memory (e.g. RAM capacity) and other hardware capabilities;
3. total number of data samples;
4. total battery capacity;
5. type of device, for example the client could be a mobile phone, laptop, workstation, IoT sensor, etc.

After initialization, a round of sequential SGD may involve the following:
1. The central server selects a subset of client nodes of cardinality K, K≤N. The subset of client nodes may include one or more representative client nodes from each of a plurality of clusters of client nodes. This is to reduce the communication overhead, with selection of the client nodes happening using, for example a k-means method or an affinity method, as will be explained in further detail below.
2. The selected subset of client nodes compute one or more gradient updates on their local dataset.
3. The selected client nodes then transmit the updates of the model/gradients to the central server
4. The central server does a smart combining of the gradients/updates and broadcasts the updated model to all client nodes, as will be described in further detail below.

Note that the smart combining of item 4 immediately above may be performed only once every few rounds. Smart combining may take any form, such as simple combining across client nodes, or such as weighted combining where weights may depend upon the number of data samples at each client node, training loss at the client node, number of times the client was selected in the past as part of the K clients, and gradient norms (e.g. 12 norm) of the client node Our proposed approach helps the central server select client nodes in item 1 of the SGD phase, where the selection involves first clustering the client nodes, and then selecting a total of K client nodes from the various clusters. To that end, in the initialization phase, the client nodes transmit a histogram of $Y_i$ to the central server. A client node may use a subset of data samples i.e., subset of columns, in order to arrive at the histogram. The histograms may be normalized, either at each client node, or at the central server. The central server then clusters the client nodes having similar distributions/normalized histograms. The clustering may be achieved using an algorithm according to a clustering embodiment explained further below. To normalize a histogram, either each client node or the central server for each client node, may compute the percentages of respective data classes based on the total data of said each client node to be considered for exchange.

There are many approaches possible for the clustering algorithm based on the second set of embodiments. Two possible clustering algorithms are provided below:
1. Using Bregman's k-means: Cluster the normalized histograms using the clustering algorithm at page 1715, Section 3.3, mentioned in A. Banerjee, S. Merugu, I. S. Dhillon, J. Ghosh, "Clustering with Bregman Divergences", MLR 2005 (hereinafter "Clustering with Bregman" for some k using a Bregman's divergence metric. One example of a Bregman's metric is KL divergence. Optimize k for some performance metric.
2. Using Affinity propagation: Let $h_i$ and $h_j$ denote the histograms transmitted by client nodes i and j, respectively The pairwise similarity metric $s_{ij}$ between i and j is denoted by $-0.5 \times (d(h_i, h_j)+d(h_j, h_i))$, where d is a distance metric between distributions, with $d(h_i, h_j)$ representing a distance between the histogram (data distribution) for client node i and the histogram for client node j, and $d(h_j, h_i)$ representing a distance between the histogram (data distribution) for client node i and the histogram for client node j, noting that $d(h_i, h_j)$ and $d(h_j, h_i)$ are not necessarily symmetric, and that the pairwise similarity metric $s_{ij}$ equation given below seeks to make them so.
3. Some typical examples for d may relate to a Kullback-Leibler divergence, Wasserstein metric, Bhattacharyya distance etc. The affinity propagation may be determined by using a set $\{s_{ij}\}$ as a similarity matrix and using a standard implementation of the affinity propagation, such as the one described in B. J. Frey, D. Dueck "Clustering by passing messages between data points", Science, 2007" (hereinafter "Clustering by Passing"). Note that such an approach has an advantage that the number of clusters does not have to be specified apriori.

A manner to cluster according to embodiments is to choose K such that it represents nodes presenting similar or close patterns of data as determined for example using a similarity matrix $\{s_{ij}\}$. The affinity propagation mechanism can help determine K without the drawbacks of the k-means (which could theoretically provide as many K's as there are data samples). Normalization may be performed by dividing by size of data set per client node so we can compare distribution of two clients in a normalized manner Affinity propagation is a method used to cluster a set of data points into different clusters. One key advantage of this algorithm when compared to Bregman's k-means is that we do not have to specify the number of clusters aprioiri. Details of the algorithm are given below:

The input to the algorithm is a matrix S where $s_{i,j}=-0.5$ $((d(h_i, h_j)+d(h_j, h_i))$, where we choose $s_{i,i}=0$ for all i.

There are two N×N matrices maintained, R and A. R is known as the 'responsibility' matrix and A is the 'availability' matrix, N is the number of clients nodes.

If we let $r_{i,j}$ and $a\_(i, j)$ be the $(i, j)^{th}$ elements of R and A, respectively, the matrices R and A may be updated using the following expressions until convergence or for a fixed number of rounds, as set forth in Equation (J1) below:

I $$a(i, k) \leftarrow \min\left(0, r(k, k) + \sum_{i' \notin \{i,k\}} \max(0, r(i', k))\right) \text{ for } i \neq k \quad \text{Eq. (J1)}$$

and $$a(k, k) \leftarrow \sum_{i' \neq k} \max(0, r(i', k)).$$

When values converge, we choose client nodes with a(i, i)+r(i, i)>0 as the cluster heads. The number of such clients with a(i, i)+r(i, i)>0 determine the number of clusters k. For any other client which is not a cluster head, we associate them with the cluster head j that has the maximum similarity $s_{i,j}$ among the cluster heads. The cluster head along with its associated clients form a cluster.

Using the above mentioned clustering algorithm by way of example, in at item 1 of SGD involving client node selection, the central server may sample a client node or a set of client nodes from each cluster. The number of client nodes sampled from each cluster depends on the number of data points per client node in a cluster and the priority that the central server wants to give to that cluster. The central server may select one or more client nodes from each cluster based on one or more of the following metrics:

1. Number of times a client node was selected in past rounds. This is to factor fairness in energy usage across client nodes.
2. Battery discharge status of a client node. This is to shortlist client nodes expected to have sufficient energy to communicate model updates.
3. Number of data points at a client. This is to avoid client nodes with too little data and to favor client nodes with large number of data points.
4. Connectivity status of a client node.

Figures 13A, 13B:
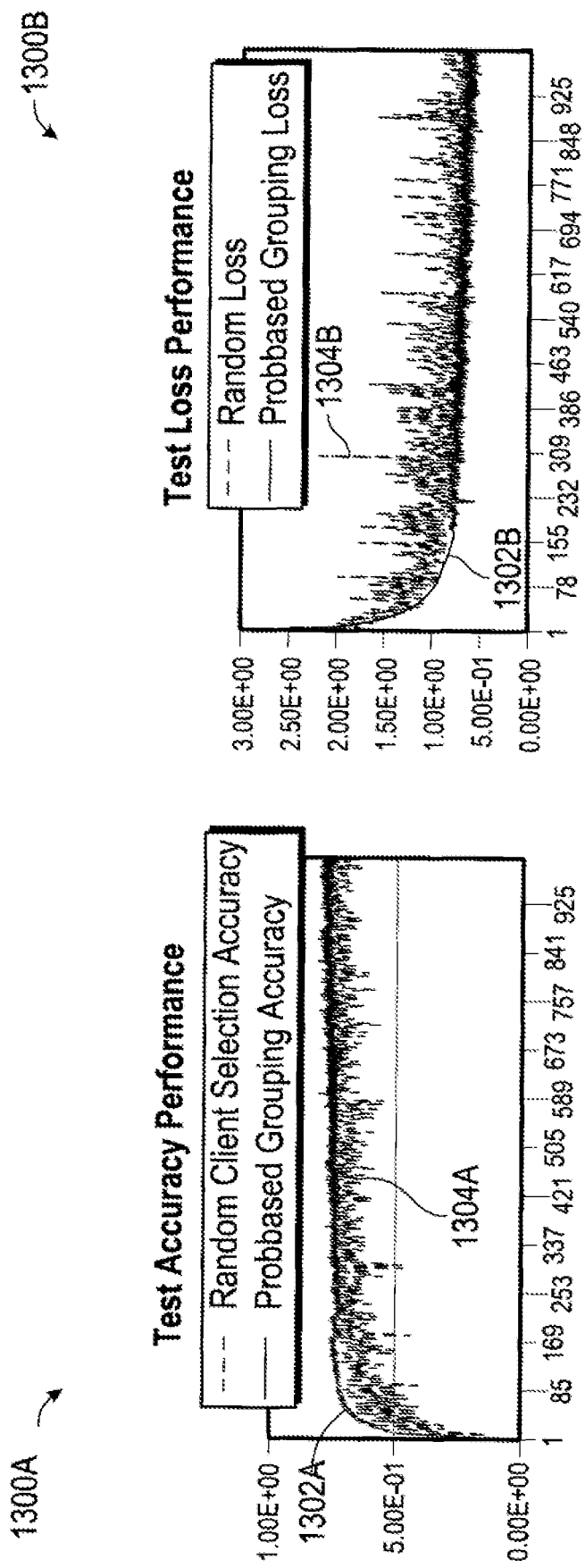
FIGS. 13A and 13B show, respectively, accuracy of FL based training vs number of training rounds, and loss vs number of FL training rounds, each of the figures for a random client node selection FL scheme according to the state of the art, and with a probability based clustering and client node selection FL scheme according to a second set of embodiments herein.

In one example, as shown in graphs 1300A and 1300B of FIGS. 13A and 13B respectively, a preliminary evaluation approach for FL with a) random client node selection (plot 1302A and 1302B of FIGS. 13A and 13B, respectively), b) probability based clustering and client node selection (plots 1304A and 1304B) were performed. In this example, there were N=100 client nodes in the system each containing 600 data points from strictly 1 class of Fashion Modified National Institute of Standards and Technology (MNIST) dataset.

Fashion MNIST contains test data containing 10000 examples from all class labels (e.g. trouser, pullover, dress, coat, etc.). We train a global model using a FL approach where a subset of 10 client nodes (the client nodes in the subset selected from the various clusters) has each of its client nodes performing 1 round of local updates before sharing model updates to the central server. The central server aggregates the weights after each iteration.

Aggregation may involve performing a weighted average gradient from clients. Weights may be proportional to the number of data samples at each client For the scenario where clients were selected at random, in the example, 10 client nodes were randomly sampled by the central server in each global round. For the scenario involving clustering according to some embodiments, 1 client node from each of the 10 clusters was sampled in a round robin fashion (successively at each round), each cluster indicating a unique distribution.

The fact of the section of clients in a round robin fashion for the purpose of generating the graphs of FIGS. 13A and 13B does not limit embodiments however. According to some embodiments, for each rounds, clients may be selected from the clusters randomly, based on a number of times the client was selected in the past, based on the client's battery status, based on the client's training loss, to name a few examples.

The test accuracy (plot 1300A) and loss (plot 1300B) were recorded over the iterations as shown in FIGS. 13A and 13B, respectively.

In FIGS. 13A and 13B, the x axis represents the number of training rounds. In FIG. 2A, the y axis represents the accuracy in the training set. In FIG. 2B, the y axis represents the corresponding loss for the same experiment as that represented in FIG. 2A.

FIGS. 13A and 13B suggest that, advantageously, noise in training loss and accuracy is largely reduced as between the randomly selected client node scenario and the clustering scenario according to embodiments. In addition, advantageously, embodiments can result in training speed up in earlier iterations for the proposed method embodiment as compared with the prior art, as it achieves an accuracy over 75% 2× faster than a random client node selection. This shows the potential of training speed up for the proposed method embodiment according to the second set of embodiments described in the instant section, especially, for early iterations of the training rounds.

K. Unified Federated Gradient Update for Distributed Radio Resource Management

According to a third set of embodiments, Federated Machine Learning (ML) training methods are used for distributed Radio Resource Management (RRM). This FL approach proposes an on-device, on-line RRM training method, which not only adapts the learning according to the changing radio environment, but also avoids the resource-intensive exchange of channel state information between the client nodes and the network (such as a RAN node or a core networks (CN) within the wireless network). This third set of embodiments uses a distributed approach, wherein end-devices such as client nodes (e.g. UEs) locally learn their resource allocation policy (e.g. power allocation policy) and exchange these local policy recommendations with the network. The network then combines these local recommendations to determine the overall policy (that is, the joint policy for client nodes within the wireless network).

Advantageously, such policy recommendations can be exchanged with significantly reduced frequency as compared to regular reporting of channel state information required for traditional centralized approaches, and do so without significant impact on performance In particular, this third set of embodiments adapts a centralized ML-based solution, which trains a Neural-Network solution via a primal-dual-training to operate in a distrusted/federated setting.

The third set of embodiments generalizes the frameworks discussed in the context of FIGS. 14 and 15 below and extends their use case, for example to ad-hoc wireless networks.

A state of the art solution is provided in M. Eisen and A. Ribeiro, "Optimal Wireless Resource Allocation with Random Edge Graph Neural Networks," 4 Sep. 2019m https://arxiv.org/abs/1909.01865 (hereinafter "Optimal Wireless Resource Allocation"). It can be applied to ad-hoc wireless networks however only as long as there is a central policy maker based on time-sensitive data collected in distributed manner that is to collect all measurements and prove the RRM suggestions. However, it is in general not viable to assume the existence of a central orchestrator.

Instead of having an RRM decision structure for whole network in a central node, the third set of embodiments herein propose to have an individual RRM decision substructure for each node on the device side (either as transmitter or receiver) so that both inference and training of local RRM parameters can continue at an edge device based on new channel measurements in an on-line manner We extend the optimization problem provided in "Optimal Wireless Resource Allocation" to operate with a distributed decoupled neural network (NN) structure, and introduce interim optimization parameters.

Our method according to the third set of embodiments advantageously allows for a gradient update frequency of optimization parameters to be tuned for an available bandwidth of the central node and a desired performance, and a step size of these parameters can be adjusted depending on the global update period. We extend a solution for ad-hoc networks by having parameter-specific aggregators instead of a single aggregator for local policies.

Figure 14:
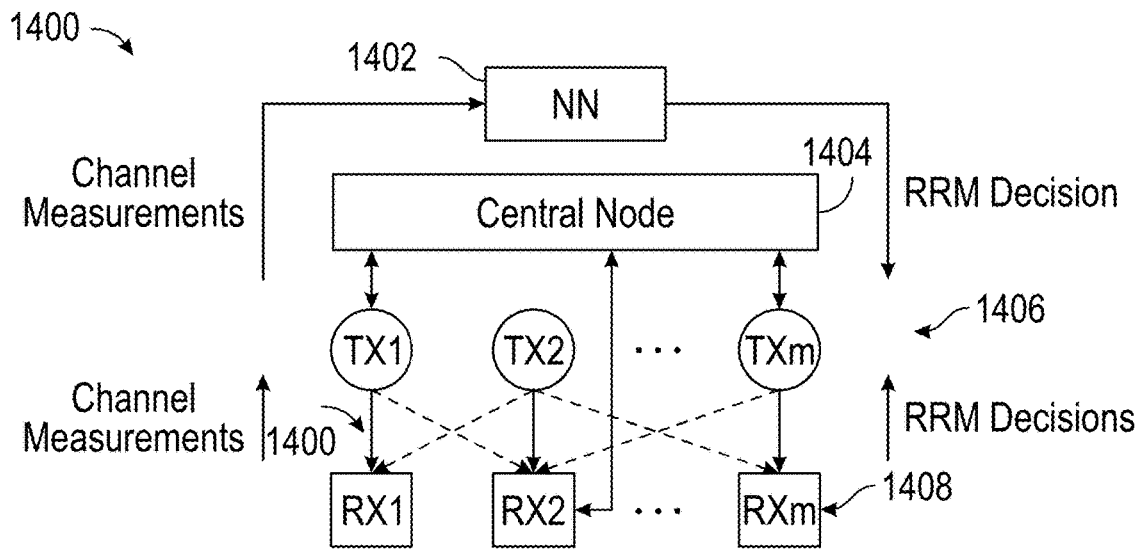
FIG. 14 illustrates a wireless network including a central node, transmitter nodes (TX nodes) and associated receiver nodes (RX nodes), where RRM decisions are made using a neural network solution at the central node according to the state of the art.
Figure 15:
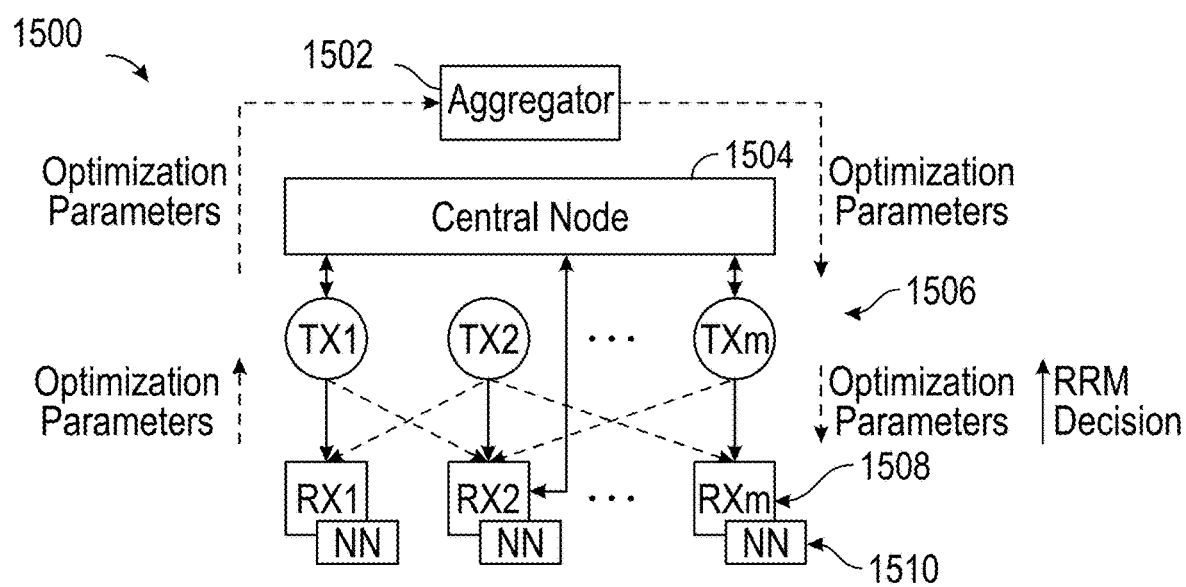
FIG. 15 illustrates a wireless network similar to that of FIG. 14, where RRM decisions are made by virtue of a sharing of policy determination functions between NNs at the RX nodes, and an aggregator at the central node, according to another solution, where the aggregator aggregates local RRM decisions by the RX nodes and provides it back to them.

As depicted in relation to a state of the art solution of FIG. 14, and to an alternative solution as depicted in FIG. 15 to be described below, some solutions allow devices with heterogeneous computation capabilities to develop an RRM solution in a federated manner, making possible reduced feedback instances as well as online solution approaches, which can adapt better to local conditions, as compared with centralized solutions of the prior art.

Let us now refer to FIG. 14, which depicts a state of the art solution as set forth in "Optimal Wireless Resource Allocation." FIG. 14 depicts a network 1400 including a central node 1404 (such as a core network (CN) or any other functionality within the radio network that is capable of achieving a coordination function among a number N of client nodes), an instance of a neural network (NN) 1404 which may be running in the central node 1404 or on another device connected to the central node 1404, a number of transmitters (TX) 1406, such as RANs including eNBs or gNBs, a number of receivers (RX) 1408 such as client nodes including, for example, UEs.

Here we define TX node and RX as follows:

Transmitter Device (TX or TX node): represents the transmitting side of the wireless data transmission when taking into account optimization as implemented in a NN as discussed herein. It is assumed to have both transmission and reception capabilities, for example when exchanging control signals, pilot signal, or channel state information.

Receiver Device (RX or RX node)): represents the receiving side of the wireless data transmission when taking into account optimization as implemented in a NN as discussed herein. It is assumed to have both transmission and reception capabilities, for example when exchanging control signals, pilot signal, or channel state information.

In a generalized context (including ad-hoc, cellular, Wi-Fi etc.), we define access point and user equipment as follows:

Access Point (AP): the node (either TX or RX) in data transfer that has a shorter path to access points of other data transmission nodes. For example, Wi-Fi access points are 1 hop closer to other Wi-Fi access points than their clients to other Wi-Fi access points. Base stations in cellular network are another example. Vehicles in a mesh network can be seen access points in this concept as well, where backhaul communication is handled through vehicle to vehicle (V2V) communication or through installed stationary equipment on the roads.

User Equipment (UE): The node (either TX or RX) in data transfer that is not an AP, such as Wi-Fi users or cellular user equipment. IoT (or handheld) devices in a vehicle which are wirelessly connected to the vehicle's modem can be an example of a UE as well.

Central Node (CN): A node in the network that has a link to more than one AP. The links from each AP to the central node are assumed to have lower latency than the links between APs. There can be more than one central node.

Policy maker: A parameterized function that determines the local (one for each TX-RX pair) RRM policy given all the current and past observations about the channel state and past policy decisions. The policy maker is assumed to be differentiable based its parameters. The outcome of the policy does not need to be deterministic. Such outcome could for example be based on parameters of a certain probability distribution from which the RRM decision will be sampled, as in the case of the example solution of FIG. 14. The policy maker can be either at a TX node or at a RX node depending on computation capabilities of nodes. The node (TX or RX) with more computation resources can be the policy maker. It can also be either at the UE or at the AP although having it at the AP may be preferred in order to reduce the number of communication steps required during the global update period.

Global Parameter Information: Any piece of information about the global parameter, it can be the gradient value, the step size, components for the gradient, or the global parameter itself.

In network 1400, channel measurements and RRM decisions need to be exchanged as often as once in every channel coherence period, noting that coherence time is the time duration over which the channel impulse response is considered to be not varying for each channel 1410 shown in FIG. 14. Depending on whether a TX node 1406 or a RX node 1408 is closer to the central node 1404, channel measurements by a client node (RX node 1408) can be either forwarded over a TX node or directly sent to the central node. Again, depending on whether a TX node 1406 or RX node 1408 is closer to the central node 1404, RRM decisions made by the NN 1402 can be either directly sent to a TX associated with a given RX, or directly forwarded over to that given RX. The framework in the network 1400 of FIG. 14 is, however, sensitive to the latency in the connection to/from the central node.

The solution of FIG. 15 proposes an on-device, on-line RRM training method, which not only adapts the learning according to the changing environment, but also avoids the resource-intensive exchange of channel state information between the client nodes 1508 and the central node 1504. Here, a distributed approach is used where end-devices, such as RX nodes or client nodes, locally learn the resource allocation policy (RRM Decision) (e.g. power allocation policy) and exchange these local policy recommendations with an aggregator. The aggregator 1502 then combines these local recommendations to determine the overall policy. Initial results have shown that these policy recommendations can be exchanged with significantly reduced frequency as compared to regular reporting of channel state information as in the case of FIG. 14, without significant impact on performance.

FIG. 15 thus pertains to an alternative solution to that of FIG. 14, and depicts a network 1500 including a central node 1504 (such as a core network (CN) or any other functionality within the radio network that is capable of achieving a coordination function among a number N of client nodes), an instance of an aggregator 1504 which represents an abstraction which may be running on the central node 1504 or on another device connected to the central node 1504, a number of transmitters (TX) 1506, such as RANs including eNBs or gNBs, a number of receivers (RX) 1508 such as client nodes including, for example, UEs.

In the solution deployed in network 1500, a framework required for a distributed solution is proposed where some optimization parameters are exchanged between the RX nodes 1508 and the central node 1504, although not necessarily as often as once every channel coherence period as in the case of FIG. 14 above. In the solution of FIG. 15, neural networks (NN) 1510 on a client node or RX node level 1508 may function to determine local (i.e. in this case on client node basis) RRM decisions, with the local RRM decisions however being made on optimization parameters that represent an aggregate of optimization parameters sent to the aggregator 1502 by a plurality of the RX nodes 1508. Thus, optimization parameters used by the NNs 1510 to determine local RRM decisions are passed between the RX nodes 1508 and the aggregator 1502. The aggregator aggregates the optimization parameters sent to it, and passes the resulting information to the RX nodes 1508 for another round of RRM decision making use of the NNs 1510 at a local level. In the context of the example of FIG. 15, a forwarding of optimization parameters over TX nodes may depend on whether TX node is closer to the central node or not. A main challenge in the solution of FIG. 15, however, is the availability of such central node in an ad-hoc environment, in addition to the fact that the solution becomes limited with the coverage area of the central node.

Figure 16:
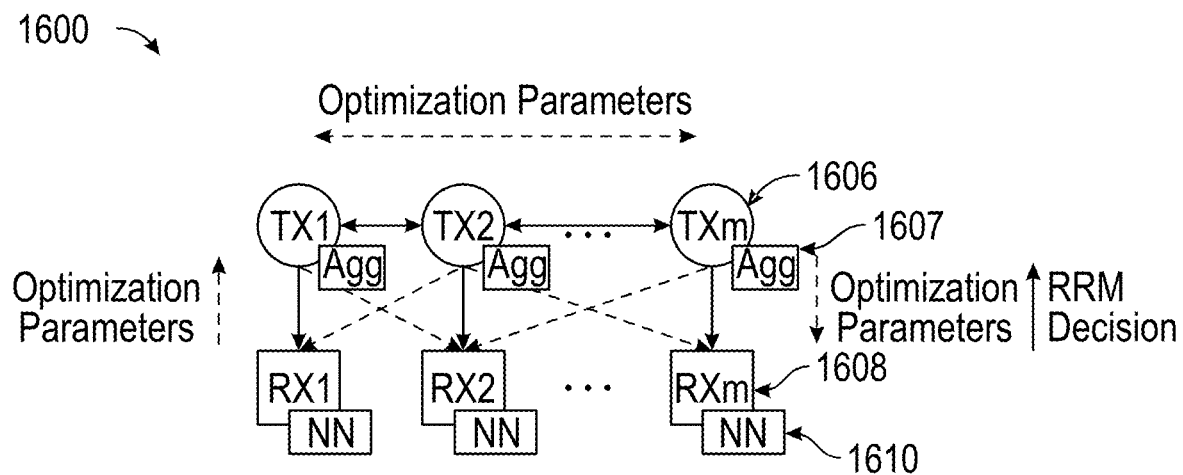
FIG. 16 pertains to a first example embodiment according to the third set of embodiments, and depicts an ad-hoc network including as many aggregator instances as there are TX nodes.
Figure 17:
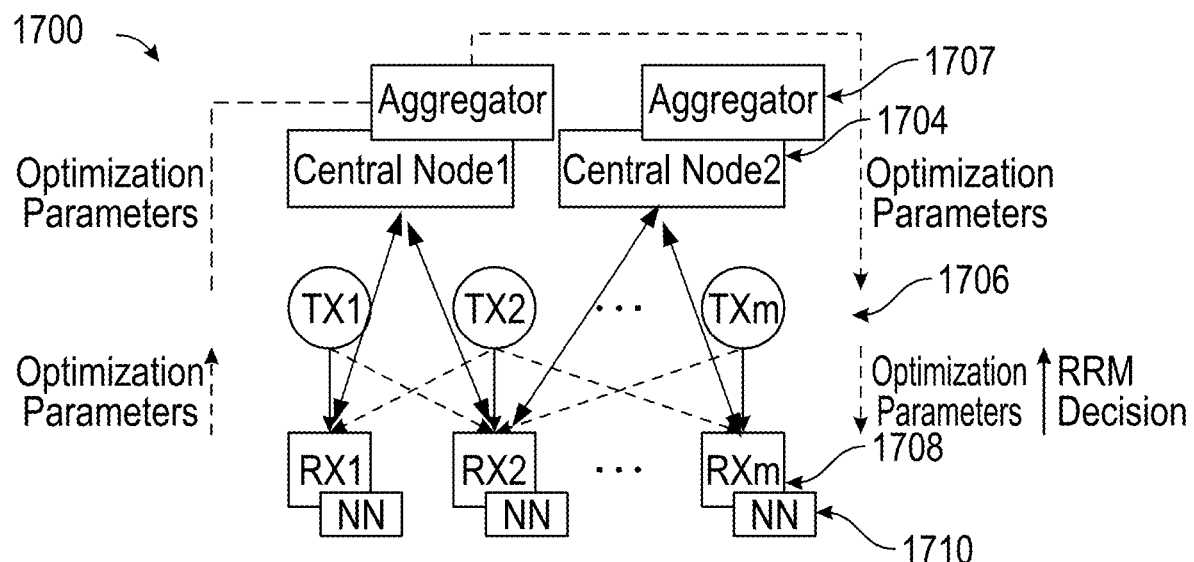
FIG. 17 pertains to a second example embodiment according to the third set of embodiments, and depicts, a wireless network where each of aggregators on a central node is responsible for an intersecting cluster of primal-dual variable updates.

The third set of embodiments described in the instant Section, for instance in the examples of FIGS. 16 and 17, can help scale ad-hoc wireless networks while taking interference into account. The third set of embodiments drives compute for client edge devices, as well as developing standards-relevant solutions.

FIG. 16 thus pertains to a first example embodiment according to the third set of embodiments as described in the instant Section, and depicts an ad-hoc network 1600 including, instead of a single instance of an aggregator housed in a central node as in the case of FIG. 15, as many aggregator instances 1607 as there are TX nodes 1606, with each aggregator instance 1607 representing an abstraction which may be running on a corresponding TX node 1606, where the TX nodes are nodes such as RANs including eNBs or gNBs. Network 1600 also includes a number of receivers (RX) 1608 such as client nodes including, for example, UEs, with respective instances of NNs 1610 running on corresponding ones of the RX nodes 1608.

In the embodiment of FIG. 16, an example framework can be realized by a distributed solution where, instead of single aggregator that dealing with the update of all optimization parameters, there are multiple aggregators in TX nodes set up in an ad-hoc network, where the aggregators are responsible for interfacing with NNs running on the RX nodes to update corresponding sets of optimization parameters, as will be explained in further detail in the context of Equations (K8)-(K15) and FIG. 21 below. In FIG. 16, all aggregators 1607 are responsible for a single set of primal-dual variable updates as will be explained in further detail below. Since the dependency between optimization parameters may be determined by the wireless interference graph as between the TX nodes 1606, it is enough to have a direct communication link between interfering TX nodes, which architecture helps with the scalability of the proposed architecture.

FIG. 17 pertains to a second example embodiment of the third set of embodiments as described in the instant Section, and depicts a network 1700 including, instead of a single instance of an aggregator housed in a single central node as in the case of FIG. 15, as many aggregator instances 1707 as there are central nodes 1702, with each aggregator instance 1707 representing an abstraction which may be running on a corresponding central node 1702, where each central node may include a core network (CN) or any other functionality within the radio network that is capable of achieving a coordination function among a number N of client nodes. The network 1700 further includes a number of receivers (RX) 1708 such as client nodes including, for example, UEs, with respective instances of NNs 1710 running on corresponding ones of the RX nodes 1708.

In the embodiment of FIG. 17, another example framework according to the third set of embodiments can be realized by the distributed solution proposed herein. Again, instead of single aggregator aggregating all optimization parameters as in the solution of FIG. 15, there are multiple aggregators 1707 that are responsible for interfacing with NNs running on the RX nodes to update different sets of optimization parameters. In the example embodiment of FIG. 17, however, each of aggregators 1707 is responsible for an intersecting cluster (i.e. sub-set) of primal-dual variable updates and is to run on a corresponding one of the central nodes 1704. Since the dependency between optimization parameters may be determined by the wireless interference graph as between the TX nodes 1706 and RX nodes 1708, it is enough to have direct communication links between the RX nodes and their TX nodes, which architecture helps with the scalability of the proposed architecture.

According to the third set of embodiments, over the air parameter exchanges can be sniffed, and monitored. The resulting performance can also be correlated against known benchmarks to detect whether this third set of embodiments are being implemented.

The details below pertain to use of a multi-aggregator wireless architecture such as, for example, those shown in FIGS. 16 and 17 and described above.

An example of implementation of an embodiment based on the third set of embodiments will be provided below with respect to power management in a cellular downlink channel. The description below will assume that RX nodes 1608/1708 see interference from a subset of TX nodes 1606/1706.

Legacy power control solutions in wireless network are based on desired signal to noise ratio (SNR) at a RX node. They usually do not consider the interference they will hear from other transmitters (TX) within the network, or the interference they will cause to neighboring RX nodes.

The third set of embodiments described in this section provide a solution that take this interference into consideration.

As seen in FIGS. 16 and 17, each TX node 1606/1706 TXi is wirelessly sending data to an associated RX node 1608/1708 RXi while creating interference with some RXj (j≠i). We define:

σ(i) as the set of RXs that see interference from TXi; and

τ(i) as the set of TXs interfering with RXi.

A decision regarding transmit power by TXi affects the throughput at RXj, noting that j∈σ(i), as well as the throughput at RXi. In this framework, neighboring TXs of TXi are also assumed to be connected via a separate network for the communication of control signals.

A central solution as described in relation to FIG. 14 is one where RRM decisions can be made with a ML-based policy maker at the central node, such as a gateway or CN. RRM problems of the above kind may be formulated as set forth in Equation (K1) below:

$$P_\theta^* := \max_{\theta, x \in X} \sum_{i=1}^m w^i x^i \qquad \text{Eq. (K1)}$$

$$\text{s.t. (so that)} \; x^i \leq E_H\left[\log\left(1 + \frac{h^{ii}\pi^i(H,\theta)}{\sum_{j\in\tau(i)} h^{ji}\pi^j(H,\theta) + N^i}\right)\right], \forall i$$

$$E_H[\pi^i(H,\theta)] \leq p^i_{max} \forall i$$

where:
- $P^*_\theta$ represents the optimized cost function of the RRM decision based on policy parameters, as can be seen in Eq. (K1), $P^*_\theta$ depends on a log of 1 plus the signal to interference and noise ratio (SINR);
- $H=[h^1, h^2, \ldots, h^m]$, $h^i=[\ldots, h^{ji}, \ldots]$ is the vector of channel gains from all TXs in $\tau(i)$ to RXi, with $h^{ji}$ representing the channel gain from TXj to RXi;
- $\theta$ is the vector of parameters (e.g. weights) representing the policy maker;
- $\pi^i(H, \theta)$ is the power decision (an example of a RRM decision) for TXi;
- $x^i$ is the achievable throughput of link i;
- $w^i$ is the weight of link i in the total network utility;
- $p_{max}^i$ is the constant representing the maximum power constraint on TXi;

$$E_H\left[\log\left(1 + \frac{h^{ii}\pi^i(H, \theta)}{\sum_{j\in\tau(i)} h^{ji}\pi^j(H, \theta) + N^i}\right)\right],$$

∀i corresponds to a Shannon capacity formula where $$\frac{h^{ii}\pi^i(H, \theta)}{\sum_{j\in\tau(i)} h^{ji}\pi^j(H, \theta) + N^i} \forall i$$

corresponds to SINR; and $E_H[\pi^i(H, \theta)]$ represents the expected/estimated power for link i.

The central solution described in relation to FIG. 14 models the policy maker as a neural network (NN) implemented in a central node of a wireless network as can be visualized in the diagram 1800 of as described in FIG. 18 to be described below.

Here, vectors of channel gains $h^i$ from TXs in $\tau(i)$ to RXi, with $h^{ji}$ representing the channel gains 1810 from TXj to RXi, as noted previously, are fed as state information input into the neural network 1402 of central node 1404, which outputs power decisions 1812 based on the input state information in the form of power decisions $n^i$ for each TXi.

In the solution of FIG. 14, introducing Lagrange variables to the optimization problem and alternating updates on primal and dual variables provide an online and adaptive algorithm for both learning and inferring the power policy. In particular, the min max problem relating to FIGS. 14 and 15 may be given by Equation (K2):

$$D_\theta^* := \min_{\lambda,\mu} \max_{\theta,x} \sum_{k=1}^m w^i x^i + \sum_{k=1}^m \lambda^i\left(\hat{F}^i(h^i, \pi(H, \theta)) - x^i\right) - \sum_k^m \mu^i\left(\hat{G}^i(\pi^i(H, \theta^i)) - p_{max}^i\right) \quad \text{Eq. (K2)}$$

where:
- $D_\theta^*$ is the optimized cost function of the RRM decision based on primal and dual parameters including policy parameters and Lagrange multipliers;

$$\hat{F}^i(h^i, \pi(H, \theta)) = E_H\left[\log\left(1 + \frac{h^{ii}\pi^i(H, \theta)}{\sum_{j\in\tau(i)} h^{ji}\pi^j(H, \theta) + N^i}\right)\right] - \text{this parameter}$$

essentially represents an estimate based on the Shannon formula noted above in relation to Equation (K1);

- $\hat{G}^i(\pi^i(H, \theta)) = E_H[\pi^i(H, \theta)]$—this parameter refers to the expected/estimated power for link I, as per Equation (K1) above; and
- $\lambda^i$ and $\mu^i$ are Lagrange variables corresponding to constraints in the optimization problem.

Then, based on the above, alternating updates may be determined are as follow in Equations (K3)-(K6):

$$\theta_{k+1} = \theta_k + \gamma_{\theta,k}[\lambda_k^i\nabla_\theta\hat{F}^i(h_k^i,\pi(H_k,\theta_k)) - \mu_k^i\nabla_\theta\hat{G}^i(\pi^i(H_k,\theta_k))] \quad \text{Eq. (K3)}$$

$$x_{k+1}^i = P_x[x_k^i + \gamma_{x,k}(w^i - \lambda_k^i)] \quad \text{Eq. (K4)}$$

$$\lambda_{k+1}^i = [\lambda_k^i + \gamma_{\lambda,k}(\hat{F}^i(h_k^i,\pi(H_k,\theta_{k+1})) - x_{k+1}^i)]_+ \quad \text{Eq. (K5)}$$

$$\mu_{k+1}^i = [\mu_k^i + \gamma_{\mu,k}(\hat{G}^i(\pi^i(H_k,\theta_{k+1})) - p_{max}^i)]_+ \quad \text{Eq. (K6)}$$

where:
- $P_x[\cdot]$ represents a projection to the convex set of throughput rates supported by available modulation and coding schemes (MCS');
- $[\cdot]_+$ represents projection to non-negative real numbers; and
- $\gamma_{\cdot,k}$ is the learning rate for the given variable at iteration k.

As one can observe, the solution described in the context of FIG. 14 provides one framework for realizing the above algorithm, and requires the exchange of channel measurements over the wireless links between the RX nodes and the TX nodes, and further on the links between the central node and TXs for both training and inference, which means that measurements need to be exchanged whenever they are obtained.

In order to distribute the algorithm, the third set of embodiments, as explained briefly above in the context of the example of FIGS. 16 and 17, modify the NN structure of FIG. 14.

Figure 18:
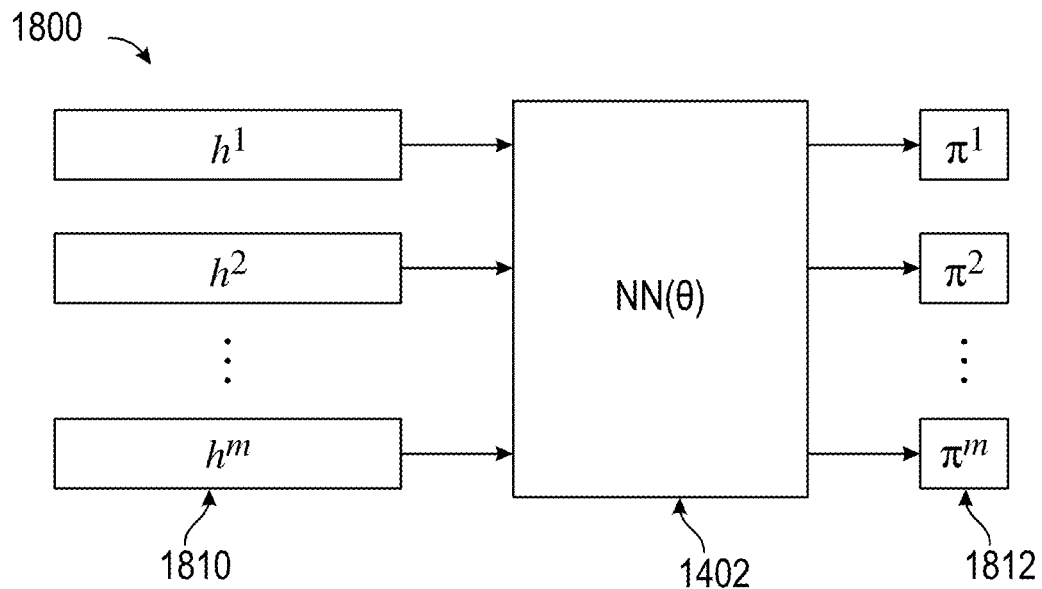
FIG. 18 is a diagram depicting the FL scheme applicable to the state of the art network of FIG. 14.

Referring to FIG. 18, as shown in the diagram 1800, the third set of embodiments as explained in the instant section propose a NN based decision maker (in the form of distinct aggregators 1607 collaborating with NNs 1610/1710) for each link and hence for each RX node as described in relation to FIG. 17 above, with the location of aggregators 1607 at the TX nodes (or central nodes) such as a base station (e.g. eNB, gNB) being advantageous in that it would allow inference of the RRM decision to happen during local channel measurements at the RXi without interfering with optimization algorithms being implemented by corresponding aggregators at the TX node level. The above will become more apparent in relation, for example, to FIG. 20 below.

Here, vectors of channel gains $h^i$ from TXs in in $\tau(i)$ to RXi, are fed as state information input into the neural networks $NN(\theta^i)$ for each RXi. Each power decision $\pi^i$ 1812 is based on the input state information $h^i$ for each RXi.

Under the framework of FIG. 18, the optimization problem may be given by Equation (K7):

$$P_\theta^* := \max_{\theta, x \in \mathcal{X}} \sum_{i=1}^{m} w^i x^i \quad \text{Eq. (K7)}$$

$$\text{s.t. } x^i \leq E_{h^i}\left[\log\left(1 + \frac{h^{ii}\pi^i(h^i, \theta^i)}{\sum_{j \in \tau(i)} h^{ji}\pi^j(h^j, \theta^j) + N^i}\right)\right], \forall i$$

$$E_{h^i}[\pi^i(h^i, \theta^i)] \leq p_{max}^i \forall i$$

Then, in order to decouple the interference, the machine learning problem may be relaxed by introducing a new set of variables, $\rho^{ij}$, representing the maximum expected transmit power allowed for TXj by RXi when $i \neq j$. Then the problem may be expressed in Equation (K8):

$$P_\theta^* := \max_{\theta, x, \rho \in \mathcal{X}} \sum_{k=1}^{m} w^j x^j \quad \text{Eq. (K8)}$$

$$\text{s.t. } x^i \leq E_{h^i}\left[\log\left(1 + \frac{h^{ii}\pi^i(h^i, \theta^i)}{\sum_{j \in \tau(i)} h^{ji}\rho^{ji} + N^i}\right)\right], \forall i$$

$$E_{h^i}[\pi^i(h^i, \theta^i)] \leq p_{max}^i, \forall i$$

$$E_{h^j}[\pi^j(h^j, \theta^j)] \leq \rho^{ji}, \forall i, \forall j \in \tau(i)$$

Then we can follow a similar approach as that explained in relation to Equation (K2) above by the introduction of Lagrange variables and alternating update of primal and dual parameters in Equation (K9):

$$D_\theta^* := \min_{\lambda, \mu, \nu} \max_{\theta, x, P} \sum_{i=1}^{m} w^j x^j + \sum_{i=1}^{m} \lambda^i \left(\hat{F}^i(h^i, \pi^i(h^i, \theta^i), \rho^i) - x^i\right) - \quad \text{Eq. (K9)}$$

$$\sum_{i}^{m} \mu^i \left(\hat{G}^i(\pi^i(h^i, \theta^i)) - p_{max}^i\right) - \sum_{i} \sum_{j \in \tau(i)} v^{ji}\left(\hat{G}^j(\pi^j(h^j, \theta^j)) - \rho^{ji}\right)$$

where:

$$\hat{F}^i(h^i, \pi^i(h^i, \theta^i), \rho^i) = E_{h^i}\left[\log\left(1 + \frac{h^{ii}\pi^i(h^i, \theta^i)}{\sum_{j \in \tau(i)} h^{ji}\rho^{ji} + N^i}\right)\right];$$

$$\text{and } \hat{G}^i(\pi^i(h^i, \theta^i)) = E_{h^i}[\pi^i(h^i, \theta^i)].$$

Then the updates may be given by Equations (K10)-(K15):

$$\theta_{k+1}^i = \theta_k^i + \gamma_{\theta, k}\left[\lambda_k^i \nabla_{\theta^i} F^i(h_k^i, \pi^i(h_k^i, \theta_k^i), \rho_k^i) - \right. \quad \text{Eq. (K10)}$$

$$\left. \mu_k^i \nabla_{\theta^i} G^i(\pi^i(h_k^i, \theta_k^i)) - \sum_{j \in \sigma(i)} v_k^{ij} \nabla_{\theta^i} G^i(\pi^i(h_k^i, \theta_k^i))\right]$$

$$x_{k+1}^i = P_X[x_k^i + \gamma_{x, k}(w^i - \lambda_k^i)] \quad \text{Eq. (K11)}$$

$$\rho_{k+1}^{ji} = \left[\rho_k^{ji} + \gamma_{P, k}\left[\lambda_k^i \nabla_{\rho^{ji}} \hat{F}^i(h_k^i, \pi^i(h_k^i, \theta_k^i), \rho_k^i) + v_k^{ji}\right]\right]_+ \quad \text{Eq. (K12)}$$

-continued $$\lambda_{k+1}^i = \left[\lambda_k^i - \gamma_{\lambda, k}\left(\hat{F}^i(h_k^i, \pi^i(h_k^i, \theta_{k+1}^i), \rho_k^i) - x_{k+1}^i\right)\right]_+ \quad \text{Eq. (K13)}$$

$$\mu_{k+1}^i = \left[\mu_k^i + \gamma_{\mu, k}\left(\hat{G}^i(\pi^i(h_k^i, \theta_{k+1}^i)) - p_{max}^i\right)\right]_+ \quad \text{Eq. (K14)}$$

$$v_{k+1}^{ij} = \left[v_k^{ij} + \gamma_{N, k}\left(\hat{G}^j(\pi^i(h_k^i, \theta_{k+1}^i)) - \rho_{k+1}^{ij}\right)\right]_+ \quad \text{Eq. (K15)}$$

where:

$v^i$ is a Lagrange variable corresponding to a constraint in the optimization problem, in this case $\rho$.

In the Equations (K9)-(K15) above, the interference power is kept bounded. Expectations on interference rather than actual observed values are exchanged for the link I, as the RX nodes will not have access to immediate decisions by other transmitters when they send data based on a certain power decision—but they need it to be available to optimize their own powers—we do not use actual interference powers but expected interference powers.

As long as the policy maker i has access to $\rho_k^i = [\ldots, \rho_k^{ij}, \ldots]^T$, $j \in \tau(i)$ and $v_k^i = [\ldots, v_k^{ij}, \ldots]$, $j \in \sigma(i)$, it can update $\theta_{k+1}^i$, $x_{k+1}^i$, $\lambda_{k+1}^i$, and $\mu_{k+1}^i$ locally (e.g. at RXi) without the need of information exchange with the TX nodes. The policy maker may, according to one embodiment be initialized to given values for the vectors $\rho_k^i$ and $v_k^i$, and these vectors may then be updated as the learning progresses. We can consider the parameters $\theta_{k+1}^i$, $x_{k+1}^i$, $\lambda_{k+1}^i$, and $\mu_{k+1}^i$ are local parameters in this example. However, for $\rho_{k+1}^{ji}$ and $v_{k+1}^{ij}$ updates, information will need to be exchanged between policy makers. For the latter reason, updates $\rho_{k+1}^{ji}$ and $v_{k+1}^{ij}$ be considered as global parameters, which need to be exchanged. In other words, the NN at link i needs to store the information about how much TX power it anticipates seeing from the TX nodes j interfering with RXi, as well as how much the RX nodes j seeing interference from TXi care about the power decision at link i.

Since it can take a longer time for the exchange between the policy makers, the exchange may be implemented to happen less frequently, meaning that, updates of $\theta_{k+1}^i$, $x_{k+1}^i$, $\lambda_{k+1}^i$, and $\mu_{k+1}^i$ can happen immediately, e.g. at the NNi's of the RX is after a new set of channel measurements are taken, whereas the updates of $\rho_{k+1}^{ji}$ and $v_{k+1}^{ij}$ can happen once in a while, every global update period. Keeping the noted parameters local will help the inference to be implemented faster than having them be used at a NN that is implemented at a central node (e.g. FIG. 14), and training on these parameters may also therefore happen as fast as channel measurement arrival rates.

A proposed framework for power control in an ad-hoc wireless environment will now be described below.

For the algorithm described above in relation to Equation (K8)-(K15) to operate, a control signaling framework may be implemented between each TX and RX pair and between the TXs.

Figure 19:
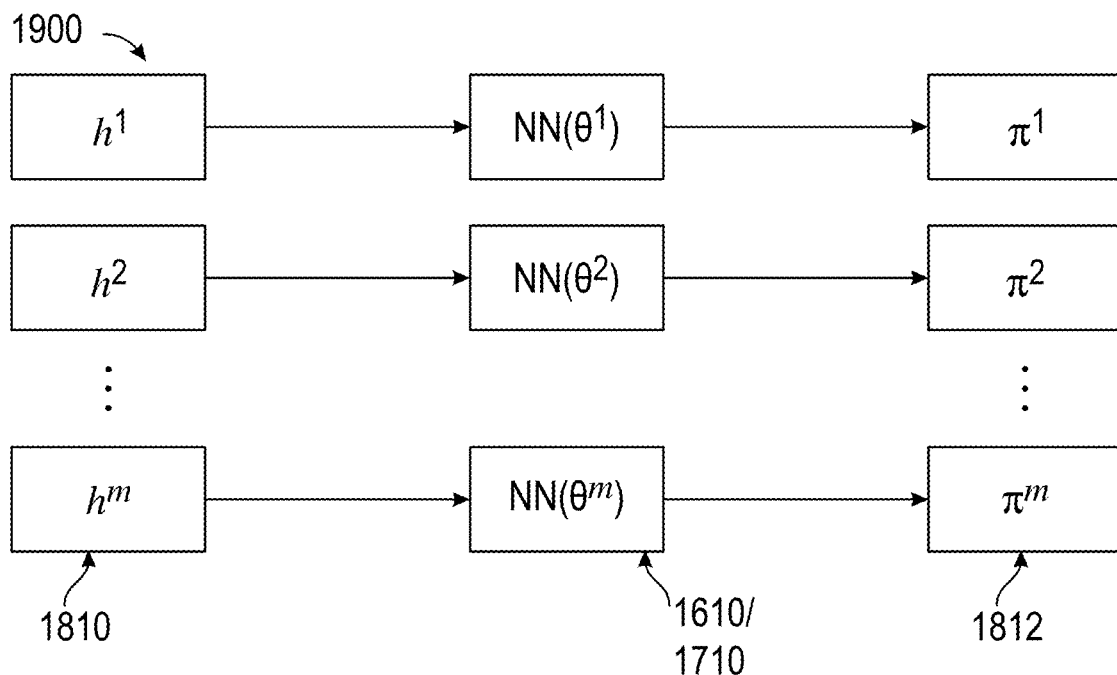
FIG. 19 is a diagram depicting a FL scheme according to the third set of embodiments.
Figure 20:
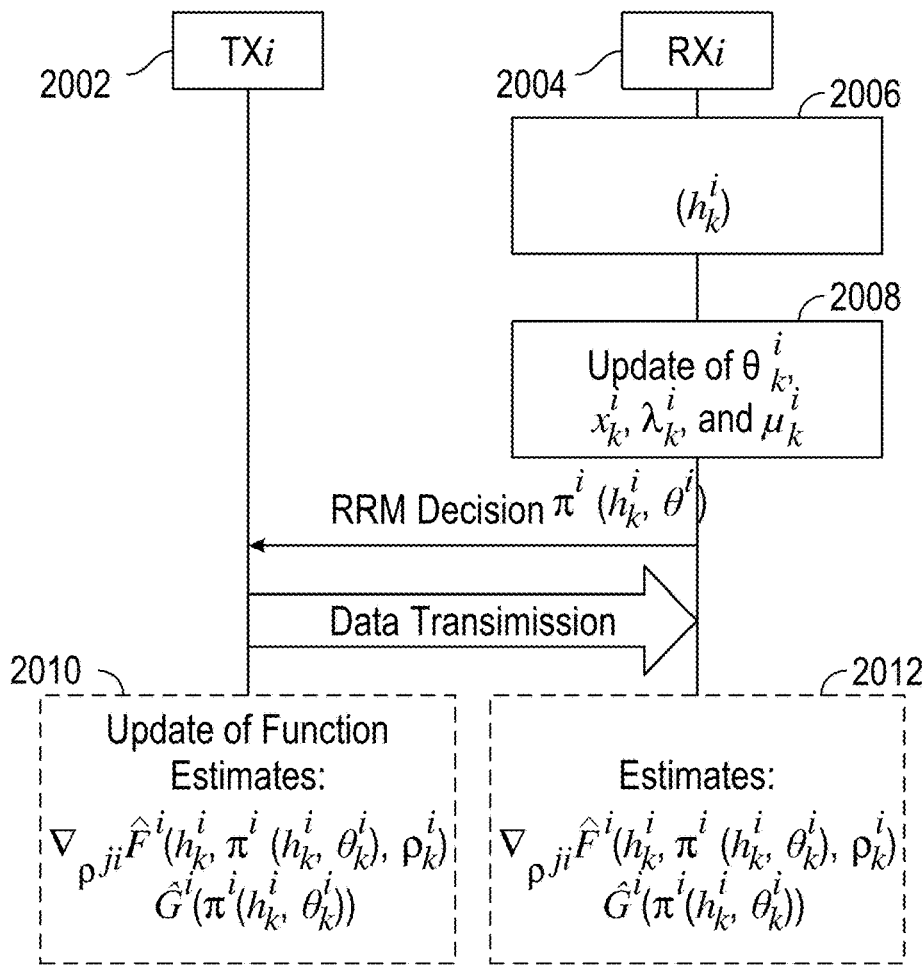
FIG. 20 is a signaling diagram depicting a channel measurements and local update phase of parameters for a FL scheme according to the third set of embodiments.

As shown in the signal exchange diagram 1900 of FIG. 19 and diagram 2000 of FIG. 20 showing TXi and RXi, once the RXi measures at operation 2006 the current channel obtaining $h_k^i$, it updates local parameters ($\theta_k^i$, $x_k^i$, $\lambda_k^i$, and $\mu_k^i$) locally at operation 2008 and then retrieves the decision (RRM Decision $\pi_k^i$) made on the updated NN implemented at RXi and forwards it to the TX. Then TXi may transmit data at the power level decided by the NN. After the data transmission, the estimates of functions will be used in the update of global parameters ($\rho_k^{ji}$ and $v_k^{ij}$) at operations 2010 as one option, or 2012 as another option. Even though these global parameters are not necessarily updated at every iteration, functions required for their update include estimates of expectations over channel instances, which can be updated at every new channel observation locally. Such estimates may include updates to $\nabla_{\rho^{ji}}\hat{F}^i(h_k^i, \pi^i(h_k^i, \theta_k^i), \pi_k^i)$ and $\hat{G}^i(\pi^i(h_k^i, \theta_{k+1}^i))$. Depending on the availability of the required information and the computation capabilities at each node, these estimations can be calculated at either the TX side or RX side. We will call these local signaling and local calculations as local operations. Local operations can be repeated over and over until the next global update, which we will describe next.

In the power control problem, global parameters $\rho_k^{ji}$ and $v_k^{ij}$ may be stored at TXi or at RXi, $\forall j$. However, the update of $\rho_{k+1}^{ji}$ requires $v_k^{ji}$, which may not be present at TXi, and the update of $v_{k+1}^{ij}$ requires $\rho_{k+1}^{ij}$, which may not be present at TXi. Therefore, these parameters may be exchanged with the TXi after their update as will be explained in further detail below in relation to FIGS. 21-24. Because of the primal-dual update method in the solution, the global update period includes one update and exchange for primal parameters ($\theta$, x and $\rho$) and one update and exchange for dual parameters (the Lagrange variables $\lambda$, $\mu$, $v$). After these exchanges, local operations can continue as described. However, during global exchanges, the update of local parameters can be skipped in the local operations.

Figure 21:
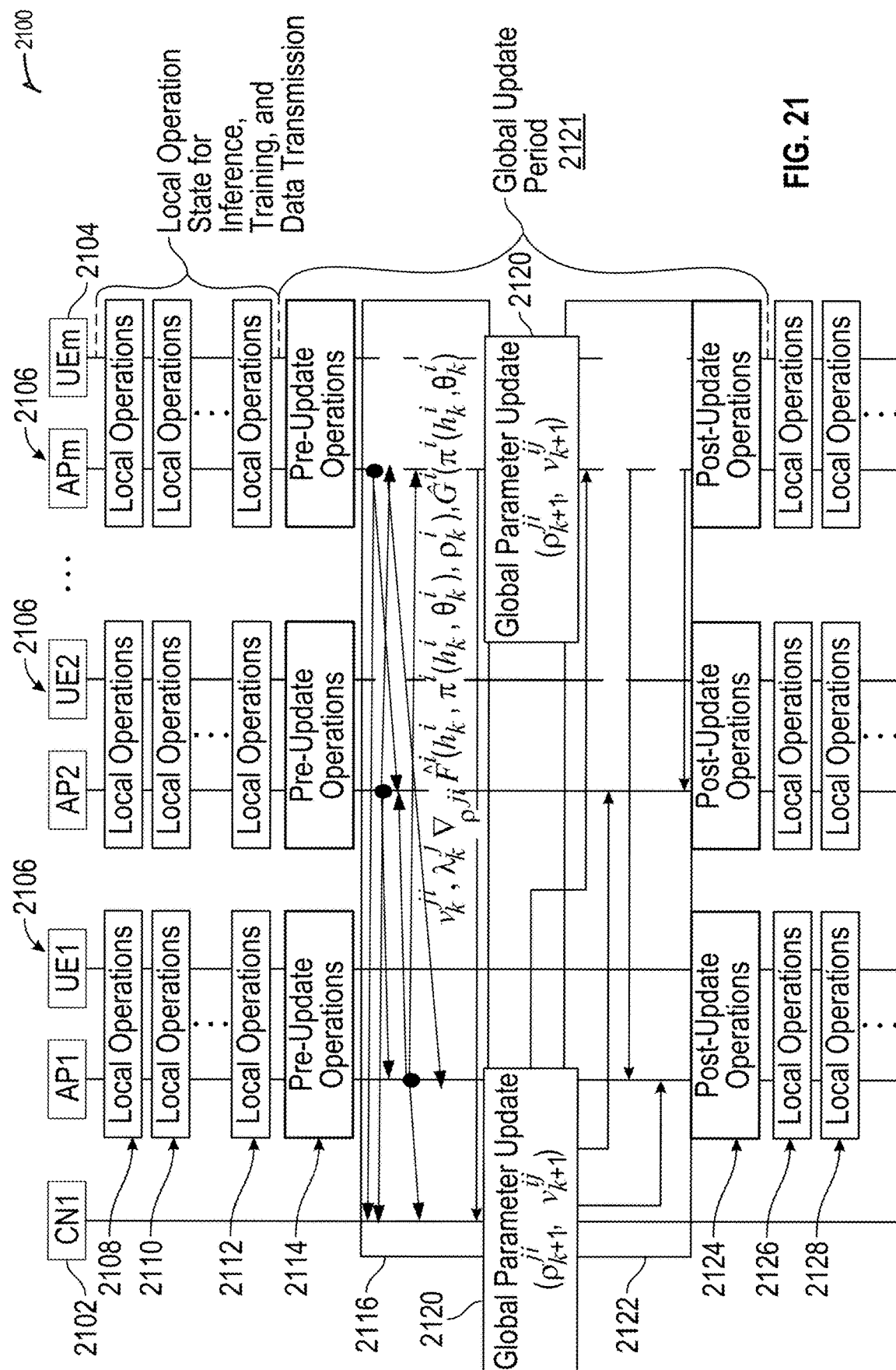
FIG. 21 is a signaling diagram depicting an example FL scheme between multiple access points (APs) and multiple user equipments (UEs) according to the third set of embodiments.
Figure 22:
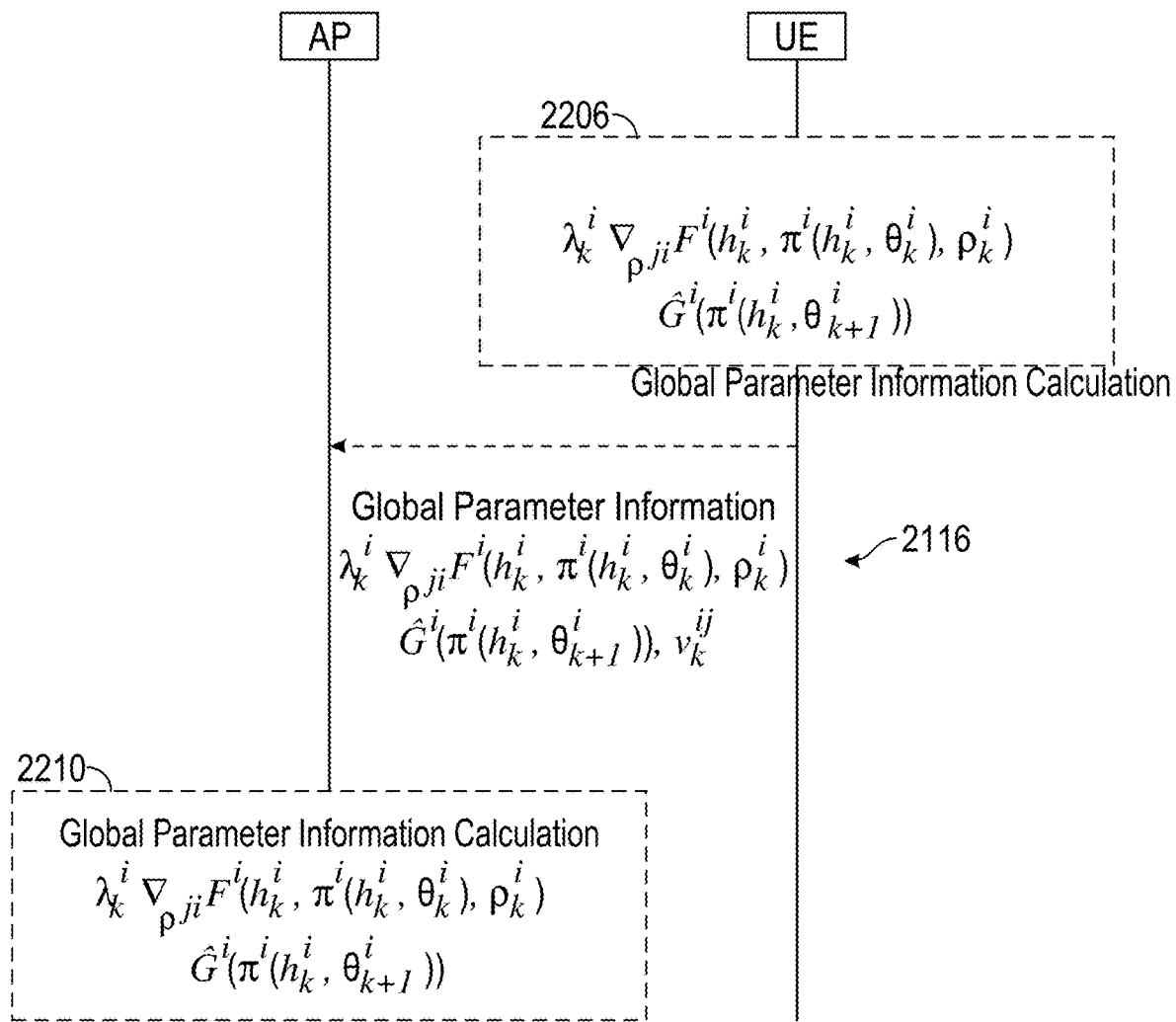
FIG. 22 is a signaling diagram depicting a global parameter calculation and information exchange based on the diagram of FIG. 21.

The signal exchange diagram 2100 of FIG. 21 pertains to global updates as described above, and shows an example of a cellular network for example for the network 1600 of FIG. 16, where the central node is a CN, TX nodes are APs 1-m, the RX nodes are UEs 1-m. In diagram 2100, the global update period 2121 includes pre-update operations 2114, global update operations 2120 and post-update operations 2124, where the calculations and exchanges happen regarding the updating of global parameters $\rho_{k+1}^{ji}$ and $v_{k+1}^{ij}$. Recall that $\rho_{k+1}^{ji}$ represents the maximum expected updated transmit power allowed for TXi by RXj when j≠i. Recall also that $v_{k+1}^{ij}$ represents the Lagrange variable corresponding to $\rho_{k+1}^{ji}$.

The local operations involving a determination of local parameters ($\theta_k^i$, $x_k^{ji}$, $\lambda_k^i$, and $\mu_k^i$) at any number of rounds 2108, 2110 and 2114, followed by the global update period 2121, and by any number of rounds 2126 and 2128 of determining local parameters k+1.

Some advantages of having a framework similar to that of FIG. 9 is that it allows faster inference because NN parameters ($\theta^i$) and inputs ($h^i$) are local and that training on NN parameters can continue locally as new data arrives to the RX nodes.

Each of the pre-update operations 2114, the global update operations 2120 and post-update operations 2124 will be described below.

Pre-update operations 2114, include, in instances where at least some of the global parameter information is determined at the UEs, a first global parameter information exchange 2116 as seen in FIG. 21. As shown in more detail in FIG. 22, pre update operations 2114 represent a first stage of the global update period 2121, where information about global parameters is obtained at the TX nodes (APs in this example) from the RX nodes. If the policy maker is at the AP or if enough RRM function updates in local operations are done at the AP, then the information can be calculated directly at the AP. Otherwise, it has to be calculated (at least partially) at the UE and sent to the AP. Thus, operations 2206 and 2116 pertain to one instance where global parameter information is determined at each UE (RXi) for its AP (TXi), whereas operation 2210 pertains to the determination of global parameter information at the AP (TXi). Thus, in the pre-update operations 2114, depending on the location of the policy maker, either the UE calculates the gradients (even if it is partial) and sends the related information to its AP, or the AP calculates the global parameters directly.

Figure 23:
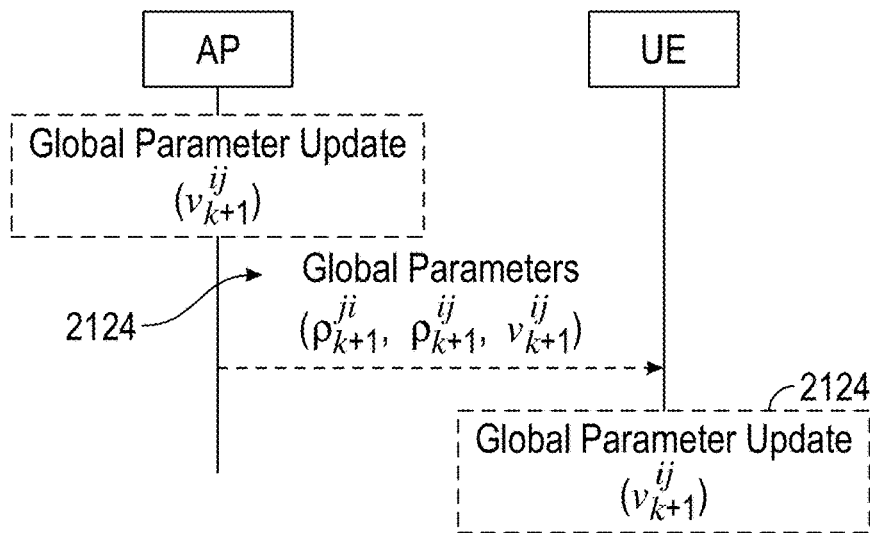
FIG. 23 is a signaling diagram depicting a global parameter update based on the diagram of FIG. 23.

Global parameter update operations 2120, as shown in FIG. 23, represent a next stage of the global update period 2121. Taking a step back and referring to FIG. 21, in order for the global parameter update operations 2120 to take place, the global parameter information exchange stage 2116 of the pre-update operation 2114 is a necessary stage to allow the APs to update global parameters they are responsible for at operation 2120, and to send them to their associated UE. Along with this information, each AP may send to other APs within the network the number of local parameter updates that have taken place, and the related time elapsed since the last global update.

The exchange between APs of global parameter information may be multicast, unicast or broadcast depending on the nature of the information. Such exchange may also be through intermediate nodes (such as a central node) or core network (CN).

For example, each AP can choose the subset of APs (e.g. dominant interferers to their data transmission) when imposing the constraints for the problem and then communicate with them only. The AP may also communicate such constraints with all APs within the network.

Upon completion of the exchange of global parameter information, the policy maker(s) can implement the global parameter updates, for example as set forth in Equations (K12) and (K15) above. If the update for global parameters of an AP is handled by a CN, then other APs exchange global parameter information with this central node. It is assumed that APs are capable to make the global parameter update. If not, they can outsource this duty to their UEs or to a CN.

There are two set of information exchanges to allow consecutive primal-dual updates in the algorithm described herein. In the first exchange, $\lambda_k^i \nabla_{\rho^{ji}}\hat{F}^i(h_k^i, \pi^i(h_k^i, \theta_k^i), \pi_k^i)$ and $v_k^{ji}$ are shared with the policy maker (either at central node or AP). In the second exchange, $\rho_{k+1}^{ji}$ and $v_{k+1}^{ij}$ may be shared with UEs Post-update operations 2124, as shown in the diagram of FIG. 23, represent a next stage of the global update period 2121. Once the APs receive the global parameter information in the first exchange at 2116, where some parameters have been used to determine a local policy, the APs can then, at the global parameter update stage 2120, update one or more dual parameters and forward these parameters at operation 2124 to their UEs if the policy maker is at the UE side, or the dual parameters may be updated at the UEs themselves. Thus, for post-update operations, if the policy maker is at the UE side, then the global parameters have to be forwarded to UE.

Variations to the third set of embodiments as described above with respect to FIGS. 8-11 are possible, some of which are described below.

Figure 24:
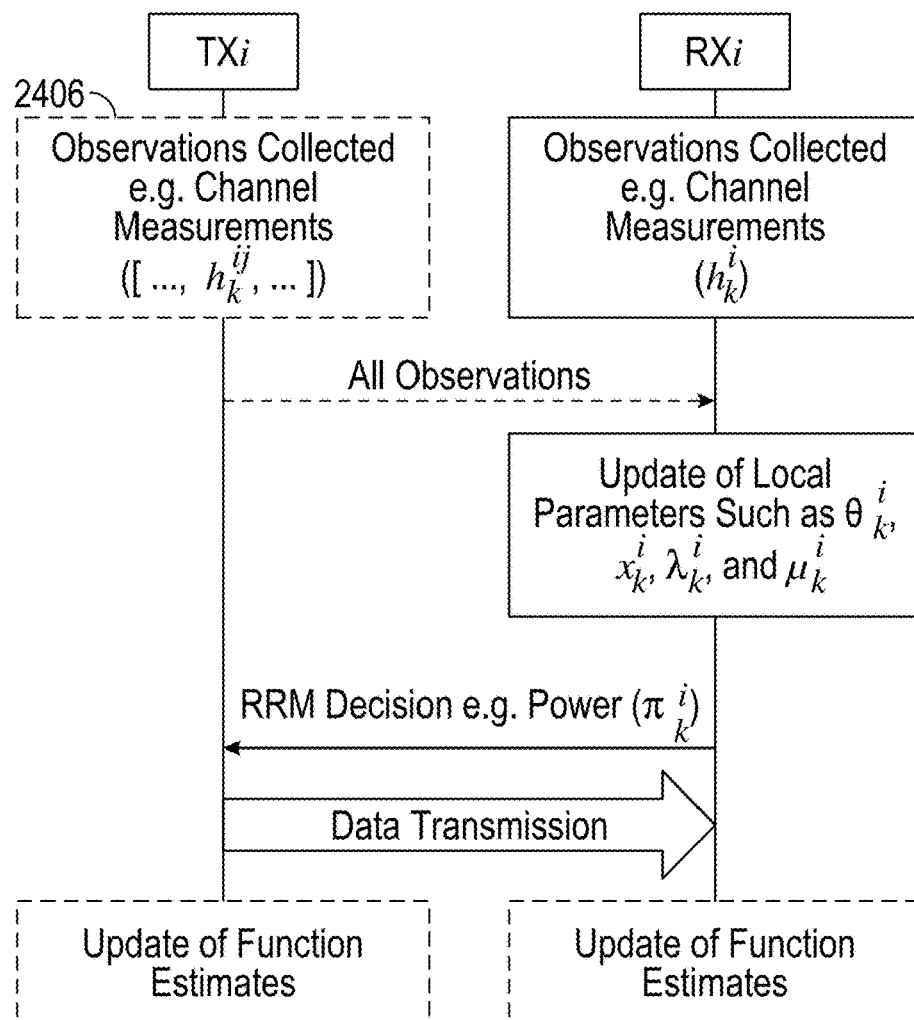
FIG. 24 is a signaling diagram depicting a use and exchange of historical observations between a TX node and its associated RX node to allow an updating of local parameters.

For example, according to an embodiment, as shown by way of example in the diagram 2400 of FIG. 24, not only the channel measurements from the RX nodes, but also channel measurements from the TX node at operation 2406 can serve as inputs to a policy maker under reciprocity assumptions. Therefore, some embodiments envisage an optional channel measurement operation 2406 at the TX side as well.

In addition, the policy maker may, according to an embodiment, take past observations into account as well, such as, for example, past decisions of other policy makers may be used when deciding future RRM decisions, such as power levels, as long as they can be observed.

The policy maker does not need to output the transmit power only. It can also provide decision on other wireless communication resources such as frequency bands to transmit.

Figure 25:
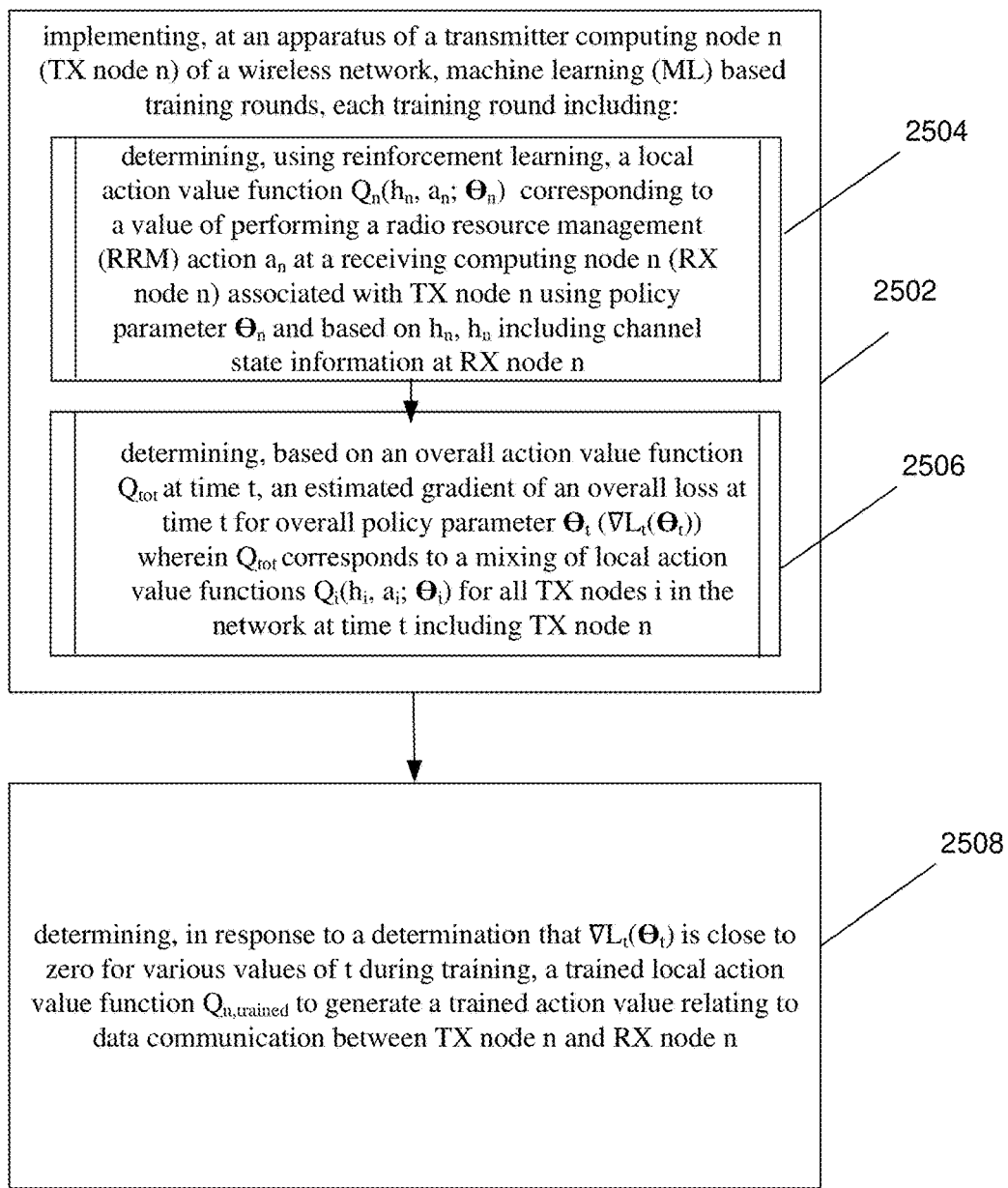
FIG. 25 illustrates a process according to a first embodiment.

FIG. 25 is a process 2500 according to the first set of embodiments described in Section I above. At operation 2502, the process includes implementing, at an apparatus of a transmitter computing node n (TX node n) of a wireless network, machine learning (ML) based training rounds, each training round including, determining, at operation 2504, using reinforcement learning, a local action value function $Q_n(h_n, a_n; \theta_n)$ corresponding to a value of performing a radio resource management (RRM) action $a_n$ at a receiving computing node n (RX node n) associated with TX node n using policy parameter $\theta_n$ and based on $h_n$, $h_n$ including channel state information at RX node n; and at operation 2506, determining, based on an overall action value function $Q_{tot}$ at time t, an estimated gradient of an overall loss at time t for overall policy parameter $\theta_t(\nabla L_t (\theta_t))$ wherein $Q_{tot}$ corresponds to a mixing of local action value functions $Q_i(h_i, a_i; \theta_i)$ for all TX nodes i in the network at time t including TX node n. Process 2500 further includes at operation 2508, determining, in response to a determination that $\nabla L_t(\theta_t)$ is close to zero for various values of t during training, a trained local action value function $Q_{n,trained}$ to generate a trained action value relating to data communication between TX node n and RX node n.

Figure 26:
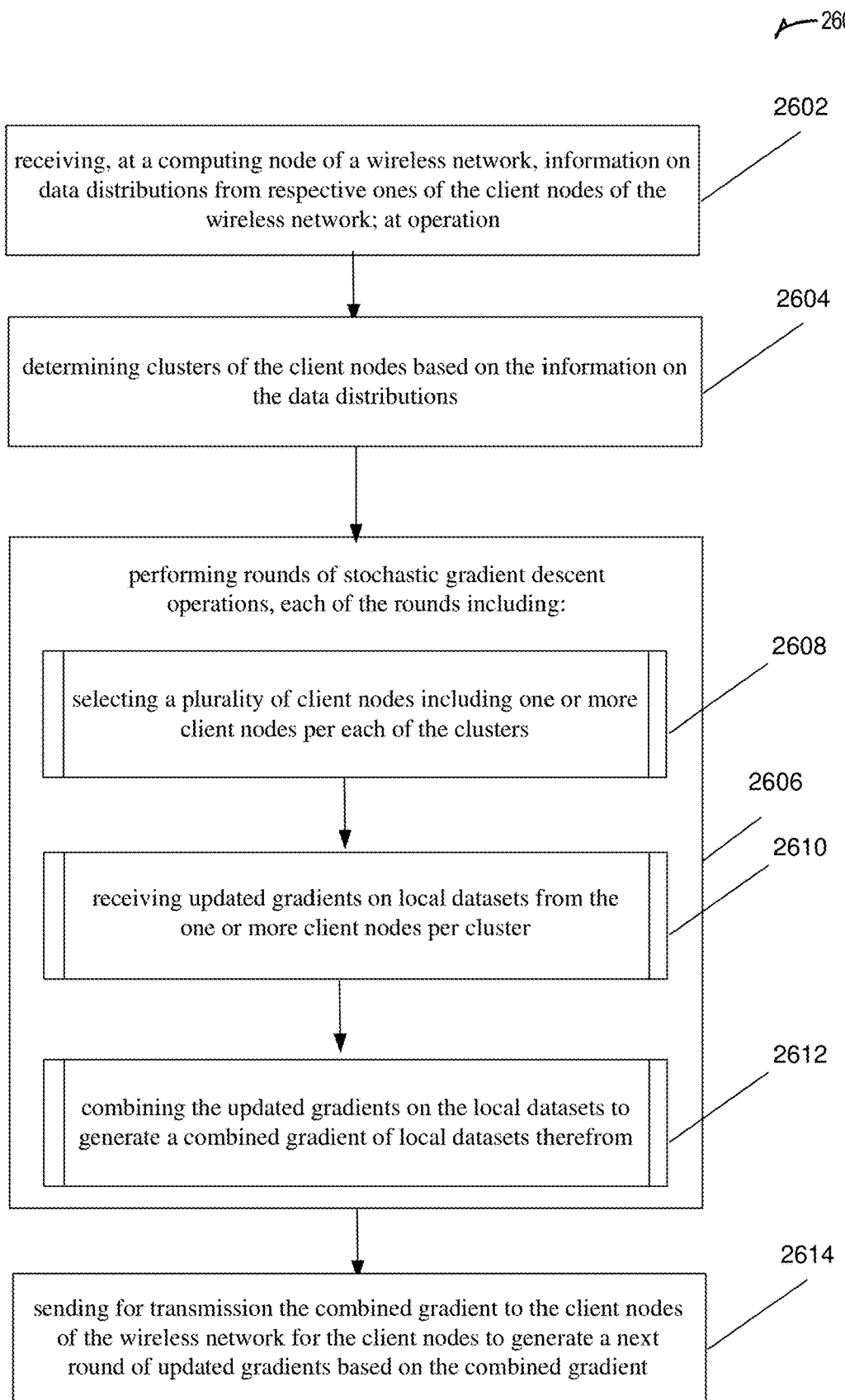
FIG. 26 illustrates a process according to a first embodiment.

FIG. 26 is a process 2600 according to the second set of embodiments described in Section J above. Process 2600 includes at operation 2602, receiving, at a computing node of a wireless network, information on data distributions from respective ones of the client nodes of the wireless network; at operation 2604, determining clusters of the client nodes based on the information on the data distributions; and at operation 2606, performing rounds of stochastic gradient descent operations, each of the rounds including: at operation 2608, selecting a plurality of client nodes including one or more client nodes per each of the clusters; at operation 2610, receiving updated gradients on local datasets from the one or more client nodes per cluster; and at operation 2612, combining the updated gradients on the local datasets to generate a combined gradient of local datasets therefrom. Process 2600 includes at operation 2614, sending for transmission the combined gradient to the client nodes of the wireless network for the client nodes to generate a next round of updated gradients based on the combined gradient.

Figure 27:
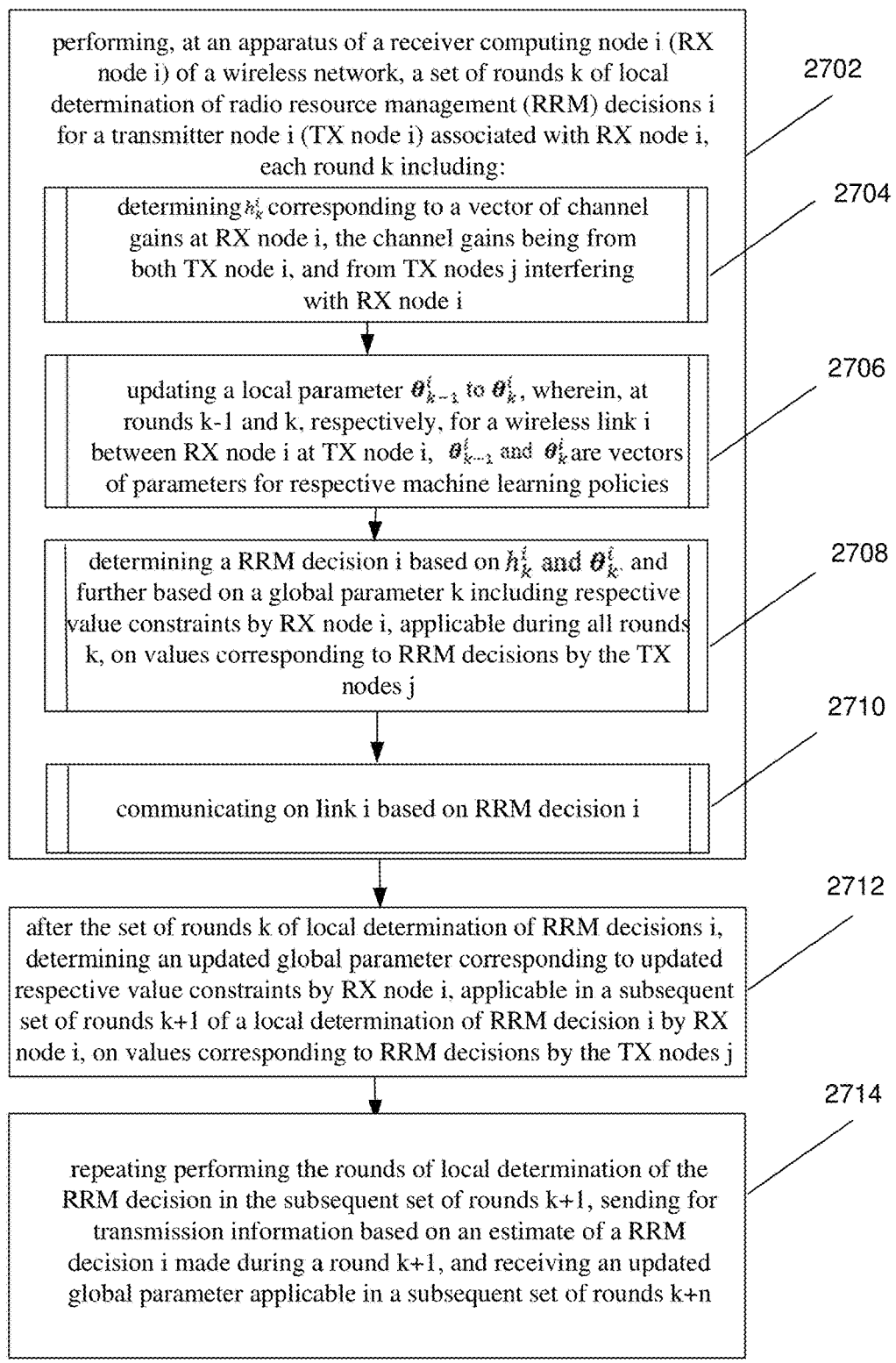
FIG. 27 illustrates a process according to a first embodiment.

FIG. 27 is a process 2700 to be performed according to the third set of embodiments described in Section K above. Process 2700 includes, at operation 2702, performing, at an apparatus of a receiver computing node i (RX node i) of a wireless network, a set of rounds k of local determination of radio resource management (RRM) decisions i for a transmitter node i (TX node i) associated with RX node i, each round k including: at operation 2704, determining $h_k^i$ corresponding to a vector of channel gains at RX node i, the channel gains being from both TX node i, and from TX nodes j interfering with RX node i; at operation 2706, updating a local parameter $\theta_{k-1}^i$ to $\theta_k^i$, wherein, at rounds k−1 and k, respectively, for a wireless link i between RX node i at TX node i, $\theta_{k-1}^i$ and $\theta_k^i$ are vectors of parameters for respective machine learning policies; at operation 2708, determining a RRM decision i based on $h_k^i$ and $\theta_k^i$, and further based on a global parameter k including respective value constraints by RX node i, applicable during all rounds k, on values corresponding to RRM decisions by the TX nodes j; and at operation 2710, communicating on link i based on RRM decision i. Process 2700 further includes, at operation 2712, after the set of rounds k of local determination of RRM decisions i, determining an updated global parameter corresponding to updated respective value constraints by RX node i, applicable in a subsequent set of rounds k+1 of a local determination of RRM decision i by RX node i, on values corresponding to RRM decisions by the TX nodes j; and at operation 2714, repeating performing the rounds of local determination of the RRM decision in the subsequent set of rounds k+1, sending for transmission information based on an estimate of a RRM decision i made during a round k+1, and receiving an updated global parameter applicable in a subsequent set of rounds k+n.

Even though we have described above a NN in the example solution to serve as a policy maker, it can be any parameterized function whose parameters can be optimized using gradient decent (i.e. differentiable) (hence the preference for the use of the expression "policy maker" herein instead of NN).

Some embodiments of the third set of embodiments in this Section include implementing a policy maker in a device (such as a TX node, including, for example, an AP, a cellular base station, etc.) that is to train parameters for a RRM decision via gradient descent. Preferably, the policy maker is implemented on a device that is more computationally robust than a client node/RX node.

According to an embodiment, inputs to the policy maker, or inputs to the policy maker's gradient update function may include local channel observations, past local RRM decisions, locally observable past decisions of other policy makers, local constraints, and global feedback from other policy makers.

According to an embodiment, each policy maker may independently choose as many interferers ("j") as it can track and apply a convolutional NN (CNN) or any other ML algorithm to utilize permuted interfering channel data.

According to an embodiment, the policy maker may determine local parameter updates via gradient descent after performing channel measurements or receiving channel measurement feedback and before making the RRM decision for that channel conditions.

According to an embodiment, predefined RRM function values may be updated either by the policy maker, or by the policy maker of another node, such as a TX node or a central serve or CN, based on the current and previous decisions and performances.

According to an embodiment, the policy maker may determine (e.g. be configured with) a global update period for the wireless network including the device onto which the policy maker is implemented (the network including a plurality of TX nodes and a plurality of RX nodes), where the local parameters are to be stored at the device before (or kept unchanged during) the global update period.

According to an embodiment, global parameter information may be calculated at the TX node, or to be calculated at and send by the RX node to the TX node before the updating of global parameters and communication of global parameter updates with nodes within the network, such as with other TX nodes.

The TX nodes may share global parameter information with a central server, such as a CN or a gateway (GW) in a cellular wireless architecture.

According to some embodiments, the GW or CN may update the global parameters based on the exchanged global parameter information, the number of local updates since the last global update, and the time passed since the last update.

According to some embodiments, updated global parameters may be shared with relevant APs.

According to some embodiments, the updated global parameters may be shared by the UE if it is the policy maker.

Example Edge Computing Implementations

Additional examples of the presently described method, system, and device embodiments include the following, non-limiting implementations. Each of the following non-limiting examples may stand on its own or may be combined in any permutation or combination with any one or more of the other examples provided below or throughout the present disclosure.

As referred to below, an "apparatus of" an edge computing node is meant to refer to a "component" of "node," such as of a central node, central server, server, client node, client computing node, client device, client or user, as the component is defined above. A client, client node, or client compute/computing node may refer to an edge computing node that is serving as a client device and, in the examples below, may perform training of a global model using local data, which the client may wish to keep private (e.g., from other nodes). The "apparatus" as referred to herein may refer, for example, to a processor such as processor 852 of edge computing node 850 of FIG. 8, or to the processor 852 of FIG. 8 along with any other components of the edge computing node 850 of FIG. 8, or, for example to circuitry corresponding to a computing node 515 or 523 with virtualized processing capabilities as described in FIG. 5.

EXAMPLES

Example IA1 includes an apparatus of a transmitter computing node n (TX node n) of a wireless network, the apparatus including an interconnect interface to connect the apparatus to one or more components of the TX node n, and one or more processors to: implement machine learning (ML) based training rounds, each training round including: determining, using reinforcement learning, a local action value function $Q_n(h_n, a_n; \theta_n)$ corresponding to a value of performing a radio resource management (RRM) action $a_n$ at a receiving computing node n (RX node n) associated with TX node n using policy parameter $\theta_n$ and based on $h_n$, $h_n$ including channel state information at RX node n; and determining, based on an overall action value function $Q_{tot}$ at time t, an estimated gradient of an overall loss at time t for overall policy parameter $\theta_t$ ($\nabla L_t(\theta_t)$ wherein $Q_{tot}$ corresponds to a mixing of local action value functions $Q_i(h_i, a_i; \theta_i)$ for all TX nodes i in the network at time t including TX node n; and determine, in response to a determination that $\nabla L_t(\theta_t)$ is close to zero for various values of t during training, a trained local action value function $A_{n,trained}$ to generate a trained action value relating to data communication between TX node n and RX node n.

Example IA2 includes the subject matter of Example IA1, the one or more processors to further receive, during said each training round, $h_n$ from RX node n, wherein $h_n$ includes information on a state of a channel n between the TX node and the RX node n and information $h_{mn}$ on states of respective channels between other TX nodes m and the RX node n.

Example IA3 includes the subject matter of Example IA1, wherein Q is discounted long term value.

Example IA4 includes the subject matter of Example IA1, wherein the one or more processors are to determine, during said each training round, an estimated gradient of a local loss at time t for policy parameter $\theta_{n,t}$; ($\nabla L_t(\theta_{n,t})$) prior to determining the trained local action value function.

Example IA5 includes the subject matter of Example IA1, wherein the one or more processors are to send data for transmission to the RX node n based on the trained action value.

Example IA6 includes the subject matter of Example IA1, wherein the one or more processors are to, at a start of the training rounds, implement an initialization function to initialize a value for $a_n$ and $\theta_n$.

Example IA7 includes the subject matter of Example IA1, wherein the one or more processors are to, at each training round: determine $Q_{tot}$, wherein $Q_{tot}$ is based on H, a and $\theta$, wherein H corresponds to a matrix of channel state information between pairs of TX nodes and RX nodes of the network, a corresponds to a vector of RRM decisions for each TX node i of the network, and $\theta$ is a policy parameter to map H to a; and send for transmission $Q_{tot}$ to other TX nodes m of the network.

Example IA8 includes the subject matter of Example IA7, wherein the one or more processors are to, at a start of the training rounds, implement an initialization function to initialize a value for $\theta$.

Example IA9 includes the subject matter of Example IA1, wherein the one or more processors are to send $Q_n$ and $h_n$ for transmission to a central server, and to receive $Q_{tot}$ from the central server, $Q_{tot}$ corresponding to a mixing of local action value functions $Q_i(h_i, a_i; \theta_i)$ for all TX nodes i in the network at time t including TX node n.

Example IA10 includes the subject matter of Example IA1, wherein determining $\nabla L_t(\theta_t)$ includes using a gradient descent operation.

Example IA11 includes the subject matter of Example IA1, wherein determining $\nabla L_t(\theta_{n,t})$ includes using a chain rule operation.

Example IA12 includes the subject matter of Example IA1, wherein $L_t(\theta_t)$ is based on subtracting, from a target value $y_{tot}$ for the overall target value function Qtot, a square of Qtot at time t.

Example IA13 includes the subject matter of Example IA1 and further comprising a transceiver coupled to the one or more processors, and one or more antennas coupled to the transceiver, the antennas to send and receive wireless communications in the wireless network.

Example IA14 includes the subject matter of Example IA13, further comprising a system memory coupled to the one or more processors, the system memory to store instructions, the one or more processors to execute the instructions to perform the training.

Example IA15 includes the subject matter of Example IA14, further comprising: a network interface card (NIC) coupled to the one or more processors to connect the one or more processors to a core network by way of wired access; and a housing that encloses the one or more processors, the transceiver, and the NIC.

Example IA16 includes the subject matter of Example IA15, wherein the housing further includes power circuitry to provide power to the apparatus.

Example IA17 includes the subject matter of Example IA15, wherein the housing further includes mounting hardware to enable attachment of the housing to another structure.

Example IA18 includes the subject matter of Example IA15, wherein the housing further includes at least one input device.

Example IA19 includes the subject matter of Example IA15, wherein the housing further includes at least one output device.

Example IM1 includes a method to be performed at an apparatus of a transmitter computing node n (TX node n) of a wireless network, the method including: implementing machine learning (ML) based training rounds, each training round including: determining, using reinforcement learning, a local action value function $Q_n(h_n, a_n; \theta_n)$ corresponding to a value of performing a radio resource management (RRM) action $a_n$ at a receiving computing node n (RX node n) associated with TX node n using policy parameter $\theta_n$ and based on $h_n$, $h_n$ including channel state information at RX node n; and determining, based on an overall action value function $Q_{tot}$ at time t, an estimated gradient of an overall loss at time t for overall policy parameter $\theta_t(\nabla L_t(\theta_t))$ wherein $Q_{tot}$ corresponds to a mixing of local action value functions $Q_i(h_i, a_i; \theta_i)$ for all TX nodes i in the network at time t including TX node n; and determine, in response to a determination that $\nabla L_t(\theta_t)$ is close to zero for various values of t during training, a trained local action value function $Q_{n,trained}$ to generate a trained action value relating to data communication between TX node n and RX node n.

Example IM2 includes the subject matter of Example IM1, further including receiving, during said each training round, $h_n$ from RX node n, wherein $h_n$ includes information on a state of a channel n between the TX node and the RX node n and information $h_{mn}$ on states of respective channels between other TX nodes m and the RX node n.

Example IM3 includes the subject matter of Example IM1, wherein Q is discounted long term value.

Example IM4 includes the subject matter of Example IM1, further including determining, during said each training round, an estimated gradient of a local loss at time t for policy parameter $\theta_t$; $(\nabla L_t(\theta_{n,t}))$ prior to determining the trained local action value function.

Example IM5 includes the subject matter of Example IM1, further including sending data for transmission to the RX node n based on the trained action value.

Example IM6 includes the subject matter of Example IM1, further including, at a start of the training rounds, implementing an initialization function to initialize a value for $a_n$ and $\theta_n$.

Example IM7 includes the subject matter of Example IM1, further including, at each training round: determining $Q_{tot}$, wherein $Q_{tot}$ is based on H, a and $\theta$, wherein H corresponds to a matrix of channel state information between pairs of TX nodes and RX nodes of the network, a corresponds to a vector of RRM decisions for each TX node i of the network, and $\theta$ is a policy parameter to map H to a; and sending for transmission $Q_{tot}$ to other TX nodes m of the network.

Example IM8 includes the subject matter of Example IM7, further including, at a start of the training rounds, implementing an initialization function to initialize a value for $\theta$.

Example IM9 includes the subject matter of Example IM1, further including sending $Q_n$ and $h_n$ for transmission to a central server, and to receive $Q_{tot}$ from the central server, $Q_{tot}$ corresponding to a mixing of local action value functions $Q_i(h_i, a_i; \theta_i)$ for all TX nodes i in the network at time t including TX node n.

Example IM10 includes the subject matter of Example IM1, wherein determining $\nabla L_t(\theta_t)$ includes using a gradient descent operation.

Example IM11 includes the subject matter of Example IM1, wherein determining $\nabla L_t(\theta_{n,t})$ includes using a chain rule operation.

Example IM12 includes the subject matter of Example IM1, wherein $L_t(\theta_t)$ is based on subtracting, from a target value $y_{tot}$ for the overall target value function Qtot, a square of Qtot at time t.

Example IM13 includes the subject matter of Example IM1, further transmitting data to the RX node n by way of a wireless transceiver and antennas coupled to one or more antennas.

Example IB1 includes a non-transitory machine readable storage medium having instructions stored thereon, the instructions when executed by an apparatus of a transmitter computing node n (TX node n) of a wireless network to cause the apparatus to perform operations including: implementing machine learning (ML) based training rounds, each training round including: determining, using reinforcement learning, a local action value function $Q_n(h_n, a_n; \theta_n)$ corresponding to a value of performing a radio resource management (RRM) action $a_n$ at a receiving computing node n (RX node n) associated with TX node n using policy parameter $\theta_n$ and based on $h_n$, $h_n$ including channel state information at RX node n; and determining, based on an overall action value function $Q_{tot}$ at time t, an estimated gradient of an overall loss at time t for overall policy parameter $\theta_t(\nabla L_t(\theta_t))$ wherein $Q_{tot}$ corresponds to a mixing of local action value functions $Q_i(h_i, a_i; \theta_i)$ for all TX nodes i in the network at time t including TX node n; and determine, in response to a determination that $\nabla L_t(\theta_t)$ is close to zero for various values of t during training, a trained local action value function $Q_{n,trained}$ to generate a trained action value relating to data communication between TX node n and RX node n.

Example IB2 includes the subject matter of Example IB1, the operations further including receiving, during said each training round, $h_n$ from RX node n, wherein $h_n$ includes information on a state of a channel n between the TX node and the RX node n and information $h_{mn}$ on states of respective channels between other TX nodes m and the RX node n.

Example IB3 includes the subject matter of Example IB1, wherein Q is discounted long term value.

Example IB4 includes the subject matter of Example IB1, the operations further including determining, during said each training round, an estimated gradient of a local loss at time t for policy parameter $\theta_{n,t}$; $(\nabla L_t(\theta_{n,t}))$ prior to determining the trained local action value function.

Example IB5 includes the subject matter of Example IB1, the operations further including sending data for transmission to the RX node n based on the trained action value.

Example IB6 includes the subject matter of Example IB1, the operations further including, at a start of the training rounds, implementing an initialization function to initialize a value for $a_n$ and $\theta_n$.

Example IB7 includes the subject matter of Example IB1, the operations further including, at each training round: determining $Q_{tot}$, wherein $Q_{tot}$ is based on H, a and $\theta$, wherein H corresponds to a matrix of channel state information between pairs of TX nodes and RX nodes of the network, a corresponds to a vector of RRM decisions for each TX node i of the network, and $\theta$ is a policy parameter to map H to a; and sending for transmission $Q_{tot}$ to other TX nodes m of the network.

Example IB8 includes the subject matter of Example IB7, the operations further including, at a start of the training rounds, implementing an initialization function to initialize a value for $\theta$.

Example IB9 includes the subject matter of Example IB1, the operations further including sending $Q_n$ and $h_n$ for transmission to a central server, and to receive $Q_{tot}$ from the central server, $Q_{tot}$ corresponding to a mixing of local action value functions $Q_i(h_i, a_i; \theta_i)$ for all TX nodes i in the network at time t including TX node n.

Example IB10 includes the subject matter of Example IB1, wherein determining $\nabla L_t(\theta_t)$ includes using a gradient descent operation.

Example IB11 includes the subject matter of Example IB1, wherein determining $\nabla L_t(\theta_{n,t})$ includes using a chain rule operation.

Example IB12 includes the subject matter of Example IB1, wherein $L_t(\theta_t)$ is based on subtracting, from a target value $y_{tot}$ for the overall target value function Qtot, a square of Qtot at time t.

Example IB13 includes the subject matter of Example IB1, further transmitting data to the RX node n by way of a wireless transceiver coupled to one or more antennas.

Example JA1 includes an apparatus of a computing node of a wireless network, the apparatus including an interconnect interface to connect the apparatus to one or more components of the computing node, and one or more processors to: receive information on data distributions from respective ones of the client nodes of the wireless network; determine clusters of the client nodes based on the information on the data distributions; and perform rounds of stochastic gradient descent operations, each of the rounds including: selecting a plurality of client nodes including one or more client nodes per each of the clusters; receiving updated gradients on local datasets from the one or more client nodes per cluster; combining the updated gradients on the local datasets to generate a combined gradient of local datasets therefrom; and sending for transmission the combined gradient to the client nodes of the wireless network for the client nodes to generate a next round of updated gradients based on the combined gradient.

Example JA2 includes the subject matter of Example JA1, wherein the information on the data distributions includes, for each of the client nodes, a histogram of a data distribution thereof, the histogram including information on respective fractions of data classes for said each of the client nodes, each of the respective fractions in the histogram corresponding to a fraction of an amount of data for a class of data at said each client node over a total amount of data of the histogram at said each client node.

Example JA3 includes the subject matter of Example JA2, wherein the histogram includes information on respective fractions of data classes for only a subset of the data samples of said each of the client nodes.

Example JA4 includes the subject matter of Example JA2, wherein determining clusters includes determining the clusters based on normalized histograms of said each of the client nodes.

Example JA5 includes the subject matter of Example JA4, the one or more processors are to normalize histograms of data distributions of the clients nodes to generate normalized histograms thereof, and to determine the clusters based on the normalized histograms.

Example JA6 includes the subject matter of Example JA4, wherein determining the clusters includes using an affinity propagation algorithm to arrive at the clusters.

Example JA7 includes the subject matter of Example JA6, wherein the affinity propagation is based on an input similarity matrix S, wherein S includes entries $s_{i,j}$, where $s_{i,j} = -0.5 ((d(h_i, h_j) + d(h_j, h_i))$, where $s_{i,i} = 0$ for all i, and where with $d(h_i, h_j)$ representing a distance between the histogram (data distribution) for client node i and the histogram for client node j, and $d(h_j, h_i)$ representing a distance between the histogram (data distribution) for client node i and the histogram for client node j, and wherein determining the clusters including clustering together client nodes with a maximum degree similarity $s_{i,j}$ between them.

Example JA8 includes the subject matter of Example JA2, wherein the one or more processors are to receive additional information from said respective ones of the client nodes, the additional information including at least one of: battery discharge status; computing capabilities; type of device associated with said respective ones of the client nodes; number of data samples; or connectivity status; and Example JA9 includes the subject matter of Example JA8, wherein selecting the plurality of client nodes is based on the additional information.

Example JA10 includes the subject matter of Example JA8, wherein combining includes weighted combining, wherein weights used for combining are based on at least one of a number of data samples at said respective ones of the client nodes, a training loss at said respective ones of the client nodes, a number of times said respective ones of the client nodes were selected as the one or more client nodes, and a gradient norm of said respective ones of the client nodes.

Example JA11 includes the subject matter of Example JA1, further comprising a transceiver coupled to the one or more processors, and one or more antennas coupled to the transceiver, the antennas to send and receive wireless communications in the wireless network.

Example JA12 includes the subject matter of Example JA11, further comprising a system memory coupled to the one or more processors, the system memory to store instructions, the one or more processors to execute the instructions to perform the training.

Example JA13 includes the subject matter of Example JA12, further comprising: a network interface card (NIC) coupled to the one or more processors to connect the one or more processors to a core network by way of wired access; and a housing that encloses the one or more processors, the transceiver, and the NIC.

Example JA14 includes the subject matter of Example JA13, wherein the housing further includes power circuitry to provide power to the apparatus.

Example JA15 includes the subject matter of Example JA13, wherein the housing further includes mounting hardware to enable attachment of the housing to another structure.

Example JA16 includes the subject matter of Example JA13, wherein the housing further includes at least one input device.

Example JA17 includes the subject matter of Example JA13, wherein the housing further includes at least one output device.

Example JM1 includes a method to be performed at a computing node of a wireless network, the method including: receiving information on data distributions from respective ones of the client nodes of the wireless network; determining clusters of the client nodes based on the information on the data distributions; and performing rounds of stochastic gradient descent operations, each of the rounds including: selecting a plurality of client nodes including one or more client nodes per each of the clusters; receiving updated gradients on local datasets from the one or more client nodes per cluster; combining the updated gradients on the local datasets to generate a combined gradient of local datasets therefrom; and sending for transmission the combined gradient to the client nodes of the wireless network for the client nodes to generate a next round of updated gradients based on the combined gradient.

Example JM2 includes the subject matter of Example JM1, wherein the information on the data distributions includes, for each of the client nodes, a histogram of a data distribution thereof, the histogram including information on respective fractions of data classes for said each of the client nodes, each of the respective fractions in the histogram corresponding to a fraction of an amount of data for a class of data at said each client node over a total amount of data of the histogram at said each client node.

Example JM3 includes the subject matter of Example JM2, wherein the histogram includes information on respective fractions of data classes for only a subset of the data samples of said each of the client nodes.

Example JM4 includes the subject matter of Example JM2, wherein determining clusters includes determining the clusters based on normalized histograms of said each of the client nodes.

Example JM5 includes the subject matter of Example JM4, further including normalizing histograms of data distributions of the clients nodes to generate normalized histograms thereof, and to determine the clusters based on the normalized histograms.

Example JM6 includes the subject matter of Example JM4, wherein determining the clusters includes using an affinity propagation algorithm to arrive at the clusters.

Example JM7 includes the subject matter of Example JM6, wherein the affinity propagation is based on an input similarity matrix S, wherein S includes entries $s_{i,j}$, where $s_{i,j}=-0.5\,((d(h_i, h_j)+d(h_j, h_i))$, where $s_{i,i}=0$ for all i, and where with $d(h_i, h_j)$ representing a distance between the histogram (data distribution) for client node i and the histogram for client node j, and $d(h_j, h_i)$ representing a distance between the histogram (data distribution) for client node i and the histogram for client node j, and wherein determining the clusters including clustering together client nodes with a maximum degree similarity $s_{i,j}$ between them.

Example JM8 includes the subject matter of Example JM2, wherein the method further includes receiving additional information from said respective ones of the client nodes, the additional information including at least one of: battery discharge status; computing capabilities; type of device associated with said respective ones of the client nodes; number of data samples; or connectivity status; and Example JM9 includes the subject matter of Example JM8, wherein selecting the plurality of client nodes is based on the additional information.

Example JM10 includes the subject matter of Example JM8, wherein combining includes weighted combining, wherein weights used for combining are based on at least one of a number of data samples at said respective ones of the client nodes, a training loss at said respective ones of the client nodes, a number of times said respective ones of the client nodes were selected as the one or more client nodes, and a gradient norm of said respective ones of the client nodes.

Example JM11 includes the subject matter of Example JM1, and further comprising sending and receiving wireless communications in the wireless network using a transceiver coupled to one or more processors of the apparatus, and one or more antennas coupled to the transceiver.

Example JB1 includes a non-transitory machine readable storage medium having instructions stored thereon, the instructions when executed by an apparatus of a computing node of a wireless network, to cause the apparatus to perform operations including: receiving information on data distributions from respective ones of the client nodes of the wireless network; determining clusters of the client nodes based on the information on the data distributions; and performing rounds of stochastic gradient descent operations, each of the rounds including: selecting a plurality of client nodes including one or more client nodes per each of the clusters; receiving updated gradients on local datasets from the one or more client nodes per cluster; combining the updated gradients on the local datasets to generate a combined gradient of local datasets therefrom; and sending for transmission the combined gradient to the client nodes of the wireless network for the client nodes to generate a next round of updated gradients based on the combined gradient.

Example JB2 includes the subject matter of Example JB1, wherein the information on the data distributions includes, for each of the client nodes, a histogram of a data distribution thereof, the histogram including information on respective fractions of data classes for said each of the client nodes, each of the respective fractions in the histogram corresponding to a fraction of an amount of data for a class of data at said each client node over a total amount of data of the histogram at said each client node.

Example JB3 includes the subject matter of Example JB2, wherein the histogram includes information on respective fractions of data classes for only a subset of the data samples of said each of the client nodes.

Example JB4 includes the subject matter of Example JB2, wherein determining clusters includes determining the clusters based on normalized histograms of said each of the client nodes.

Example JB5 includes the subject matter of Example JB4, the operations further including normalizing histograms of data distributions of the clients nodes to generate normalized histograms thereof, and to determine the clusters based on the normalized histograms.

Example JB6 includes the subject matter of Example JB4, wherein determining the clusters includes using an affinity propagation algorithm to arrive at the clusters.

Example JB7 includes the subject matter of Example JB6, wherein the affinity propagation is based on an input similarity matrix S, wherein S includes entries $s_{i,j}$, where $s_{i,j}=-0.5\,((d(h_i, h_j)+d(h_j, h_i))$, where $s_{i,i}=0$ for all i, and where with $d(h_i, h_j)$ representing a distance between the histogram (data distribution) for client node i and the histogram for client node j, and $d(h_j, h_i)$ representing a distance between the histogram (data distribution) for client node i and the histogram for client node j, and wherein determining the clusters including clustering together client nodes with a maximum degree similarity $s_{i,j}$ between them.

Example JB8 includes the subject matter of Example JB2, the operations further including receiving additional information from said respective ones of the client nodes, the additional information including at least one of: battery discharge status; computing capabilities; type of device associated with said respective ones of the client nodes; number of data samples; or connectivity status; and Example JB9 includes the subject matter of Example JB8, wherein selecting the plurality of client nodes is based on the additional information.

Example JB10 includes the subject matter of Example JB8, wherein combining includes weighted combining, wherein weights used for combining are based on at least one of a number of data samples at said respective ones of the client nodes, a training loss at said respective ones of the client nodes, a number of times said respective ones of the client nodes were selected as the one or more client nodes, and a gradient norm of said respective ones of the client nodes.

Example JB11 includes the subject matter of Example JB1, the operations further comprising sending and receiving wireless communications in the wireless network using a transceiver coupled to one or more processors of the apparatus, and one or more antennas coupled to the transceiver.

Example KA1 includes an apparatus of a receiver computing node i (RX node i) of a wireless network, the apparatus including an interconnect interface to connect the apparatus to one or more components of the RX node i, and one or more processors to; perform a set of rounds k of local determination of radio resource management (RRM) decisions i for a transmitter node i (TX node i) associated with RX node i, each round k including: determining $h_k^i$ corresponding to a vector of channel gains at RX node i, the channel gains being from both TX node i, and from TX nodes j interfering with RX node i; updating a local parameter $\theta_{k-1}^i$ to $\theta_k^i$, wherein, at rounds k−1 and k, respectively, for a wireless link i between RX node i at TX node i, $\theta_{k-1}^i$ and $\theta_k^i$ are vectors of parameters for respective machine learning policies; determining a RRM decision i based on $h_k^i$ and $\theta_k^i$, and further based on a global parameter k including respective value constraints by RX node i, applicable during all rounds k, on values corresponding to RRM decisions by the TX nodes j; and communicating on link i based on RRM decision i; after the set of rounds k of local determination of RRM decisions i, determine an updated global parameter corresponding to updated respective value constraints by RX node i, applicable in a subsequent set of rounds k+1 of a local determination of RRM decision i by RX node i, on values corresponding to RRM decisions by the TX nodes j; and repeat performing the rounds of local determination of the RRM decision in the subsequent set of rounds k+1, sending for transmission information based on an estimate of a RRM decision i made during a round k+1, and receiving an updated global parameter applicable in a subsequent set of rounds k+n.

Example KA2 includes the subject matter of Example KA1, the one or more processors to further send for transmission to TX node i or to a central server of the wireless network information based on a RRM decision i made during a round k, wherein determining the updated global parameter includes receiving the updated global parameter from said TX node i or said central server.

Example KA3 includes the subject matter of Example KA1, wherein: the RRM decision i corresponds to $\pi^i(h_k^i, \theta_k^i)$, a transmit power decision; the RRM decision that RX node i expects to see from individual ones of TX nodes j and the RRM decisions that respective RX nodes j of the wireless network distinct from RX node i expect to see from TX node i all correspond to transmit power decisions; and the updated respective value constraints correspond to $\rho_{k+1}^{ji}$ for all TX nodes j, $\rho_{k+1}^{ji}$ representing maximum expected transmit power allowed for TX node i by RX node j.

Example KA4 includes the subject matter of Example KA1, wherein updating the local parameter $\theta_{k-1}^i$ to $\theta_k^i$ is based on a learning rate $\gamma_{\theta,k}$ corresponding to $\theta_k^i$.

Example KA5 includes the subject matter of Example KA4, wherein updating the local parameter $\theta_{k-1}^i$ to $\theta_k^i$ is based on respective gradients of: a log of a sum of 1 and signal to interference and noise ratio (SINR) for link i at said each round k; and an expected value corresponding to RRM decision i.

Example KA6 includes the subject matter of Example KA5, wherein updating the local parameter $\theta_{k-1}^i$ to $\theta_k^i$ is based on products of respective Lagrange variables with corresponding ones of the gradients of the log and of the expected value corresponding to the RRM decision i, the Lagrange variables corresponding to constraints for a machine learning policy based on $\theta_k^i$.

Example KA7 includes the subject matter of Example KA6, wherein an optimized cost function of RRM decision i is based on primal parameters and dual parameters, wherein: the primal parameters include $x_k^i$, an achievable wireless throughput of link i at said each round k; the dual parameters include Lagrange variables $\lambda_k^i$, and $\mu_k^i$, $\lambda_k^i$ to be multiplied by the log, and $\mu_k^i$ to be multiplied by the expected value corresponding to RRM decision i.

Example KA8 includes the subject matter of Example KA6, wherein updating the local parameter $\theta_{k-1}^i$ to $\theta_k^i$ is based on a sum of products of the gradient of the expected value corresponding to RRM decision i with respective Lagrange variables $v_k^{ij}$ for all RX nodes j, wherein $v_k^{ij}$ corresponds to a constraint, by RX node j, for a machine learning policy based on an optimization of a value corresponding to RRM decision i.

Example KA9 includes the subject matter of Example KA1, wherein updating to $\theta_k^i$ is based on RRM decisions that RX node i expects to see from individual ones of TX nodes j, and on RRM decisions that respective RX nodes j of the wireless network distinct from RX node i expect to see from TX node i.

Example KA10 includes the subject matter of Example KA1, wherein the information based on the RRM decision i made during a round k corresponds to a global parameter information exchange and further includes information based on a log of 1 plus signal to interference and noise ratio (SINR) for link i at said each round k, and information based on an expected value corresponding to RRM decision i.

Example KA11 includes the subject matter of Example KA1, wherein the RRM decision i at said each round k is further based on historical network observations collected by at least one of said RX node i or said TX node i.

Example KA12 includes the subject matter of Example KA1, further comprising a transceiver coupled to the one or more processors, and one or more antennas coupled to the transceiver, the antennas to send and receive wireless communications in the wireless network.

Example KA13 includes the subject matter of Example KA12, further comprising a system memory coupled to the one or more processors, the system memory to store instructions, the one or more processors to execute the instructions to perform the training.

Example KA14 includes the subject matter of Example KA13, further comprising: a network interface card (NIC) coupled to the one or more processors to connect the one or more processors to a core network by way of wired access; and a housing that encloses the one or more processors, the transceiver, and the NIC.

Example KA15 includes the subject matter of Example KA14, wherein the housing further includes power circuitry to provide power to the apparatus.

Example KA16 includes the subject matter of Example KA15, wherein the housing further includes mounting hardware to enable attachment of the housing to another structure.

Example KA17 includes the subject matter of Example KA16, wherein the housing further includes at least one input device.

Example KA18 includes the subject matter of Example KA17, wherein the housing further includes at least one output device.

Example KM1 includes a method to be performed at an apparatus of a receiver computing node i (RX node i) of a wireless network, the method including: performing a set of rounds k of local determination of radio resource management (RRM) decisions i for a transmitter node i (TX node i) associated with RX node i, each round k including: determining $h_k^i$ corresponding to a vector of channel gains at RX node i, the channel gains being from both TX node i, and from TX nodes j interfering with RX node i; updating a local parameter $\theta_{k-1}^i$ to $\theta_k^i$, wherein, at rounds k−1 and k, respectively, for a wireless link i between RX node i at TX node i, $\theta_{k-1}^i$ and $\theta_k^i$ are vectors of parameters for respective machine learning policies; determining a RRM decision i based on $h_k^i$ and $\theta_k^i$, and further based on a global parameter k including respective value constraints by RX node i, applicable during all rounds k, on values corresponding to RRM decisions by the TX nodes j; and communicating on link i based on RRM decision i; after the set of rounds k of local determination of RRM decisions i, determining an updated global parameter corresponding to updated respective value constraints by RX node i, applicable in a subsequent set of rounds k+1 of a local determination of RRM decision i by RX node i, on values corresponding to RRM decisions by the TX nodes j; and repeating performing the rounds of local determination of the RRM decision in the subsequent set of rounds k+1, sending for transmission information based on an estimate of a RRM decision i made during a round k+1, and receiving an updated global parameter applicable in a subsequent set of rounds k+n.

Example KM2 includes the subject matter of Example KM1, further comprising sending for transmission to TX node i or to a central server of the wireless network information based on a RRM decision i made during a round k, wherein determining the updated global parameter includes receiving the updated global parameter from said TX node i or said central server.

Example KM3 includes the subject matter of Example KM1, wherein: the RRM decision i corresponds to $\pi^i(h_k^i, \theta_k^i)$, a transmit power decision; the RRM decision that RX node i expects to see from individual ones of TX nodes j and the RRM decisions that respective RX nodes j of the wireless network distinct from RX node i expect to see from TX node i all correspond to transmit power decisions; and the updated respective value constraints correspond to $\rho_{k+1}^{ji}$ for all TX nodes j, $\rho_{k+1}^{ji}$ representing maximum expected transmit power allowed for TX node i by RX node j.

Example KM4 includes the subject matter of Example KM1, wherein updating the local parameter $\theta_{k-1}^i$ to $\theta_k^i$ is based on a learning rate $\gamma_{\theta,k}$ corresponding to $\theta_k^i$.

Example KM5 includes the subject matter of Example KM4, wherein updating the local parameter $\theta_{k-1}^i$ to $\theta_k^i$ is based on respective gradients of: a log of a sum of 1 and signal to interference and noise ratio (SINR) for link i at said each round k; and an expected value corresponding to RRM decision i.

Example KM6 includes the subject matter of Example KM5, wherein updating the local parameter $\theta_{k-1}^i$ to $\theta_k^i$ is based on products of respective Lagrange variables with corresponding ones of the gradients of the log and of the expected value corresponding to the RRM decision i, the Lagrange variables corresponding to constraints for a machine learning policy based on $\theta_k^i$.

Example KM7 includes the subject matter of Example KM6, wherein an optimized cost function of RRM decision i is based on primal parameters and dual parameters, wherein: the primal parameters include $x_k^i$, an achievable wireless throughput of link i at said each round k; the dual parameters include Lagrange variables $\lambda_k^i$, and $\mu_k^i$, $\lambda_k^i$ to be multiplied by the log, and $\mu_k^i$ to be multiplied by the expected value corresponding to RRM decision i.

Example KM8 includes the subject matter of Example KM6, wherein updating the local parameter $\theta_{k-1}^i$ to $\theta_k^i$ is based on a sum of products of the gradient of the expected value corresponding to RRM decision i with respective Lagrange variables $v_k^{ij}$ for all RX nodes j, wherein $v_k^{ij}$ corresponds to a constraint, by RX node j, for a machine learning policy based on an optimization of a value corresponding to RRM decision i.

Example KM9 includes the subject matter of Example KM1, wherein updating to $\theta_k^i$ is based on RRM decisions that RX node i expects to see from individual ones of TX nodes j, and on RRM decisions that respective RX nodes j of the wireless network distinct from RX node i expect to see from TX node i.

Example KM10 includes the subject matter of Example KM1, wherein the information based on the RRM decision i made during a round k corresponds to a global parameter information exchange and further includes information based on a log of 1 plus signal to interference and noise ratio (SINR) for link i at said each round k, and information based on an expected value corresponding to RRM decision i.

Example KM11 includes the subject matter of Example KM1, wherein the RRM decision i at said each round k is further based on historical network observations collected by at least one of said RX node i or said TX node i.

Example KM12 includes the subject matter of Example KM1, further comprising sending and receiving wireless communications using a transceiver coupled of the RX node i, and one or more antennas coupled to the transceiver.

Example KB1 includes a non-transitory machine readable storage medium having instructions stored thereon, the instructions when executed by an apparatus of a receiver computing node i (RX node i) of a wireless network, to cause the apparatus to perform operations including: performing a set of rounds k of local determination of radio resource management (RRM) decisions i for a transmitter node i (TX node i) associated with RX node i, each round k including: determining $h_k^i$ corresponding to a vector of channel gains at RX node i, the channel gains being from both TX node i, and from TX nodes j interfering with RX node i; updating a local parameter $\theta_{k-1}^i$ to $\theta_k^i$, wherein, at rounds k−1 and k, respectively, for a wireless link i between RX node i at TX node i, $\theta_{k-1}^i$ and $\theta_k^i$ are vectors of parameters for respective machine learning policies; determining a RRM decision i based on $h_k^i$ and $\theta_k^i$, and further based on a global parameter k including respective value constraints by RX node i, applicable during all rounds k, on values corresponding to RRM decisions by the TX nodes j; and communicating on link i based on RRM decision i; after the set of rounds k of local determination of RRM decisions i, determining an updated global parameter corresponding to updated respective value constraints by RX node i, applicable in a subsequent set of rounds k+1 of a local determination of RRM decision i by RX node i, on values corresponding to RRM decisions by the TX nodes j; and repeating performing the rounds of local determination of the RRM decision in the subsequent set of rounds k+1, sending for transmission information based on an estimate of a RRM decision i made during a round k+1, and receiving an updated global parameter applicable in a subsequent set of rounds k+n.

Example KB2 includes the subject matter of Example KB1, the operations further comprising sending for transmission to TX node i or to a central server of the wireless network information based on a RRM decision i made during a round k, wherein determining the updated global parameter includes receiving the updated global parameter from said TX node i or said central server.

Example KB3 includes the subject matter of Example KB1, wherein: the RRM decision i corresponds to $\pi^i(h_k^i, \theta_k^i)$, a transmit power decision; the RRM decision that RX node i expects to see from individual ones of TX nodes j and the RRM decisions that respective RX nodes j of the wireless network distinct from RX node i expect to see from TX node i all correspond to transmit power decisions; and the updated respective value constraints correspond to $\rho_{k+1}^{ji}$ for all TX nodes j, $\rho_{k+1}^{ji}$ representing maximum expected transmit power allowed for TX node i by RX node j.

Example KB4 includes the subject matter of Example KB1, wherein updating the local parameter $\theta_{k-1}^i$ to $\theta_k^i$ is based on a learning rate $\gamma_{\theta,k}$ corresponding to $\theta_k^i$.

Example KB5 includes the subject matter of Example KB4, wherein updating the local parameter $\theta_{k-1}^i$ to $\theta_k^i$ is based on respective gradients of: a log of a sum of 1 and signal to interference and noise ratio (SINR) for link i at said each round k; and an expected value corresponding to RRM decision i.

Example KB6 includes the subject matter of Example KB5, wherein updating the local parameter $\theta_{k-1}^i$ to $\theta_k^i$ is based on products of respective Lagrange variables with corresponding ones of the gradients of the log and of the expected value corresponding to the RRM decision i, the Lagrange variables corresponding to constraints for a machine learning policy based on $\theta_k^i$.

Example KB7 includes the subject matter of Example KB6, wherein an optimized cost function of RRM decision i is based on primal parameters and dual parameters, wherein: the primal parameters include $x_k^i$, an achievable wireless throughput of link i at said each round k; the dual parameters include Lagrange variables $\lambda_k^i$, and $\mu_k^i$, $\lambda_k^i$ to be multiplied by the log, and $\mu_k^i$ to be multiplied by the expected value corresponding to RRM decision i.

Example KB8 includes the subject matter of Example KB6, wherein updating the local parameter $\theta_{k-1}^i$ to $\theta_k^i$ is based on a sum of products of the gradient of the expected value corresponding to RRM decision i with respective Lagrange variables $v_k^{ij}$ or all RX nodes j, wherein $v_k^{ij}$ corresponds to a constraint, by RX node j, for a machine learning policy based on an optimization of a value corresponding to RRM decision i.

Example KB9 includes the subject matter of Example KB1, wherein updating to $\theta_k^i$ is based on RRM decisions that RX node i expects to see from individual ones of TX nodes j, and on RRM decisions that respective RX nodes j of the wireless network distinct from RX node i expect to see from TX node i.

Example KB10 includes the subject matter of Example KB1, wherein the information based on the RRM decision i made during a round k corresponds to a global parameter information exchange and further includes information based on a log of 1 plus signal to interference and noise ratio (SINR) for link i at said each round k, and information based on an expected value corresponding to RRM decision i.

Example KB11 includes the subject matter of Example KB1, wherein the RRM decision i at said each round k is further based on historical network observations collected by at least one of said RX node i or said TX node i.

Example KB12 includes the subject matter of Example KB1, further comprising sending and receiving wireless communications using a transceiver coupled of the RX node i, and one or more antennas coupled to the transceiver.

Example MPF an apparatus comprising means to perform one or more elements of a method of any one of claims IM1-IM13, JM1-JM11, and KM1-KM12.

Example CRM includes a machine-readable storage medium including machine-readable instructions which, when executed, implement the method of any one of claims IM1-IM13, JM1-JM11, and KM1-KM12.

Example SYS includes a distributed edge computing system comprising: a central server; a plurality of computing nodes communicably coupled to the central server, at least one of the computing nodes including one or more processors and instructions that, when executed by the one or more processors, cause the at least one of the computing nodes to perform operations corresponding the method of any one of claims IM1-IM13, JM1-JM11, and KM1-KM12.

What is claimed is:

1. An apparatus of a transmitter computing node n (TX node n) of a wireless network, the apparatus including an interconnect interface to connect the apparatus to one or more components of the TX node n, and one or more processors to: implement machine learning (ML) based training rounds, each training round including:
    determining, using reinforcement learning, a local action value function $Q_n(h_n, a_n; \theta_n)$ corresponding to a value of performing a radio resource management (RRM) action an at a receiving computing node n (RX node n) associated with TX node n using policy parameter $\theta_n$ and based on $h_n$, $h_n$ including channel state information at RX node n; and
    determining, based on an overall action value function $Q_{tot}$ at time t, an estimated gradient of an overall loss at time t for overall policy parameter $\theta_t (\nabla L_t(\theta_t))$ wherein $Q_{tot}$ corresponds to a mixing of local action value functions $Q_i(h_i, a_i; \theta_i)$ for all TX nodes i in the network at time t including TX node n; and
    determine, in response to a determination that $\nabla L_t(\theta_t)$ is close to zero for various values of t during training, a trained local action value function $Q_{n,trained}$ to generate a trained action value relating to data communication between TX node n and RX node n.

2. The apparatus of claim 1, the one or more processors to further receive, during said each training round, $h_n$ from RX node n, wherein $h_n$ includes information on a state of a channel n between the TX node and the RX node n and information $h_{mn}$ on states of respective channels between other TX nodes m and the RX node n.

3. The apparatus of claim 1, wherein the one or more processors are to determine, during said each training round, an estimated gradient of a local loss at time t for policy parameter $\theta_{n,t;}(\nabla L_t(\theta_{n,t}))$ prior to determining the trained local action value function.

4. The apparatus of claim 1, wherein the one or more processors are to send data for transmission to the RX node n based on the trained action value.

5. The apparatus of claim 1, wherein the one or more processors are to, at a start of the training rounds, implement an initialization function to initialize a value for $a_n$ and $\theta_n$.

6. The apparatus of claim 1, wherein the one or more processors are to, at a start of the training rounds, implement an initialization function to initialize a value for $\theta$, and, at each training round:
    determine $Q_{tot}$, wherein $Q_{tot}$ is based on H, a and $\theta$, wherein H corresponds to a matrix of channel state information between pairs of TX nodes and RX nodes of the network, a corresponds to a vector of RRM decisions for each TX node i of the network, and θ is a policy parameter to map H to a; and send for transmission $Q_{tot}$ to other TX nodes m of the network.

7. The apparatus of claim 1, wherein the one or more processors are to send $Q_n$ and $h_n$ for transmission to a central server, and to receive $Q_{tot}$ from the central server, $Q_{tot}$ corresponding to a mixing of local action value functions $Q_i(h_i, a_i; \theta_i)$ for all TX nodes i in the network at time t including TX node n.

8. The apparatus of claim 1, wherein determining $\nabla L_t(\theta_t)$ includes using one of a gradient descent operation or a chain rule operation.

9. The apparatus of claim 1, wherein $L_t(\theta_t)$ is based on subtracting, from a target value $y_{tot}$ for the overall action value function Qtot, a square of Qtot at time t.

10. The apparatus of claim 1, further comprising a transceiver coupled to the one or more processors, and one or more antennas coupled to the transceiver, the antennas to send and receive wireless communications in the wireless network.

11. The apparatus of claim 10, further comprising a system memory coupled to the one or more processors, the system memory to store instructions, the one or more processors to execute the instructions to perform the training.

12. The apparatus of claim 10, further comprising:
a network interface card (NIC) coupled to the one or more processors to connect the one or more processors to a core network by way of wired access; and
a housing that encloses the one or more processors, the transceiver, and the NIC.

13. A method to be performed at an apparatus of a transmitter computing node n (TX node n) of a wireless network, the method including:
implementing machine learning (ML) based training rounds, each training round including:
determining, using reinforcement learning, a local action value function $Q_n(h_n, a_n; \theta_n)$ corresponding to a value of performing a radio resource management (RRM) action $a_n$ at a receiving computing node n (RX node n) associated with TX node n using policy parameter $\theta_n$ and based on $h_n$, $h_n$ including channel state information at RX node n; and
determining, based on an overall action value function $Q_{tot}$ at time t, an estimated gradient of an overall loss at time t for overall policy parameter $\theta_t (\nabla L_t(\theta_t))$ wherein $Q_{tot}$ corresponds to a mixing of local action value functions $Q_i(h_i, a_i; \theta_i)$ for all TX nodes i in the network at time t including TX node n; and
determining, in response to a determination that $\nabla L_t(\theta_t)$ is close to zero for various values of t during training, a trained local action value function $Q_{n,trained}$ to generate a trained action value relating to data communication between TX node n and RX node n.

14. The method of claim 13, further including receiving, during said each training round, $h_n$ from RX node n, wherein $h_n$ includes information on a state of a channel n between the TX node and the RX node n and information $h_{mn}$ on states of respective channels between other TX nodes m and the RX node n.

15. The method of claim 13, further including determining, during said each training round, an estimated gradient of a local loss at time t for policy parameter $\theta_{n,t} (\nabla L_t(\theta_{n,t}))$ prior to determining the trained local action value function.

16. The method of claim 13, further including sending data for transmission to the RX node n based on the trained action value.

17. The method of claim 13, further including, at each training round:
determining $Q_{tot}$, wherein $Q_{tot}$ is based on H, a and θ, wherein H corresponds to a matrix of channel state information between pairs of TX nodes and RX nodes of the network, a corresponds to a vector of RRM decisions for each TX node i of the network, and θ is a policy parameter to map H to a; and
sending for transmission $Q_{tot}$ to other TX nodes m of the network.

18. A non-transitory machine readable storage medium having instructions stored thereon, the instructions when executed by an apparatus of a transmitter computing node n (TX node n) of a wireless network to cause the apparatus to perform operations including:
implementing machine learning (ML) based training rounds, each training round including:
determining, using reinforcement learning, a local action value function $Q_n(h_n, a_n; \theta_n)$ corresponding to a value of performing a radio resource management (RRM) action $a_n$ at a receiving computing node n (RX node n) associated with TX node n using policy parameter $\theta_n$ and based on $h_n$, $h_n$ including channel state information at RX node n; and
determining, based on an overall action value function $Q_{tot}$ at time t, an estimated gradient of an overall loss at time t for overall policy parameter $\theta_t (\nabla L_t(\theta_t))$ wherein Qtot corresponds to a mixing of local action value functions $Q_i(h_i, a_i; \theta_i)$ for all TX nodes i in the network at time t including TX node n; and
determine, in response to a determination that $\nabla L_t(\theta_t)$ is close to zero for various values of t during training, a trained local action value function $Q_{n,trained}$ to generate a trained action value relating to data communication between TX node n and RX node n.

19. The storage medium of claim 18, the operations further including receiving, during said each training round, $h_n$ from RX node n, wherein $h_n$ includes information on a state of a channel n between the TX node and the RX node n and information $h_{mn}$ on states of respective channels between other TX nodes m and the RX node n.

20. The storage medium of claim 18, wherein Q is discounted long term value.

21. The storage medium of claim 18, the operations further including determining, during said each training round, an estimated gradient of a local loss at time t for policy parameter $\theta_{n,t} (\nabla L_t(\theta_{n,t}))$ prior to determining the trained local action value function.

22. The storage medium of claim 18, the operations further including sending data for transmission to the RX node n based on the trained action value.

23. The storage medium of claim 18, the operations further including, before the training rounds, implementing an initialization function to initialize a value for $a_n$ and $\theta_n$.

24. The storage medium of claim 18, the operations further including, at each training round:
determining $Q_{tot}$, wherein $Q_{tot}$ is based on H, a and θ, wherein H corresponds to a matrix of channel state information between pairs of TX nodes and RX nodes of the network, a corresponds to a vector of RRM decisions for each TX node i of the network, and θ is a policy parameter to map H to a; and
sending for transmission $Q_{tot}$ to other TX nodes m of the network.

25. The storage medium of claim 18, the operations further including sending $Q_n$ and $h_n$ for transmission to a central server, and to receive $Q_{tot}$ from the central server, $Q_{tot}$ corresponding to a mixing of local action value functions $Q_i(h_i, a_i; \theta_i)$ for all TX nodes i in the network at time t including TX node n.

* * * * *